(12) United States Patent
Auda et al.

(10) Patent No.: US 11,752,779 B2
(45) Date of Patent: Sep. 12, 2023

(54) FOOD SERVICE CUP DISPENSERS, SYSTEMS, AND METHODS

(71) Applicant: GPCP IP Holdings LLC, Atlanta, GA (US)

(72) Inventors: Michelle Lynn Auda, Atlanta, GA (US); Daniel Huffaker, Kennesaw, GA (US); Brandon Seth Cross, Atlanta, GA (US); Daniel James Geddes, Appleton, WI (US); Nathaniel Michael Peterson, Champlin, MN (US); Andrew James Carlson, Hopkins, MN (US); Aaron Lee Sinclair, Tyrone, GA (US); Jason Aaron Morgan, Appleton, WI (US); Lenox Gregory Wilson, Alpharetta, GA (US); Mikhail Tikh, St. Louis Park, MN (US); Robert Earl Simon, Plymouth, MN (US); Ryan David Carignan, Suamico, WI (US); Alex Vaughn Grady, Covington, GA (US)

(73) Assignee: GPCP IP Holdings LLC, Atlanta, GA (US)

( * ) Notice: Subject to any disclaimer, the term of this patent is extended or adjusted under 35 U.S.C. 154(b) by 14 days.

(21) Appl. No.: 17/110,987

(22) Filed: Dec. 3, 2020

(65) Prior Publication Data

US 2021/0086529 A1 Mar. 25, 2021

Related U.S. Application Data

(63) Continuation-in-part of application No. 16/212,142, filed on Dec. 6, 2018.

(Continued)

(51) Int. Cl.
*B41J 3/407* (2006.01)
*G07F 13/10* (2006.01)

(52) U.S. Cl.
CPC ....... *B41J 3/40733* (2020.08); *B41J 3/40731* (2020.08); *G07F 13/10* (2013.01)

(58) Field of Classification Search
CPC .......... B25J 18/00; B41J 3/4073; B65B 3/04; B65B 7/28; B65B 61/025; B67D 1/0888;
(Continued)

(56) References Cited

U.S. PATENT DOCUMENTS

| 3,652,363 A | 3/1972 | Kinslow |
| 3,672,113 A | 6/1972 | Andra |

(Continued)

FOREIGN PATENT DOCUMENTS

| CA | 2681759 A1 | 10/2008 |
| CA | 2865589 A1 | 9/2013 |

(Continued)

OTHER PUBLICATIONS

International Search Report and Written Opinion received for PCT Application No. PCT/IB2020/061544, dated Feb. 8, 2021, 13 Pages.

(Continued)

*Primary Examiner* — Gene O Crawford
*Assistant Examiner* — Kelvin L Randall, Jr.

(57) ABSTRACT

Systems for providing on-demand cup printing and dispensing for food service are provided herein. A cup dispenser includes a cup source configured to hold a stack of cups and one or more cup-moving elements configured to cause a cup from the stack of cups to move through the cup dispenser. The cup dispenser includes a motor configured to operate the one or more cup-moving elements to cause the cup to move through the cup dispenser along a path. The cup dispenser also includes a printer configured to print at least one of (Continued)

order information or personalization information on the cup that is based on the food service order associated with the cup. The cup dispenser further includes a dispensing section that provides the cup, which includes the at least one of order information or personalization information printed thereon.

19 Claims, 31 Drawing Sheets

Related U.S. Application Data

(60) Provisional application No. 62/944,585, filed on Dec. 6, 2019, provisional application No. 62/712,465, filed on Jul. 31, 2018, provisional application No. 62/597,516, filed on Dec. 12, 2017.

(58) Field of Classification Search
CPC ........ B67D 1/1234; B67D 2210/00076; B67D 2210/00078; G06K 19/10; G07F 13/065
See application file for complete search history.

(56) References Cited

U.S. PATENT DOCUMENTS

| | | |
|---|---|---|
| 3,706,175 A | 12/1972 | Anderson |
| 3,726,453 A | 4/1973 | Shaffer et al. |
| 3,844,444 A | 10/1974 | Carroll |
| 3,861,983 A | 1/1975 | Harrell |
| 3,979,877 A | 9/1976 | Vetter |
| 4,354,408 A | 10/1982 | Carte |
| 4,566,250 A | 1/1986 | Matsumura et al. |
| 4,590,975 A * | 5/1986 | Credle, Jr. .............. F25C 5/20 D7/308 |
| 4,618,073 A | 10/1986 | Bartfield |
| 4,936,100 A | 6/1990 | Leppa |
| 4,944,337 A | 7/1990 | Credle, Jr. et al. |
| 5,041,070 A | 8/1991 | Blaser |
| 5,042,351 A | 8/1991 | Rosenthal |
| 5,205,476 A | 4/1993 | Sorenson |
| 5,221,040 A | 6/1993 | Sorenson |
| D343,432 S | 1/1994 | Fekete et al. |
| 5,277,646 A | 1/1994 | Fekete |
| D345,399 S | 3/1994 | Fekete et al. |
| D345,400 S | 3/1994 | Fekete et al. |
| D349,136 S | 7/1994 | Fekete et al. |
| 5,332,147 A | 7/1994 | Sorenson |
| 5,390,711 A * | 2/1995 | Murphey ................ G07F 13/10 221/12 |
| 5,507,579 A | 4/1996 | Sorenson |
| RE36,876 E | 9/2000 | Daniels |
| 6,201,629 B1 | 3/2001 | Mcclelland et al. |
| 6,282,869 B1 | 9/2001 | Bullock et al. |
| 6,334,109 B1 | 12/2001 | Kanevsky |
| 6,355,290 B1 | 3/2002 | Soehnlen |
| 6,577,407 B1 | 6/2003 | Kopecki |
| 6,578,475 B1 * | 6/2003 | Siedlaczek ............... B65C 3/14 101/35 |
| 6,597,969 B2 | 7/2003 | Greenwald |
| 6,601,760 B1 | 8/2003 | Nardozzi |
| 6,646,659 B1 | 11/2003 | Brown |
| 6,739,773 B2 | 5/2004 | Spano |
| 6,793,755 B2 | 9/2004 | Schaupp |
| 6,811,080 B1 | 11/2004 | Gold |
| 6,859,215 B1 | 2/2005 | Brown |
| 6,881,380 B1 | 4/2005 | Mootz |
| 6,941,980 B2 | 9/2005 | Rocchio |
| 6,961,710 B1 | 11/2005 | Yanagisawa |
| 7,050,938 B1 | 5/2006 | Prater |
| 7,070,250 B2 | 7/2006 | Lester |
| 7,110,964 B2 | 9/2006 | Tengler |
| 7,123,375 B2 | 10/2006 | Nobutani |
| 7,124,098 B2 | 10/2006 | Hopson |
| 7,126,716 B1 | 10/2006 | Kaufman |
| 7,133,939 B1 | 11/2006 | Desai |
| 7,308,916 B2 | 12/2007 | Akuzawa |
| 7,344,070 B2 | 3/2008 | Nobutani |
| 7,404,349 B1 | 7/2008 | Fiske |
| 7,424,443 B2 | 9/2008 | Yanagisawa |
| 7,460,252 B2 | 12/2008 | Campbell |
| 7,580,146 B2 | 8/2009 | Halsema |
| 7,647,249 B2 | 1/2010 | Shroff |
| 7,648,067 B2 | 1/2010 | Nobutani |
| 7,689,461 B2 | 3/2010 | Minowa |
| 7,752,146 B2 | 7/2010 | Lert, Jr. |
| 7,757,896 B2 | 7/2010 | Carpenter |
| 7,762,181 B2 | 7/2010 | Boland |
| 7,819,489 B2 | 10/2010 | Gambino |
| 7,908,778 B1 | 3/2011 | Dushane |
| 7,913,879 B2 | 3/2011 | Carpenter |
| 8,033,452 B2 | 10/2011 | Koakutsu |
| 8,098,408 B2 | 1/2012 | Sawada |
| 8,162,181 B2 | 4/2012 | Carpenter |
| 8,164,785 B2 | 4/2012 | Ferlitsch |
| 8,201,904 B2 * | 6/2012 | Vesanto ................ B41J 11/002 347/4 |
| 8,215,544 B2 | 7/2012 | Koakutsu |
| 8,224,700 B2 | 7/2012 | Silver |
| 8,249,946 B2 | 8/2012 | Froseth |
| 8,264,725 B1 | 9/2012 | Pillutla |
| 8,297,471 B2 | 10/2012 | Dooley et al. |
| 8,445,104 B2 | 5/2013 | Vigunas |
| 8,453,879 B2 | 6/2013 | Carpenter |
| 8,459,542 B2 | 6/2013 | Koakutsu |
| D686,914 S | 7/2013 | Harvey et al. |
| D686,915 S | 7/2013 | Harvey et al. |
| 8,498,899 B2 | 7/2013 | Martucci |
| 8,505,593 B1 | 8/2013 | Denise |
| 8,537,399 B2 | 9/2013 | Chackalackal |
| 8,565,916 B2 | 10/2013 | Zhang |
| 8,739,840 B2 | 6/2014 | Mattos, Jr. |
| 8,757,222 B2 | 6/2014 | Rudick |
| 8,807,393 B2 | 8/2014 | Carpenter |
| 8,814,042 B2 | 8/2014 | Irudayam |
| 8,861,016 B2 | 10/2014 | Kodama |
| 8,867,087 B2 | 10/2014 | Takagi |
| 8,873,096 B2 | 10/2014 | Nishimura |
| 8,887,992 B2 | 11/2014 | Koakutsu |
| 8,888,492 B2 | 11/2014 | Riscalla |
| 8,897,820 B2 | 11/2014 | Marovets |
| 8,913,284 B2 | 12/2014 | Nishimura |
| 8,928,925 B2 | 1/2015 | Komiyama |
| 8,944,583 B2 | 2/2015 | Waschnig |
| 9,030,685 B2 | 5/2015 | Shima |
| 9,067,775 B2 | 6/2015 | Mattos, Jr. |
| 9,129,206 B2 | 9/2015 | Furuhata |
| 9,141,562 B2 | 9/2015 | Pickett |
| 9,156,279 B2 | 10/2015 | Shima |
| 9,159,094 B2 | 10/2015 | Hurst |
| 9,221,275 B2 | 12/2015 | Till |
| 9,224,275 B2 | 12/2015 | Nishimura |
| 9,226,513 B2 | 1/2016 | Ream |
| 9,227,830 B2 | 1/2016 | Angus |
| 9,272,534 B2 | 3/2016 | Domeier |
| 9,280,305 B2 | 3/2016 | Takasu |
| 9,280,690 B2 | 3/2016 | Furukawa |
| 9,302,463 B2 | 4/2016 | Heidrich |
| 9,320,373 B2 | 4/2016 | Burke et al. |
| 9,372,644 B2 | 6/2016 | Srinivasmurthy |
| 9,375,927 B1 * | 6/2016 | Perego ................ B41J 2/1433 |
| 9,406,084 B2 | 8/2016 | Havas |
| 9,434,596 B2 | 9/2016 | Carpenter |
| 9,463,616 B2 | 10/2016 | Domeier |
| 9,591,078 B2 | 3/2017 | Nishimura |
| 9,676,207 B2 | 6/2017 | Balar et al. |
| 9,680,779 B2 | 6/2017 | Marovets |
| 9,701,530 B2 | 7/2017 | Kline |
| 9,724,948 B2 | 8/2017 | Silbert |
| 9,731,514 B2 | 8/2017 | Eliav |
| 9,766,848 B2 | 9/2017 | Shima |
| 9,824,382 B2 | 11/2017 | Holman |
| 9,830,764 B1 | 11/2017 | Murphy |
| 9,865,023 B2 | 1/2018 | Insolia |
| 9,988,201 B2 | 6/2018 | Darin et al. |

(56) References Cited

U.S. PATENT DOCUMENTS

| | | | |
|---|---|---|---|
| 9,994,340 B2 | 6/2018 | Angus | |
| 10,029,904 B2 | 7/2018 | Carpenter | |
| 10,032,201 B2 | 7/2018 | Hurst | |
| 10,035,643 B2 | 7/2018 | Holman | |
| 10,051,874 B2 | 8/2018 | Carmichael | |
| 10,053,280 B2 | 8/2018 | Holman | |
| 10,086,602 B2 | 10/2018 | Vilas Boas | |
| 10,089,669 B2 | 10/2018 | Hurst | |
| 10,115,142 B2 | 10/2018 | Holman | |
| 10,124,614 B1* | 11/2018 | Leo | B41J 25/001 |
| 10,144,225 B2 | 12/2018 | Koers | |
| 10,152,841 B2 | 12/2018 | Rendell | |
| 10,176,505 B2 | 1/2019 | Holman | |
| 10,252,545 B2 | 4/2019 | Koers | |
| 10,262,352 B2 | 4/2019 | Holman | |
| 10,269,052 B2 | 4/2019 | Shinkle, II | |
| 10,279,600 B2* | 5/2019 | Gertlowski | B41J 2/04581 |
| 10,286,684 B2 | 5/2019 | Schach | |
| 10,308,398 B2 | 6/2019 | Miller | |
| 10,346,899 B2 | 7/2019 | Holman | |
| 10,354,258 B2 | 7/2019 | Marovets | |
| 10,384,922 B2 | 8/2019 | Carpenter | |
| 10,464,360 B2 | 11/2019 | Silbert | |
| 10,492,626 B2 | 12/2019 | Auda | |
| 10,496,961 B2 | 12/2019 | Ophardt | |
| 2002/0004749 A1 | 1/2002 | Froseth | |
| 2002/0032582 A1 | 3/2002 | Feeney | |
| 2002/0174025 A1 | 11/2002 | Hind | |
| 2003/0014305 A1 | 1/2003 | Harden | |
| 2003/0033915 A1 | 2/2003 | Glemser | |
| 2003/0065565 A1 | 4/2003 | Wagner | |
| 2003/0074254 A1 | 4/2003 | Iijima | |
| 2003/0080005 A1 | 5/2003 | Toussant et al. | |
| 2003/0110083 A1 | 6/2003 | Taylor | |
| 2003/0182154 A1 | 9/2003 | Myers | |
| 2004/0093250 A1 | 5/2004 | Hasegawa | |
| 2004/0105126 A1 | 6/2004 | Minowa | |
| 2004/0158499 A1 | 8/2004 | Dev | |
| 2004/0210488 A1 | 10/2004 | Doherty | |
| 2004/0238555 A1 | 12/2004 | Parks | |
| 2004/0267544 A1 | 12/2004 | Michelson | |
| 2005/0006449 A1 | 1/2005 | D Amato | |
| 2005/0015256 A1 | 1/2005 | Kargman | |
| 2005/0021407 A1 | 1/2005 | Kargman | |
| 2005/0075934 A1 | 4/2005 | Knight | |
| 2005/0102179 A1 | 5/2005 | Caplinger | |
| 2005/0237556 A1 | 10/2005 | Watkins | |
| 2005/0242178 A1 | 11/2005 | Minowa | |
| 2005/0275894 A1 | 12/2005 | Minowa | |
| 2006/0010137 A1 | 1/2006 | Johnson | |
| 2006/0081653 A1 | 4/2006 | Boland | |
| 2006/0089881 A1 | 4/2006 | Landry | |
| 2006/0155600 A1 | 7/2006 | Mays | |
| 2006/0162284 A1 | 7/2006 | Nakagawa et al. | |
| 2006/0178986 A1 | 8/2006 | Giordano | |
| 2006/0244989 A1 | 11/2006 | Evans | |
| 2007/0056871 A1 | 3/2007 | Griffiths | |
| 2007/0094087 A1 | 4/2007 | Mitchell | |
| 2007/0150371 A1 | 6/2007 | Gangji | |
| 2007/0150996 A1 | 7/2007 | Mccarville | |
| 2007/0157559 A1 | 7/2007 | Till | |
| 2007/0221728 A1 | 9/2007 | Ferro | |
| 2008/0048012 A1 | 2/2008 | Liou | |
| 2008/0052158 A1 | 2/2008 | Ferro | |
| 2008/0052173 A1 | 2/2008 | Liou | |
| 2008/0140500 A1 | 6/2008 | Kurkure | |
| 2008/0164274 A1 | 7/2008 | Stettes | |
| 2008/0278750 A1 | 11/2008 | Lehotsky | |
| 2009/0066996 A1 | 3/2009 | Minowa | |
| 2009/0204883 A1 | 8/2009 | Talanis | |
| 2009/0287568 A1 | 11/2009 | Cesmedziev | |
| 2010/0161521 A1 | 6/2010 | Friend | |
| 2010/0237091 A1 | 9/2010 | Garson | |
| 2010/0250234 A1 | 9/2010 | Azimi | |
| 2010/0325000 A1 | 12/2010 | Teraoka | |
| 2011/0006074 A1 | 1/2011 | Machers | |
| 2011/0049180 A1 | 3/2011 | Carpenter | |
| 2011/0264284 A1* | 10/2011 | Rudick | B67D 1/1236 715/810 |
| 2011/0315706 A1 | 12/2011 | Lockwood | |
| 2012/0012604 A1 | 1/2012 | Pfister | |
| 2012/0084154 A1 | 4/2012 | Dresner | |
| 2012/0207887 A1 | 8/2012 | Battersby et al. | |
| 2012/0239683 A1 | 9/2012 | Starkman | |
| 2012/0290412 A1 | 11/2012 | Marovets | |
| 2012/0306987 A1* | 12/2012 | Kim | B41J 3/4073 347/224 |
| 2013/0054016 A1 | 2/2013 | Canter | |
| 2013/0054695 A1 | 2/2013 | Holman | |
| 2013/0146652 A1 | 6/2013 | Koakutsu | |
| 2013/0215055 A1 | 8/2013 | Okuma | |
| 2014/0012706 A1 | 1/2014 | Foerster | |
| 2014/0022576 A1 | 1/2014 | Shima | |
| 2014/0041748 A1* | 2/2014 | Angus | B67D 1/0041 141/1 |
| 2014/0080102 A1 | 3/2014 | Krishna | |
| 2014/0092422 A1 | 4/2014 | Shima | |
| 2014/0149937 A1 | 5/2014 | Holliday | |
| 2014/0156361 A1 | 6/2014 | Hughes | |
| 2014/0214561 A1 | 7/2014 | Butler | |
| 2014/0244526 A1 | 8/2014 | Georges | |
| 2014/0261858 A1 | 9/2014 | Mattos, Jr. | |
| 2014/0312104 A1 | 10/2014 | Kim et al. | |
| 2015/0181923 A1 | 7/2015 | Holman | |
| 2015/0183534 A1* | 7/2015 | Holman | G07F 17/26 53/52 |
| 2015/0185974 A1 | 7/2015 | Holman | |
| 2015/0186966 A1 | 7/2015 | Holman | |
| 2015/0186968 A1 | 7/2015 | Holman | |
| 2015/0186969 A1 | 7/2015 | Holman | |
| 2015/0186970 A1 | 7/2015 | Holman | |
| 2015/0186971 A1 | 7/2015 | Holman | |
| 2015/0186981 A1 | 7/2015 | Holman | |
| 2015/0187026 A1 | 7/2015 | Holman | |
| 2016/0023471 A1 | 1/2016 | Jeter | |
| 2016/0267567 A1 | 9/2016 | Shinkle, II | |
| 2016/0267816 A1 | 9/2016 | Anderson | |
| 2016/0355291 A1* | 12/2016 | Mahar | B65B 7/2807 |
| 2016/0361886 A1 | 12/2016 | Suzuki et al. | |
| 2017/0011319 A1 | 1/2017 | Elliot | |
| 2017/0032448 A1 | 2/2017 | Kitajima | |
| 2017/0190474 A1 | 7/2017 | Miller | |
| 2017/0224142 A1 | 8/2017 | Darin et al. | |
| 2017/0291746 A1 | 10/2017 | Darin et al. | |
| 2017/0310848 A1 | 10/2017 | Iwahara | |
| 2017/0365017 A1 | 12/2017 | Ells | |
| 2018/0000266 A1 | 1/2018 | Hulseman et al. | |
| 2018/0108096 A1 | 4/2018 | Insolia | |
| 2018/0197163 A1 | 7/2018 | Kelly et al. | |
| 2018/0218562 A1 | 8/2018 | Conway | |
| 2018/0250970 A1 | 9/2018 | Silbert | |
| 2018/0300785 A1 | 10/2018 | Hurst | |
| 2019/0108708 A1 | 4/2019 | Rendell | |
| 2019/0174933 A1 | 6/2019 | Auda | |
| 2019/0180392 A1 | 6/2019 | Auda | |
| 2019/0182390 A1 | 6/2019 | Auda | |
| 2019/0200799 A1 | 7/2019 | Meshulam | |
| 2019/0291407 A1 | 9/2019 | Schwartzburg | |
| 2020/0268173 A1 | 8/2020 | Auda | |
| 2021/0386215 A1 | 12/2021 | Auda et al. | |

FOREIGN PATENT DOCUMENTS

| | | | |
|---|---|---|---|
| CA | 2865590 | A1 | 9/2013 |
| CA | 3047440 | A1 | 4/2016 |
| CA | 3047441 | A1 | 4/2016 |
| CA | 2964046 | A1 | 5/2016 |
| CA | 2871876 | C | 12/2017 |
| CA | 2983472 | C | 6/2018 |
| CA | 2964930 | C | 7/2018 |
| CA | 3006133 | C | 10/2019 |
| CN | 1924787 | A | 3/2007 |
| CN | 201296476 | Y | 8/2009 |

(56) References Cited

FOREIGN PATENT DOCUMENTS

| | | |
|---|---|---|
| CN | 102915601 A | 2/2013 |
| CN | 103679362 A | 3/2014 |
| CN | 105046339 A | 11/2015 |
| CN | 108021995 A | 5/2018 |
| EP | 2605909 B1 | 1/2014 |
| EP | 3377325 A1 | 9/2018 |
| EP | 2762317 B1 | 3/2019 |
| JP | S5854474 A | 3/1983 |
| JP | H06103285 A | 4/1994 |
| JP | 2001306666 A | 11/2001 |
| JP | 2002190068 A | 7/2002 |
| JP | 2003016529 A | 1/2003 |
| JP | 2005231716 A | 9/2005 |
| JP | 2006346869 A | 12/2006 |
| JP | 2009037341 A | 2/2009 |
| JP | 2014219855 A | 11/2014 |
| JP | 2015111390 A | 6/2015 |
| JP | 5860841 B2 | 12/2015 |
| JP | 5867563 B2 | 1/2016 |
| JP | 5867564 B2 | 1/2016 |
| JP | 5867565 B2 | 1/2016 |
| JP | 6273815 B2 | 1/2018 |
| JP | 6390250 B2 | 8/2018 |
| KR | 930007681 A | 5/1993 |
| KR | 950005668 B1 | 5/1995 |
| KR | 19990011615 U | 3/1999 |
| KR | 20020074952 A | 10/2002 |
| KR | 200296194 Y1 | 11/2002 |
| KR | 20190036782 A | 4/2019 |
| MX | 2008011202 A | 9/2008 |
| MX | 2010008550 A | 9/2010 |
| MX | 2012012504 A | 1/2013 |
| MX | 2012012505 A | 1/2013 |
| MX | 2014010241 A | 12/2014 |
| MX | 2014010242 A | 12/2014 |
| MX | 347029 B | 4/2017 |
| MX | 348413 B | 6/2017 |
| MX | 2017005041 A | 7/2017 |
| WO | WO 2017/136771 A1 | 8/2017 |
| WO | WO 2017/177058 A1 | 10/2017 |
| WO | WO 2017/177058 A4 | 11/2017 |
| WO | 2017207131 A1 | 12/2017 |
| WO | 2017221077 A2 | 12/2017 |
| WO | WO 2018/005294 A1 | 1/2018 |
| WO | WO 2018/068869 A1 | 4/2018 |
| WO | 2018108361 A1 | 6/2018 |
| WO | 2018182114 A1 | 10/2018 |
| WO | 2019042600 A1 | 3/2019 |
| WO | 2019042686 A1 | 3/2019 |
| WO | 2019077524 A1 | 4/2019 |
| WO | 2019118479 A1 | 6/2019 |
| WO | 2019180320 A1 | 9/2019 |
| WO | 2020030932 A1 | 2/2020 |

OTHER PUBLICATIONS

"Arby's medias on Instagram;" Picgra.; retrieved Mar. 8, 2019 from https://picgra.com/location/arby-s/5760301.

"Fast Food Review: Roast Ham and Swiss Market Fresh Sandwich from Arby's;" posted Jun. 22, 2009; retrieved Mar. 8, 2019 from https://www.grubgrade.com/reviews/fast-food-review-roast-ham-and-swiss-market-fresh-sandwich-from-arbys/.

19Crimes; Living Wine Labels; retrieved Mar. 4, 2019 from https://www.9crimes.com.

Arby's Wrapper obtained at least as early as Dec. 4, 2017; 3 pp. https://dailynews-india.com/environment-first-kfc-turns-printed-food-receipts-into-eco-friendly-napkins/, retrieved Mar. 5, 2020.

Introducing Nforme; retrieved Mar. 4, 2019 from https://vimeo.com/305768354/a0a3a40a32?utm_campaign-nForme&utm source-hs email&utm medium-email&utm content-2& hsenc-p2ANylz-_WjXQoyWJwbD7Uo1G3aTzDRWPMz_u5qthtjbyF7QIvSirS2RppnS2JDzW4IsLcvcMO7Dyz9FexkR_jZVYproCT5aoP4w&_hsmi=2.

McDonalds New Equipment Evaluation—All Day Breakfast; retreived Mar. 4, 2019 from https://www.youtube.com/watch?v=CYKgiH9jeCY&feature=youtu.be.

Quick Serve Restaurants (QSR); STAR Micronics; retrieved Apr. 18, 2019 from https://www.starmicronics.com/pages/QuickServiceRestaurantsQSR.

\* cited by examiner

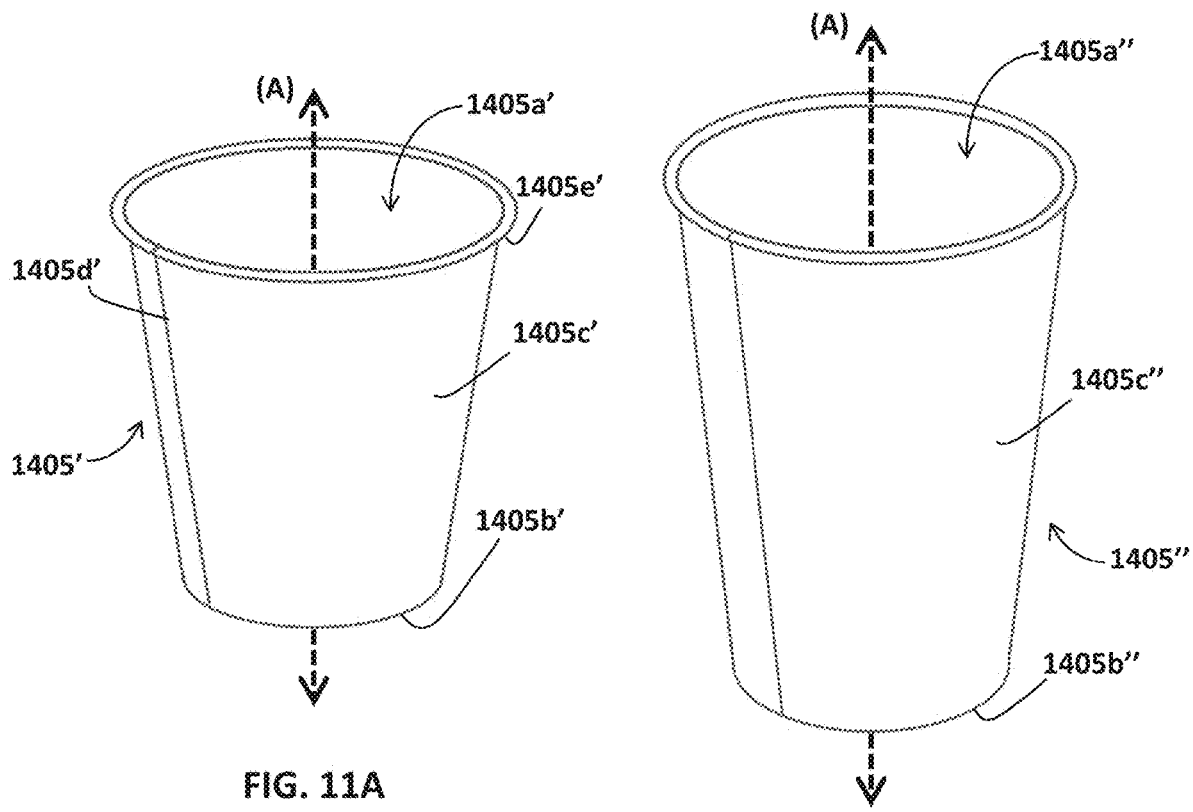
FIG. 11A
FIG. 11B
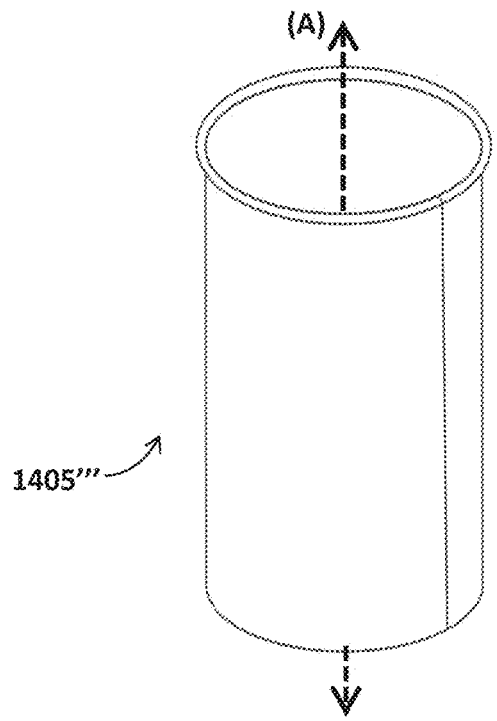
FIG. 11C

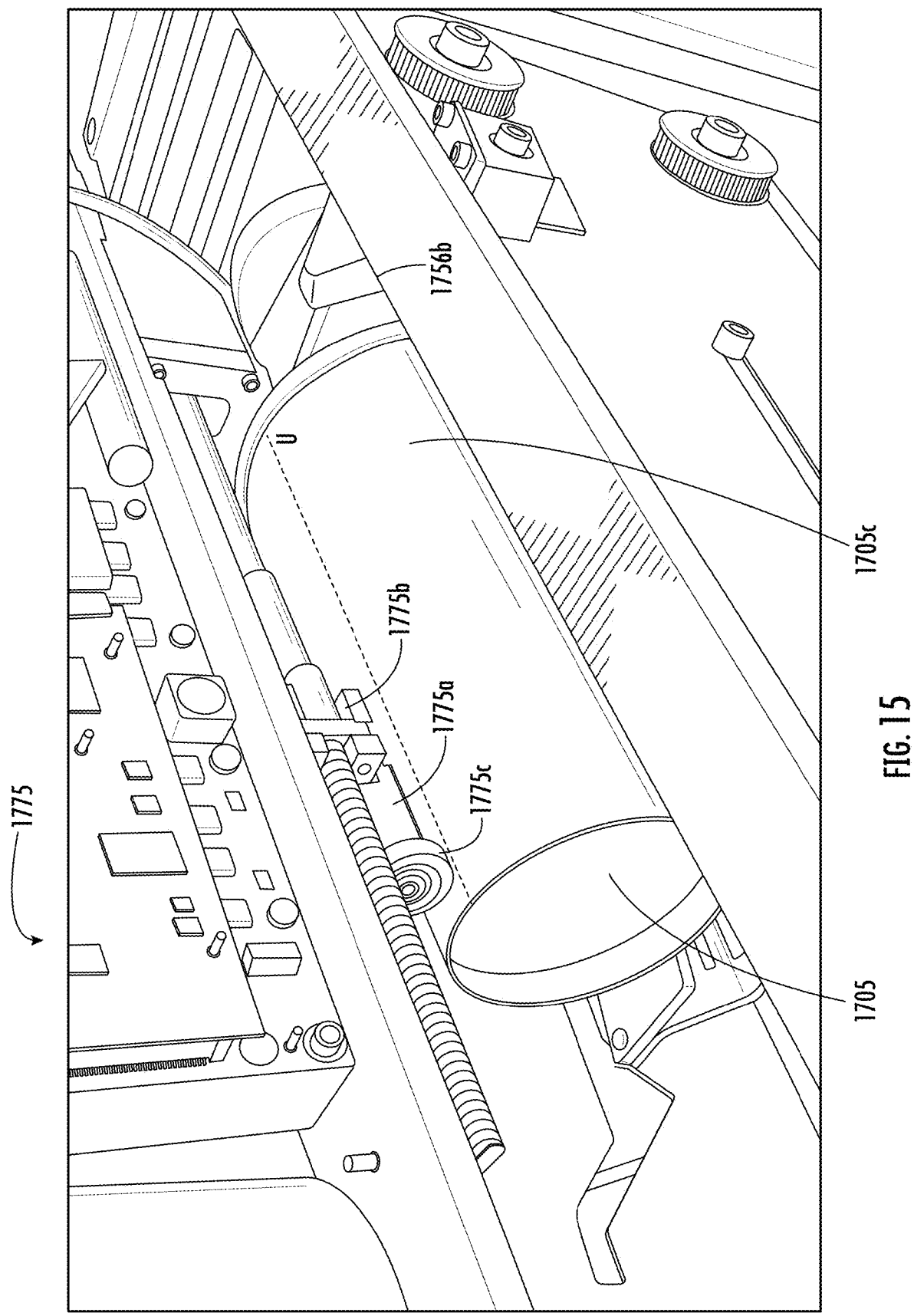

FOOD SERVICE CUP DISPENSERS, SYSTEMS, AND METHODS

CROSS REFERENCE TO RELATED APPLICATIONS

This application (i) claims priority to U.S. Provisional Application No. 62/944,585, filed Dec. 6, 2019, entitled "Food Service Cup Dispensers, Systems, and Methods", and (ii) is a continuation-in-part of U.S. application Ser. No. 16/212,142, filed Dec. 6, 2018, entitled "Food Service Cup Dispensers, Systems, and Methods", which claims priority to U.S. Provisional Application No. 62/712,465, filed Jul. 31, 2018, entitled "Personalized Food Service Material Printing Systems", and U.S. Provisional Application No. 62/597,516, filed Dec. 12, 2017, entitled "Personalized Food Service Material Printing Systems"; each of which is incorporated by reference herein in its entirety.

BACKGROUND

Customer experience for food service can often feel impersonal. A customer may provide a food order and a food service person may then package up the food order for the customer. For example, cups such as open-top containers used to hold liquids (e.g., a beverage), solids (e.g., ice cream), and mixtures thereof (e.g., a soup, a soda with ice, a milk shake) during consumption and/or storage are preprinted and supplied to the food service store often months in advance, such that the customer is presented with one or more generic cups for their food order. Further, any promotions or messages that a food service business may want to present to the customer on a food service cup requires a significant lag time from formation of the promotion/message to presentation to the customer.

BRIEF SUMMARY

Example embodiments of the present invention generally relate to printing and dispensing systems for food service and, more particularly to on-demand cup (e.g., beverage cup, soup container, ice cream container) printing and dispensing systems for food service.

Some embodiments of the present invention provide on-demand cup printing for food service. Such systems may provide many advantages, including for example personalization of cups and/or real-time promotion availability for stores. Once a customer places a request for food service, the system can determine order information about the customer's order and/or personalization information about the customer or store. Such information may be gathered based on any information available including, for example, user profiles, past order history, store promotions, social media, a user's device, among many other things. Using that information, the system may determine information to print on one or more cups that may be provided to the customer with their food order. Such print information may include order information (e.g., confirming their food order) and personalization information (e.g., the customer name, a promotion geared to the customer, an image that is personalized for the customer such as a favorite sports team, etc.). That print information is then printed on one or more cups using a dispenser in the store. In some embodiments, the cup may have some pre-printed information (e.g., logos, images, etc.) and/or may define a blank area such as a "window" within which such order or personalization information may be printed. The printed cup may then be retrieved and filled by the food service person (or a corresponding cup filling system) to prepare the food order for the customer.

With personalized information printed on the cup(s), the customer's experience may improve by providing personalization and targeted promotions that are more likely to be pertinent to the customer. With order information printed on the cup(s), a food service person handling the printed cup is more likely to prepare an accurate food order for the customer. Likewise, a customer having more than one cup as part of their food service order can be sure that each cup and its contents get to the intended ultimate consumer, for example, when an office worker goes on a coffee run for multiple colleagues. Further, providing on-demand printed cups may provide for real-time needs of the food service business and reduce significant shipping/manufacturing costs and overall waste from unused or old promotions.

Such a system may be used to provide on-demand printing for any type of cup with a circular or oval shaped cross-section, such as a beverage cup, a soup container, an ice cream container, among many others. As an example, one cup dispenser may be available to print on one style of cups (e.g., cups for holding cold beverages), one cup dispenser may be available to print on another style of cups (e.g., hot soup containers, coffee cups), and/or one cup dispenser may be available to print on a third style of cups (e.g., ice cream containers). As another example, the system may comprise multiple cup dispensers, each of which may print on distinct sizes of cups (e.g., small, medium, and large cups) from the other dispenser(s). As another example in accordance with the present teachings, a single cup dispenser may sequentially or simultaneously print and dispense cups of a plurality of different styles and/or sizes.

Systems for dispensing cups in accordance with the present teachings may also include or be used in conjunction with other dispensers for printing food service material including, for example, systems for dispensing food wrap, food containers, carry out bags, tray liners, napkins, pouches, etc. such that various items in the food service order may include order information and/or personalization information. Examples of known on-demand dispensers of food service material that may be used in conjunction with cup dispensers in accordance with the present teachings are disclosed in U.S. Patent Publication No. 20190174933, entitled "Food Service Cup Dispensers, Systems, and Methods," and U.S. Patent Publication No. 20190180392, entitled "Personalized Food Service Material Printing Systems," the teachings of which are incorporated by reference herein in their entireties. As an example, one or more cup dispensers may be available to print on cups while one or more other dispensers may be available to print on rolls of food wrap (e.g., one for printing on premium food wrap and one for printing on value food wrap). As discussed otherwise herein, such dispensers for printing various food service items may each be in communication with one or more food request systems (e.g., a self-order kiosk, a point-of-sale operator terminal, the internet, etc.), and depending on the order information, the appropriate cup and/or other food service material dispenser could be chosen. Various embodiments, such as described herein, however, contemplate the use of a cup dispenser alone or with one or more different types of dispensers for printing on and dispensing different types of food service material (e.g., a food wrap dispenser, a napkin dispenser, a food bag dispenser, a food pouch dispenser, etc.).

In some embodiments, the available promotions or messages may be updated on-the-fly and dynamically chosen based on the customer or store. The choice of promotion or message could be based on data gathered by the system, taking into account many factors including, for example, customer trends, desired time windows or products to "push"/promote, among many other things.

In some embodiments, an example system may provide instructions to other systems (e.g., front or back-of-house dispensers/components) to help with the order or overall store management. For example, a lid (e.g., cup covering, cup sealing, cup closing, etc.) dispenser may be instructed to dispense an appropriate number and size of lids corresponding to the number and size of cups to complete the food order. The system could also monitor ink usage and/or cup usage and handle ordering/maintenance needs automatically.

In an example embodiment, a cup dispenser for dispensing a cup with printed information for use with a food service order is provided. The cup dispenser comprises a cup source configured to hold a stack of cups and one or more cup-moving elements configured to cause a cup from the stack of cups to move through the cup dispenser. For example, a motor may be configured to operate the one or more cup-moving elements to cause the cup to move through the cup dispenser along a path. In various aspects, the cup dispenser further comprises a printer configured to print on the cup at least one of order information or personalization information, which may be based on the food service order associated with the cup. In various embodiments, the cup dispenser may also include a dispensing section configured to enable a user to access the printed cup. By way of example, a dispensing section may be positioned along the path and may be configured to present the cup to the user and/or allow a user to manually access the cup, wherein, when the cup is accessible by the user, the cup includes the at least one of order information or personalization information printed thereon.

In some embodiments, the printer is positioned along the path downstream of the cup source.

In some embodiments, one or more cup-rotation structures may be provided to cause the cup to rotate before, during, or after being printed on by the printer. By way of example, in some embodiments, a cup-rotation structure may be configured to cause the cup to rotate during printing, for example, so as to cause relative movement between the cup to be printed and the printer such that desired print information may be printed on various portions of the cup. In some embodiments, a cup-rotation structure may be configured to cause the cup to rotate prior to printing, for example, such that a cup that remains stationary during printing is disposed in a desired orientation during movement of a printer thereabout. In some embodiments, a cup-rotation structure may be positioned within the dispensing section and configured to cause the cup to rotate within the dispensing section such that the cup may be presented to the user in a desired orientation (e.g., such that the printed information is viewable by the user when the printed cup is accessible within the dispensing section). In some embodiments, the cup dispenser further comprises a door configured to cover the dispensing slot during printing.

In some embodiments, the one or more cup-moving elements comprise a cup source removal structure configured to separate the cup from the stack of cups. In some embodiments, the one or more cup-moving elements comprise a cup movement structure configured to cause the cup to move from the cup source to one or more printing positions for being printed on by the printer. In some embodiments, the cup source is positioned above the printer such that gravity causes the removed cup to fall into a cup-moving element so as to be transferred to a printing position for being printed on by the printer. In some embodiments, a sled with a cup-receiving element may be configured to receive the cup and move the cup into the printing position for printing thereon.

In some embodiments, the cup may be in a horizontal orientation when in the printing position. For example, a sidewall of the cup may be horizontal and the printer may be configured to translate in a horizontal plane thereabove for printing on the sidewall of the cup. In some embodiments, an uppermost portion of the sidewall of the cup may be in the horizontal orientation. In some embodiments, the cup dispenser may include multiple printing positions for different size or type cups and the printer may be configured to print on a cup in each of the printing positions, such that the printer is shared among the different printing positions.

In some embodiments, a sensor may be configured to determine a seam of a cup and cause printing accordingly (e.g., print at a position on the sidewall of the cup from the detected seam, not print on the seam, etc.). In some embodiments, one or more heating elements may be configured to apply heat before, after, or during printing so as to enable drying of the printed ink thereon.

In some embodiments, the cup dispenser further comprises a user interface configured to display information corresponding to the food service order.

In some embodiments, the cup source is configured to hold a plurality of stacks of cups. In some embodiments, two of the plurality of stacks of cups comprise differently-sized cups, and wherein the one or more cup-moving elements are configured to selectively cause removal of a specifically sized cup based on the food service order.

In some embodiments, the cup dispenser further comprises a communication element configured to communicate with a remote computing device. The remote computing device may comprise a food request module configured to receive a request for food service for a customer, wherein the request for food service includes the food service order. In some embodiments, the cup dispenser further comprises a controller configured to receive, via the communication element and from the remote computing device, food service order data corresponding to the food service order. The controller may be further configured to determine, based on the food service order data, the at least one of order information or personalization information to print on each of the one or more cup(s) of the size and/or style necessary to fulfill the food service order. The controller is further configured to cause dispensing of the cup with the at least one of order information or personalization information printed thereon. In some embodiments, the cup dispenser may additionally include or be coupled to a filling system or device (e.g., for filling the cup with the appropriate beverage, soup, etc.) and/or a lidding system or device (e.g., for closing and/or sealing the open end of the cup that has been filled via a lid or seal).

In an example embodiment, a system for providing on-demand cup printing for a food service order is provided. The system comprises a food request module configured to receive a request for food service for a customer, wherein the request for food service includes the food service order. The system further includes a cup dispenser for dispensing a cup with printed information for use with the food service order. The cup dispenser comprises a communication element and a cup source configured to hold one or more cups. Each of the one or more cups comprises an open end and a closed end and a sidewall extending therebetween. The cup dispenser further includes a printing module comprising a printer configured to print at least one of order information or personalization information on a sidewall of a first cup of the one or more cups so as to form a printed first cup. The at least one of order information or personalization information is based on the food service order associated with the first cup. The cup dispenser further includes a dispensing section configured to enable a user to access the printed first cup. The printed first cup includes the order information or personalization information printed thereon when the printed first cup is accessible in the dispensing section.

In some embodiments, the cup source is configured maintain the one or more cups in the cup source in a vertical orientation.

In some embodiments, the printer comprises a printer head configured to translate in a horizontal plane. In some embodiments, the printer head is fixed vertically while translating horizontally.

In some embodiments, the printer is configured to print the at least one of order information or personalization information on the sidewall of the first cup when the first cup is in a horizontal orientation. When the first cup is in the horizontal orientation, at least one of a central axis of the first cup extending through each of the first cup's open and closed ends or a portion of the sidewall of the first cup is horizontal during printing of the first cup. In some embodiments, the printer head is configured to be disposed vertically above the first cup in the horizontal orientation, and wherein the printer head comprises at least one ink jet configured to propel ink downward toward an uppermost portion of the sidewall of the first cup in the horizontal orientation during printing thereof. In some embodiments, the at least one ink jet is configured to maintain a distance from the uppermost portion of the sidewall of the first cup during printing thereof. In some embodiments, when the first cup is in the horizontal orientation, the first cup is disposed such that the uppermost portion of the sidewall of the first cup is parallel to a horizontal plane, and wherein the printer head is configured to translate in the horizontal plane such that the printer head moves parallel to the uppermost portion of the sidewall of the first cup during printing thereof. In some embodiments, when the first cup is in the horizontal orientation, the first cup is disposed such that the central axis of the cup is parallel to a horizontal plane, and wherein the printer head is configured to translate in the horizontal plane such that the printer head moves parallel to the central axis of the first cup during printing thereof.

In some embodiments, the first cup is configured to rotate about the central axis during printing thereof such that an uppermost portion of the sidewall of the cup remains parallel to a horizontal plane during rotation of the first cup.

In some embodiments, the printing module is configured to receive the first cup from a first stack of cups at a first printing position such that the first cup is disposed in the horizontal orientation and a second cup from a second stack of cups at a second printing position such that the second cup is disposed in a horizontal orientation, and wherein a printer head of the printing module is configured to print on both of the first cup disposed in the first printing position and the second cup disposed in the second printing position.

In some embodiments, the cup dispenser further includes one or more cup-moving elements configured to change the first cup from a first orientation in the cup source to the horizontal orientation as the cup moves from the cup source to the printing module, wherein the first orientation is different than the horizontal orientation. In some embodiments, the one or more cup-moving elements comprise a sled having a cup-receiving portion disposed below the cup source, wherein the cup-receiving portion comprises a resilient shoulder configured to engage a lower surface of a lip at the open end of the first cup and to release engagement of the lower surface of the lip when the first cup is disposed within the printing module.

In some embodiments, the cup dispenser further includes one or more cup-moving elements configured to re-position the first cup from the horizontal orientation in the printing module to a vertical orientation in the dispensing section.

In some embodiments, the cup source is configured to hold at least a first stack of cups and a second stack of cups, wherein cups of the first stack of cups differ in at least one of style, shape, material, and volume from cups of the second stack of cups.

In some embodiments, the one or more cups each comprise a first circular cross-section corresponding to the open end and a second circular cross-section corresponding to the closed end. In some embodiments, the one or more cups comprise one or more soup containers, one or more beverage cups, or one or more ice cream containers.

In some embodiments, the printing module comprises a sensor configured to detect the position of a seam extending along the sidewall of the first cup. In some embodiments, the sensor comprises a light source and a detector configured to receive light from the light source reflected from the first cup, wherein the position of the seam is detected based on time-of-flight of the reflected light during rotation of the first cup. In some embodiments, the first cup is configured to rotate about a central axis during printing thereof, and wherein the printer is configured to not print on the detected position of the seam.

In some embodiments, the cup dispenser further includes a heat source configured to heat the first cup at least one of before, during, and after printing so as to dry ink printed on the first cup.

In some embodiments, a mandrel is configured to engage an inner surface of the first cup within the printing module.

In some embodiments, the cup dispenser further includes a cup source removal structure configured to separate the first cup from a stack of cups held at the cup source.

In some embodiments, the cup source is configured to hold a plurality of stacks of cups, and wherein a cup source removal structure is configured to selectively cause removal of the first cup from one of the plurality of stacks of cups based on the food service order.

In some embodiments, the system further comprises a controller configured to: receive, via the communication element, food service order data corresponding to the food service order; determine, based on the food service order data, the order information or personalization information to be printed on the first cup; and cause dispensing of the printed first cup. In some embodiments, the controller is configured to determine the order information or personalization information to be printed on the first cup by referencing a look-up table based on the food service order data received.

In another example embodiment, a cup dispenser for providing on-demand cup printing for a food service order is provided. The cup dispenser comprises a cup source configured to hold one or more cups, wherein each of the one or more cups comprises an open end and a closed end and a sidewall extending therebetween. The cup dispenser further includes a printing module comprising a printer configured to print at least one of order information or personalization information on a sidewall of a first cup so as to form a printed first cup. The at least one of order information or personalization information is based on the food service order associated with the first cup. The cup dispenser further includes a dispensing section configured to enable a user to access the printed first cup. The printed first cup includes the order information or personalization information printed thereon when the printed first cup is accessible in the dispensing section.

In some embodiments, the printer is configured to print the at least one of order information or personalization information on the sidewall of the first cup when the first cup is in a horizontal orientation, wherein, when the first cup is in the horizontal orientation, at least one of a central axis of the first cup extending through each of the first cup's open and closed ends or a portion of the sidewall of the first cup is horizontal during printing of the first cup.

In yet another example embodiment, a method of dispensing a cup is provided. The method comprises providing a cup dispenser for dispensing the cup with printed information for use with a food service order. The cup dispenser comprises a controller, a communication element, and a cup source configured to hold one or more cups. Each of the one or more cups comprises an open end and a closed end and a sidewall extending therebetween. The cup dispenser comprises a printing module comprising a printer configured to print at least one of order information or personalization information on a sidewall of a first cup so as to form a printed first cup. The at least one of order information or personalization information is based on the food service order associated with the first cup. The cup dispenser further includes a dispensing section configured to enable a user to access the printed first cup. The printed first cup includes the order information or personalization information printed thereon when the printed first cup is accessible in the dispensing section. The method further includes receiving, via the communication element, food service order data corresponding to the food service order. The method further includes determining, based on the food service order data, the order information or personalization information to be printed on the first cup. The method further includes causing dispensing of the printed first cup with the at least on of order information or personalization information printed thereon.

In yet another example embodiment, a cup dispenser for providing on-demand cup printing for a food service order is provided. The cup dispenser comprises a cup source configured to hold at least a first stack of cups and a second stack of cups. Each cup in the first stack of cups and the second stack of cups comprises an open end and a closed end and a sidewall extending therebetween. The cup dispenser further includes a printing module comprising a printer configured to print at least one of order information or personalization information on a cup disposed in a first printing position or in a second printing position. The at least one of order information or personalization information is based on the food service order associated with the cup. The printer comprises a printer head configured to print on a sidewall of a first cup from the first stack of cups disposed in the first printing position or a sidewall of a second cup from the second stack of cups disposed in the second printing position so as to respectively form a first and second printed cup. The cup dispenser further includes one or more cup-moving elements configured to cause the first cup and the second cup to move through the cup dispenser along a path from the respective first and second stacks to the respective first and second printing position. The cup dispenser further includes a dispensing section configured to enable a user to access the first and second printed cups. The first and second printed cups include the order information or personalization information printed thereon when the first and second printed cups are accessible in the dispensing section.

In some embodiments, the printer head is configured to translate in a horizontal plane above each of the first and second printing positions.

In some embodiments, the printer head is fixed vertically while translating horizontally.

In some embodiments, the first and second printing positions are configured such that uppermost portions of the sidewalls of the first and second cups disposed thereat are horizontal, and wherein translation of the printer head in the horizontal plane is fixed such that the printer head moves parallel to the uppermost portions of the sidewalls of the cups during printing thereof. In some embodiments, each of the first and second cups is configured to rotate about the central axis during printing thereof such that the uppermost portion of the sidewall of the cup remains horizontal during rotation.

In some embodiments, the first and second cups differ from one another in at least one of shape or volume.

In some embodiments, the printer head is configured to be disposed vertically above the first and second cups, and wherein the printer head comprises at least one ink jet configured to propel ink downward toward uppermost portions of the sidewalls of the first cup or second cup during printing thereof. In some embodiments, the at least one ink jet is configured to maintain a fixed distance from the uppermost portions of the sidewalls of the first and second cups during printing thereof.

In yet another example embodiment, a cup dispenser for providing on-demand cup printing for a food service order is provided. The cup dispenser comprises a cup source configured to hold at least a first stack of cups and a second stack of cups, wherein each cup in the first stack of cups and the second stack of cups comprises an open end and a closed end and a sidewall extending therebetween. The cup dispenser further includes a printing module comprising a printer configured to print at least one of order information or personalization information on a cup disposed in a printing position. The at least one of order information or personalization information is based on the food service order associated with the cup. The printer comprises a printer head configured to print on a sidewall of a first cup from the first stack of cups disposed in the printing position or a sidewall of a second cup from the second stack of cups disposed in the printing position so as to respectively form a first and second printed cup. The cup dispenser further includes one or more cup-moving elements configured to cause the first cup to move through the cup dispenser along a first path from the first stack of cups to the printing position and configured to cause the second cup to move through the cup dispenser along a second path from the first stack of cups to the printing position. The cup dispenser further includes a dispensing section configured to enable a user to access the first printed cup or the second printed cup. The first printed cup or the second printed cup includes the order information or personalization information printed thereon when accessible in the dispensing section.

In yet another example embodiment, a cup dispenser for providing on-demand cup printing for a food service order is provided. The cup dispenser comprises a cup source configured to hold one or more stacks of cups. Each cup in the one or more stacks of cups comprises an open end and a closed end and a sidewall extending therebetween. Each of the sidewalls comprise a seam extending along a central axis between the open and closed ends. The cup dispenser further includes a printing module comprising a printer configured to print at least one of order information or personalization information on a sidewall of a cup from the one or more stacks. The at least one of order information or personalization information is based on the food service order associated with the cup. The cup dispenser further includes one or more cup-moving elements configured to cause the cup to move through the cup dispenser along a path from the one or more stacks to the printing module. The cup dispenser further includes a sensor configured to detect the position of the seam of the cup when disposed in the printing module. The cup dispenser further includes a controller in communication with the sensor and configured to adjust printing of the sidewall of the cup based on the detected seam position. The cup dispenser further includes a dispensing section configured to enable a user to access the printed cup. The printed cup includes the order information or personalization information printed thereon when the cup is accessible in the dispensing section.

In some embodiments, the controller is configured to control the printer and/or rotation of the cup about the central axis extending through the closed and open ends of the cup during printing of the sidewall such that the printer is configured to not print on the seam.

In some embodiments, the sensor comprises a light source and a detector configured to receive light from the light source reflected from the cup, wherein the position of the seam is detected based on time-of-flight of the reflected light during rotation of the cup about a central axis extending through the closed and open ends of the cup.

In some embodiments, the cup is configured to rotate about a central axis extending through the closed and open ends of the cup during printing thereof, and wherein the printer is prevented from printing on the detected seam position. In some embodiments, the cup dispenser further comprises a motor for controlling rotation of the cup about the central axis when disposed within the printing module, wherein the controller is configured to control the motor during printing of the cup so as to not print on the seam.

In yet another example embodiment, a cup dispenser for providing on-demand cup printing for a food service order is provided. The cup dispenser comprises a cup source configured to hold one or more stacks of cups, wherein each cup in the one or more stacks of cups comprises an open end and a closed end and a sidewall extending therebetween. The cup dispenser further includes a printing module comprising a printer configured to print at least one of order information or personalization information on a sidewall of a cup from the one or more stacks. The at least one of order information or personalization information is based on the food service order associated with the cup. The cup dispenser further includes one or more cup-moving elements configured to cause the cup to move through the cup dispenser along a path from the one or more stacks to the printing module. The cup dispenser further includes a heat source configured to heat the cup at least one of before, during, or after printing thereof so as to dry ink printed on the cup. The cup dispenser further includes a dispensing section configured to enable a user to access the printed cup, wherein, the printed cup includes the order information or personalization information printed thereon when the cup is accessible in the dispensing section.

In some embodiments, the heat source comprises hot forced air.

In some embodiments, the heat source comprises radiative heating elements.

Some additional embodiments include apparatuses, systems, and methods including various example embodiments, such as described herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 10:
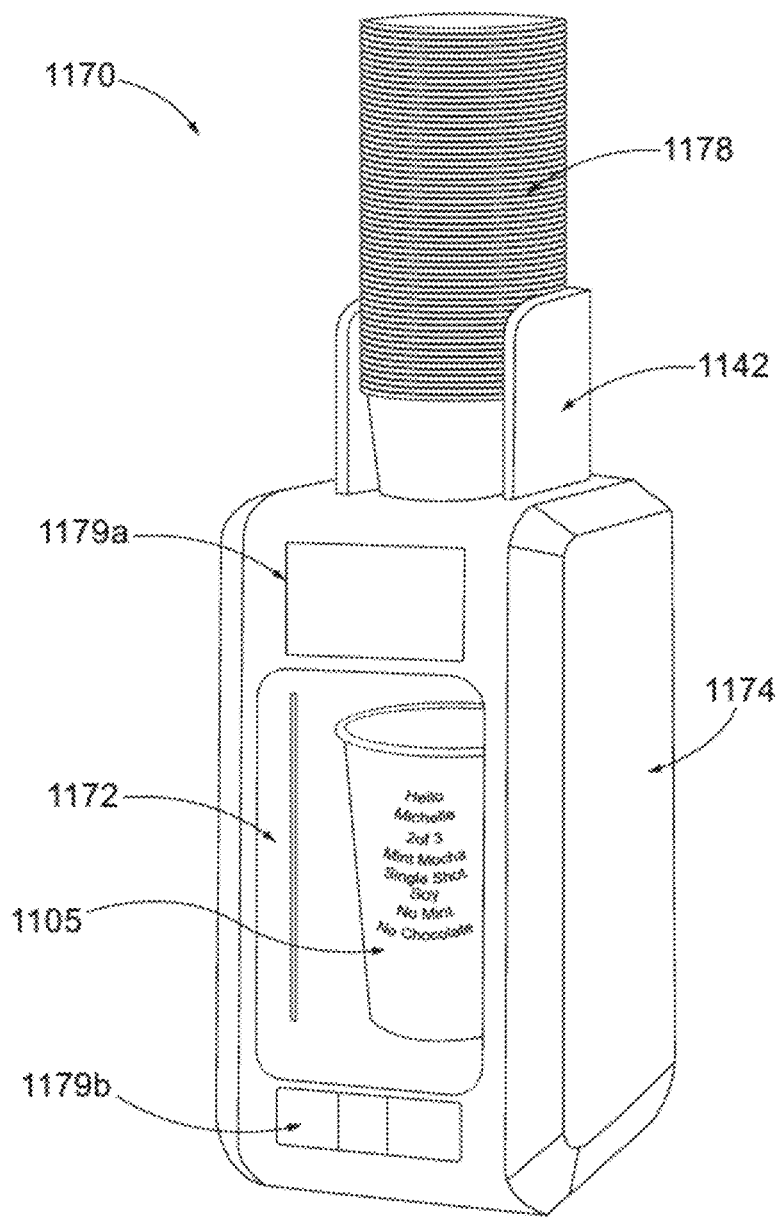
FIG. 10 illustrates an example cup dispenser, in accordance with some example embodiments discussed herein.
Figure 10A:
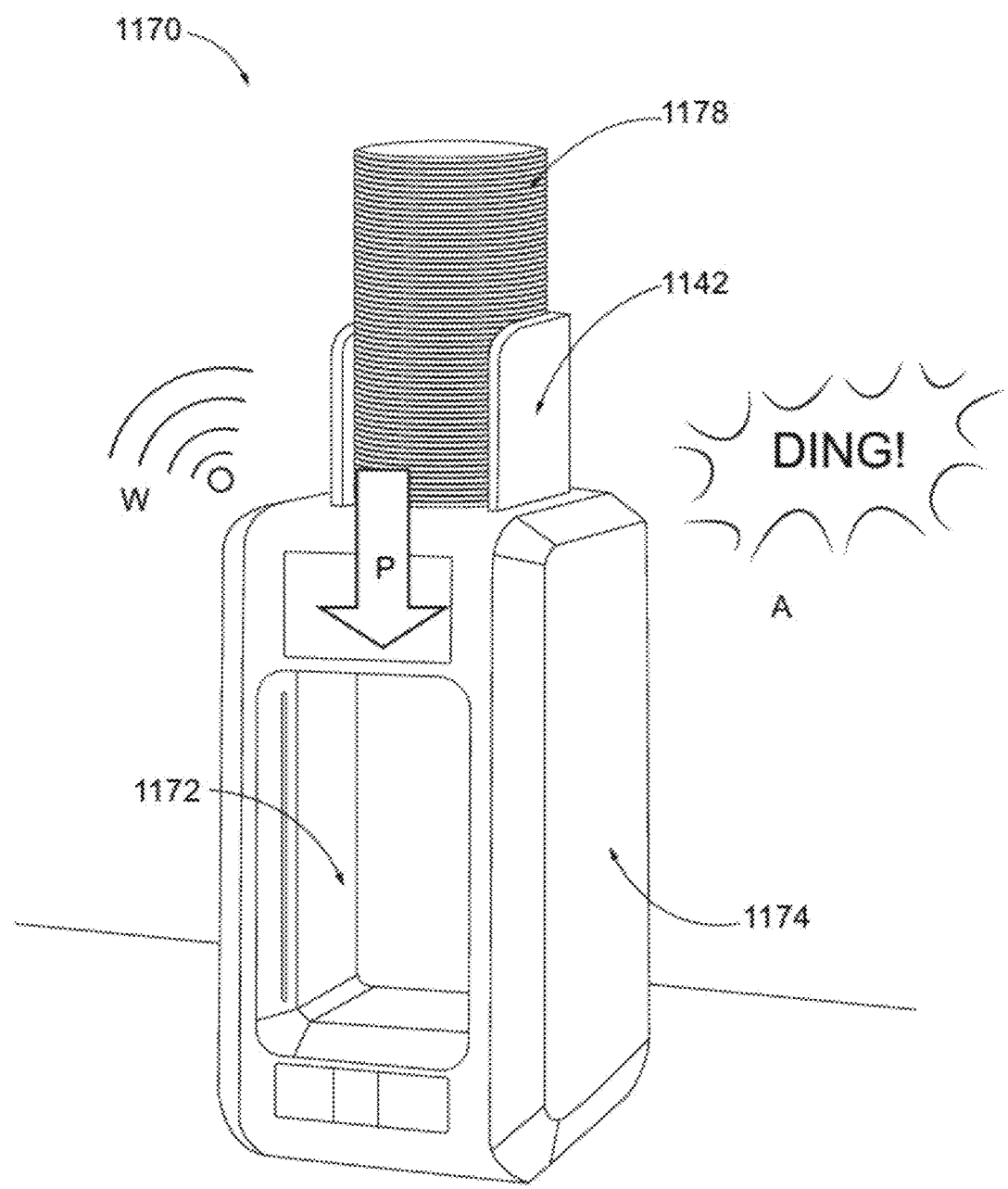
Figure 10B:
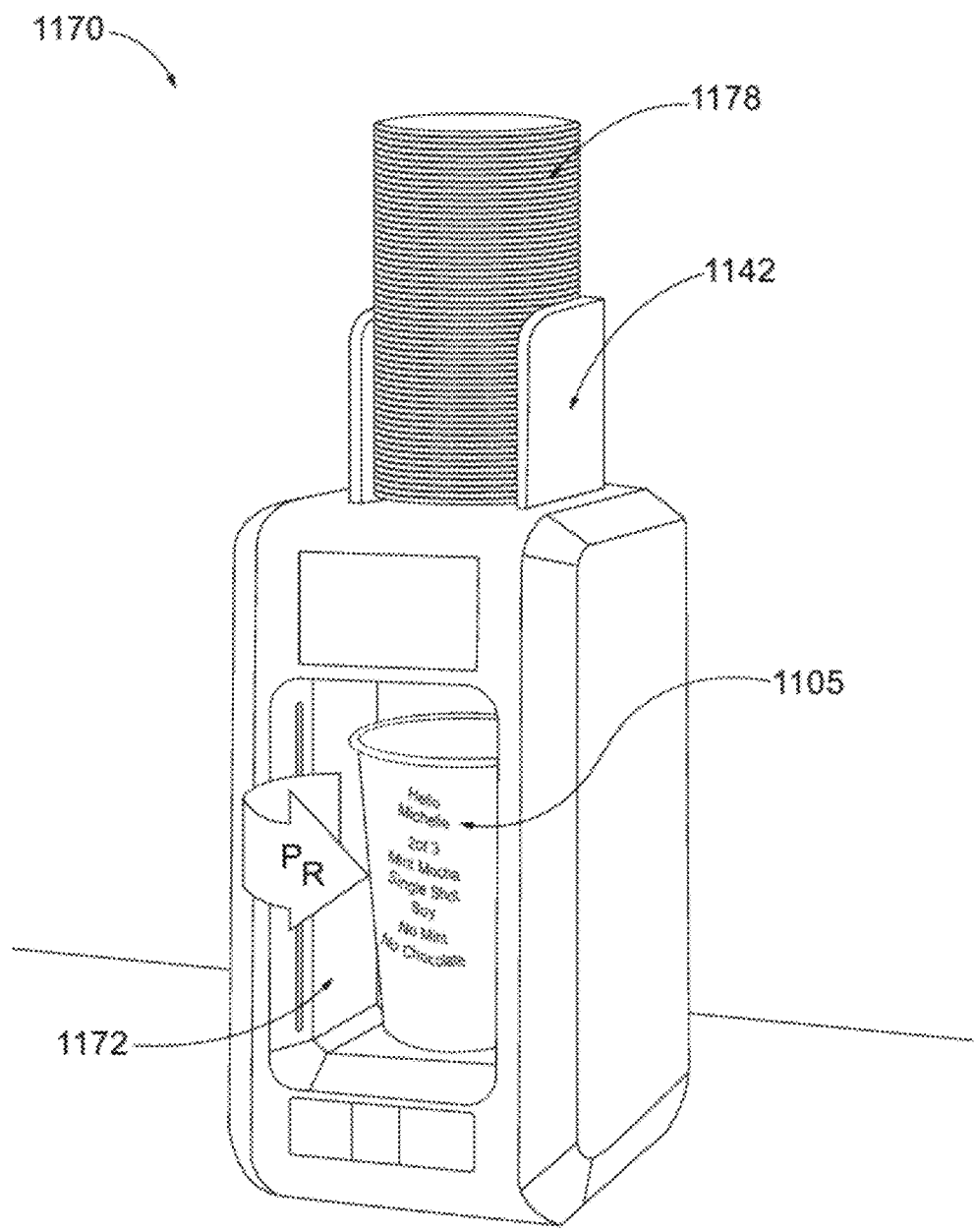
Figure 10C:
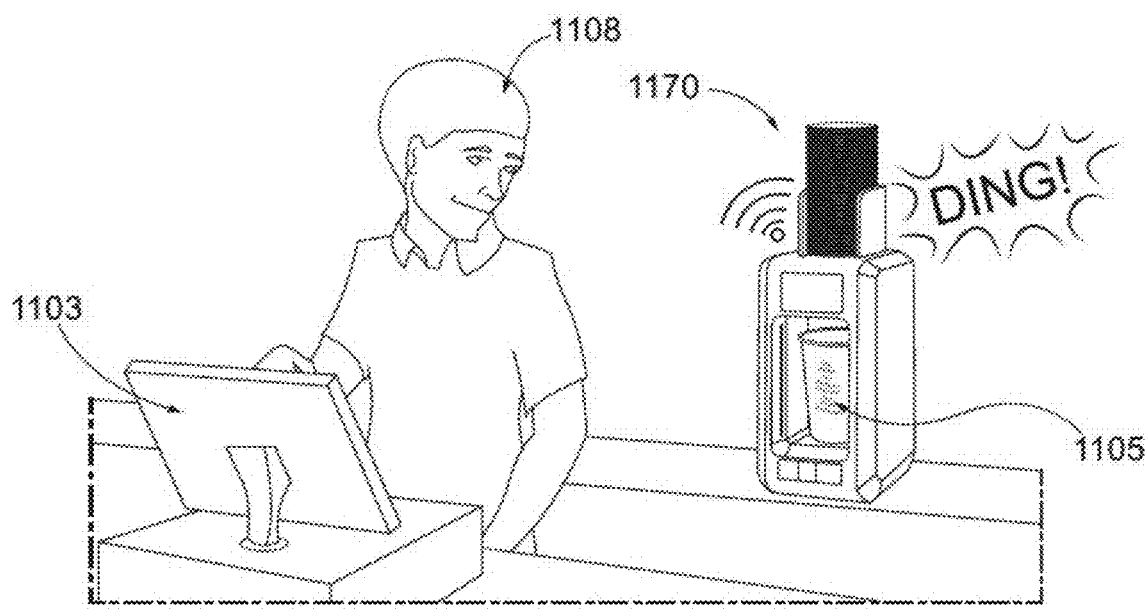
Figure 10D:
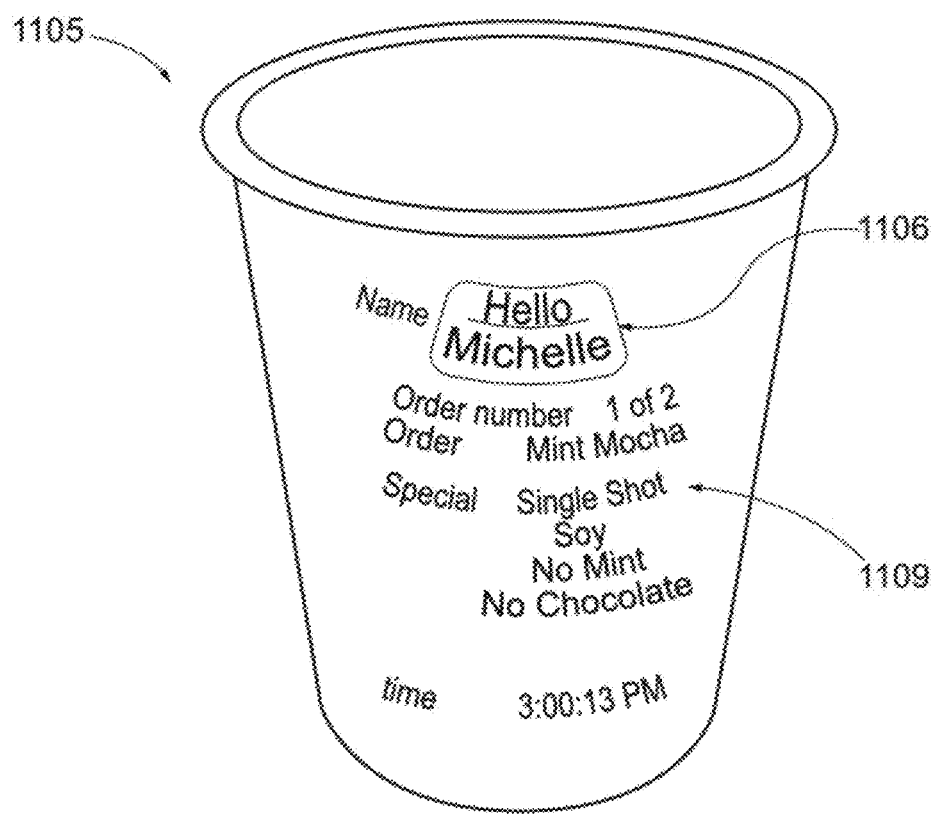
Figure 10E:
Figure 10F:
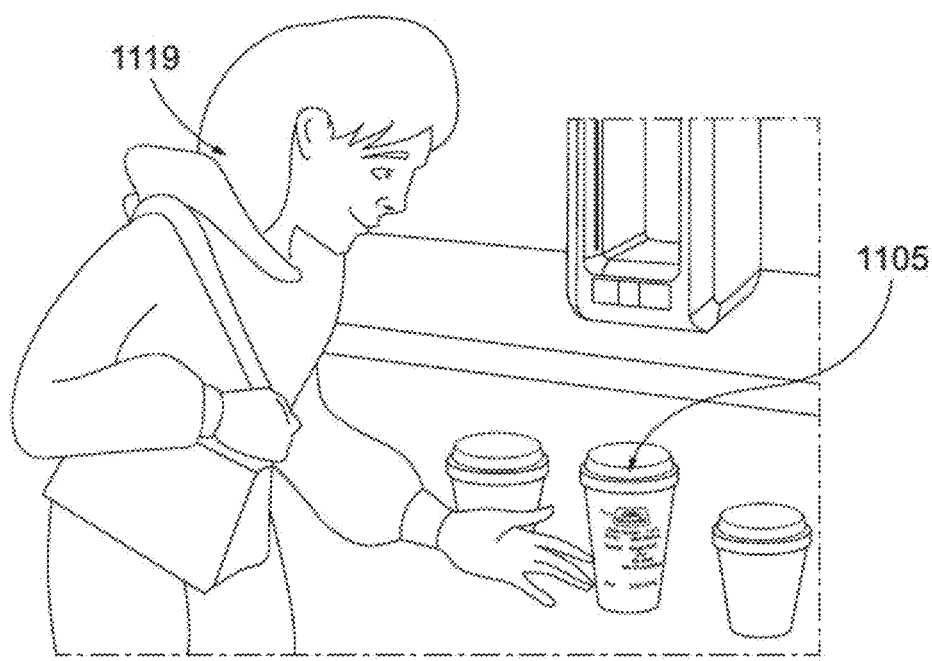
Figure 11:
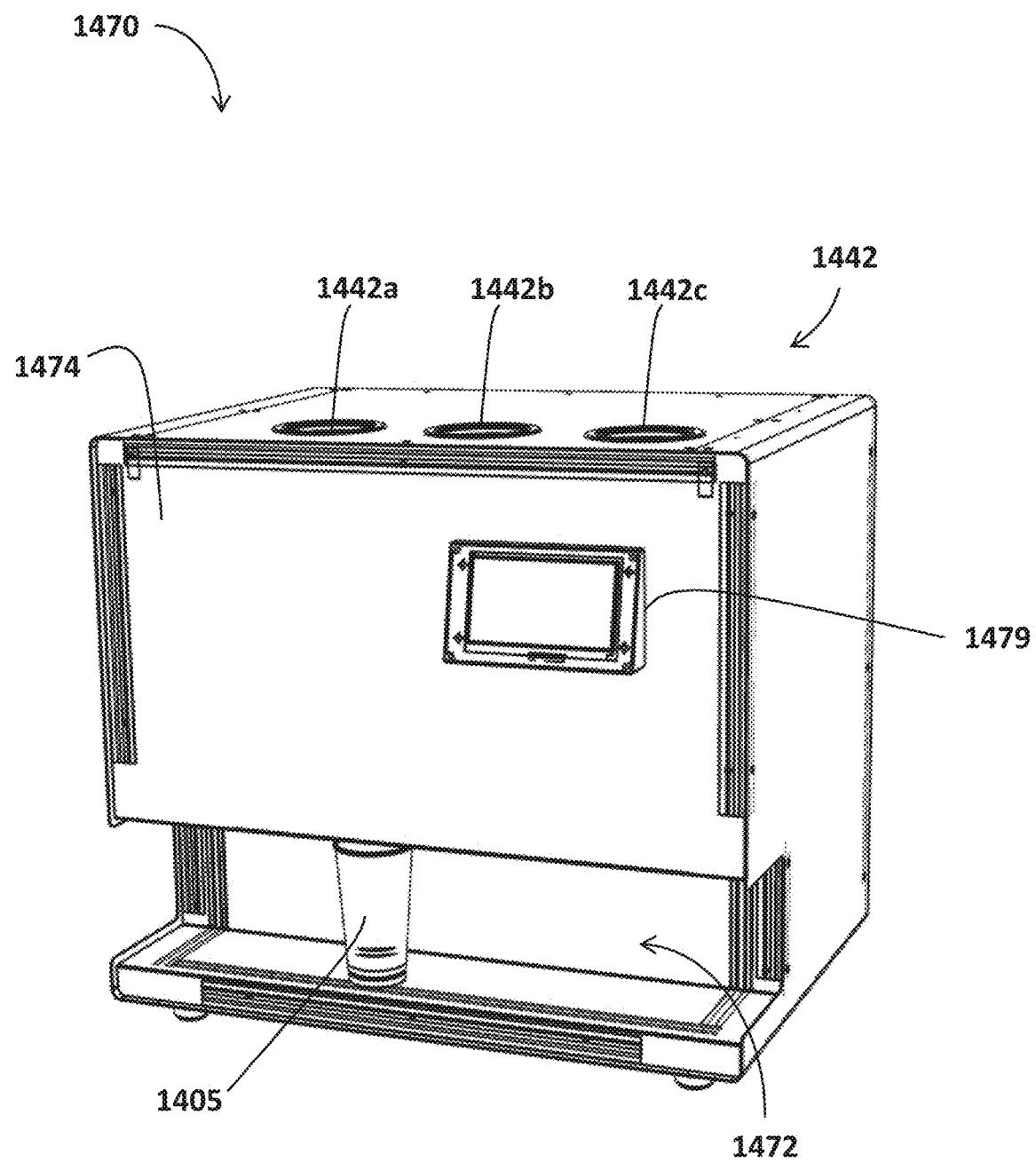
Figure 11D:
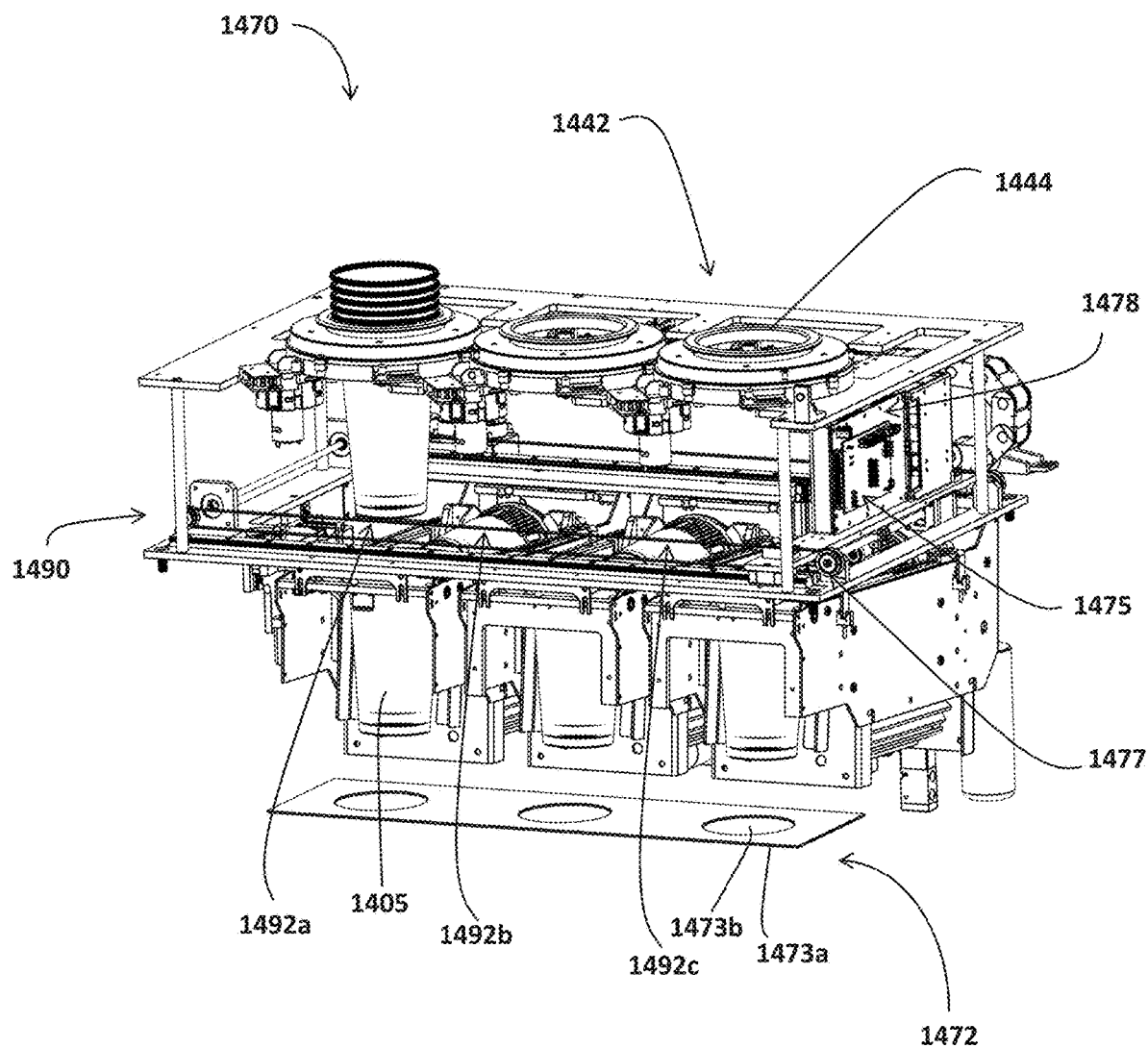
Figure 13:
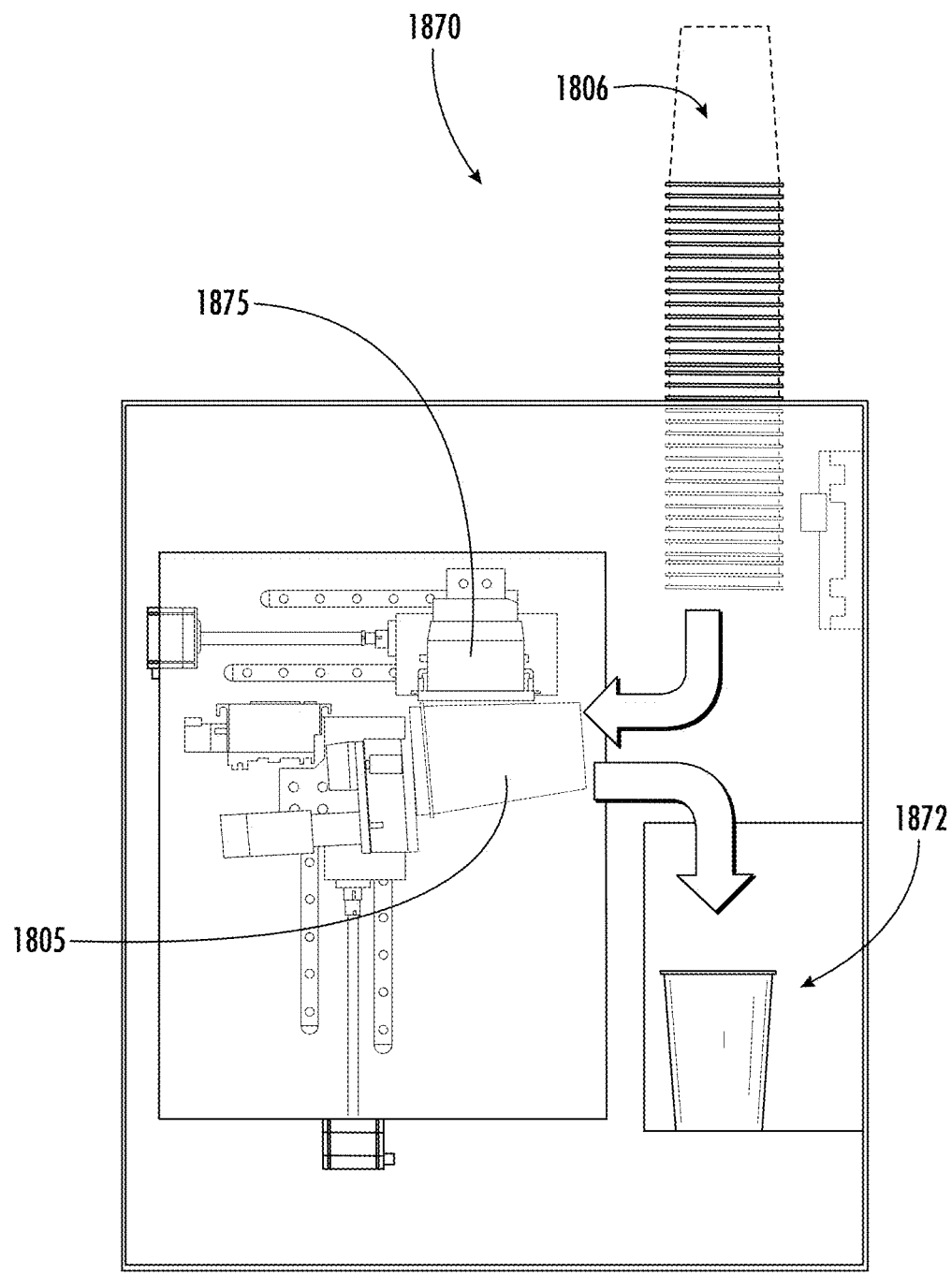
Figure 14A:
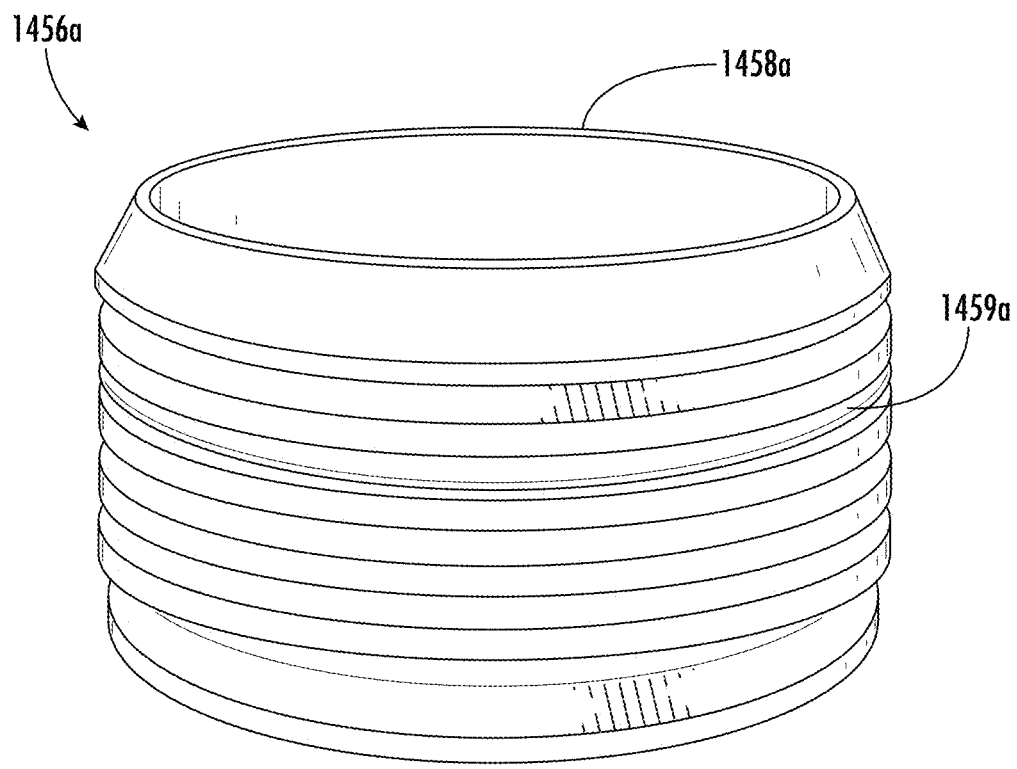
Figure 14B:
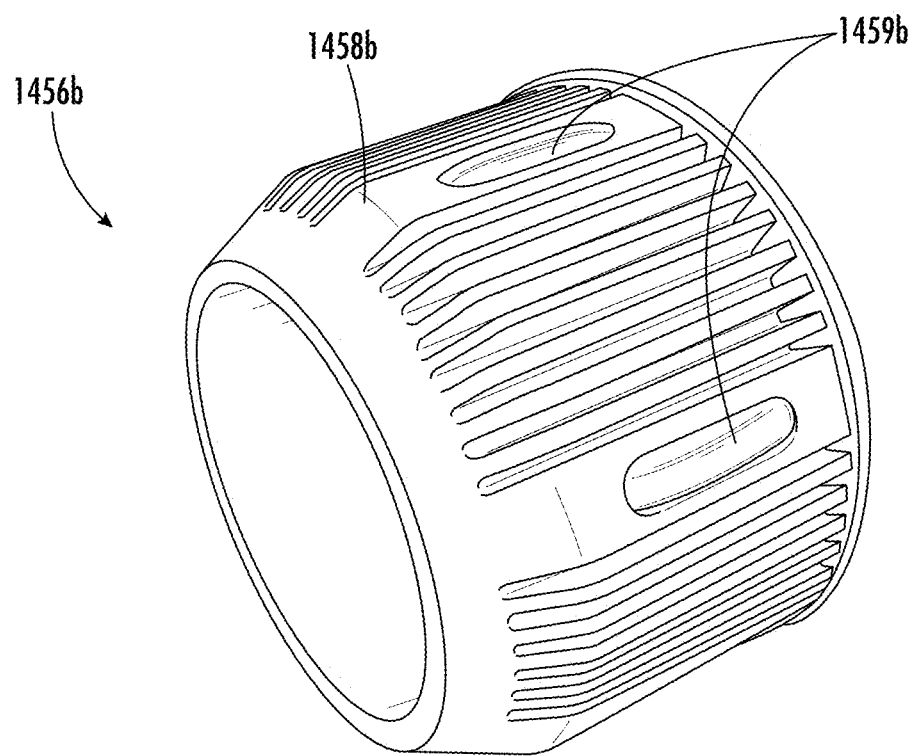
Figure 16:
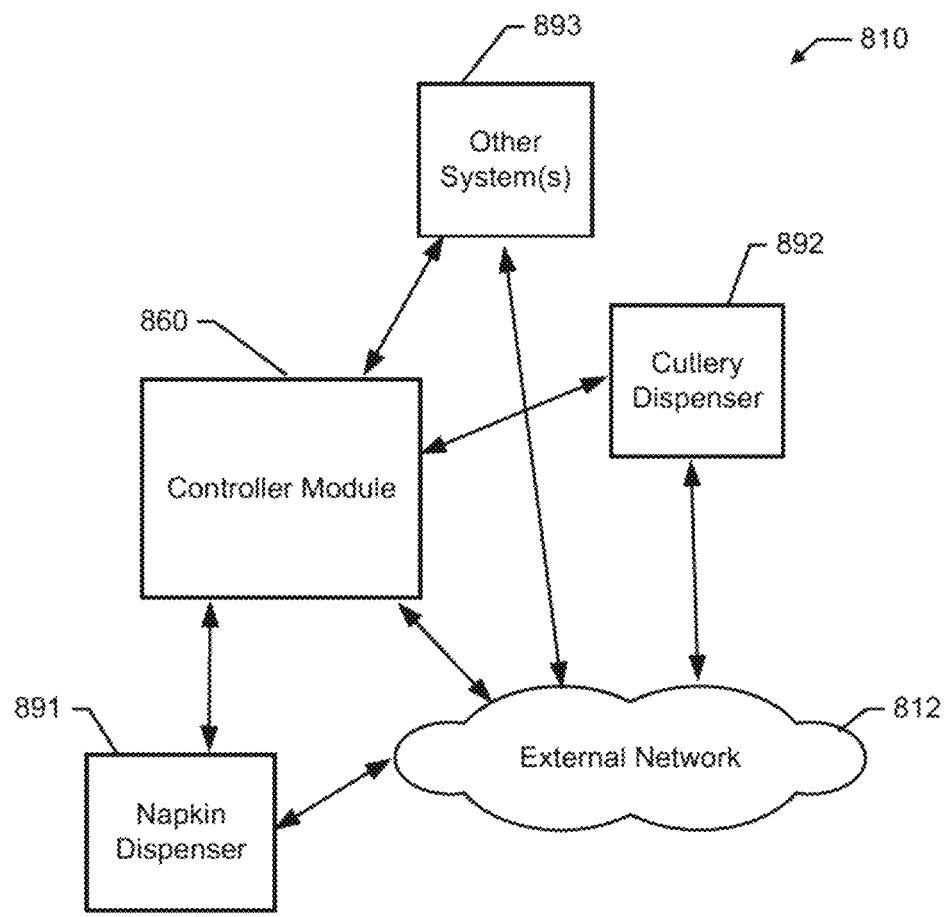
Figure 17:
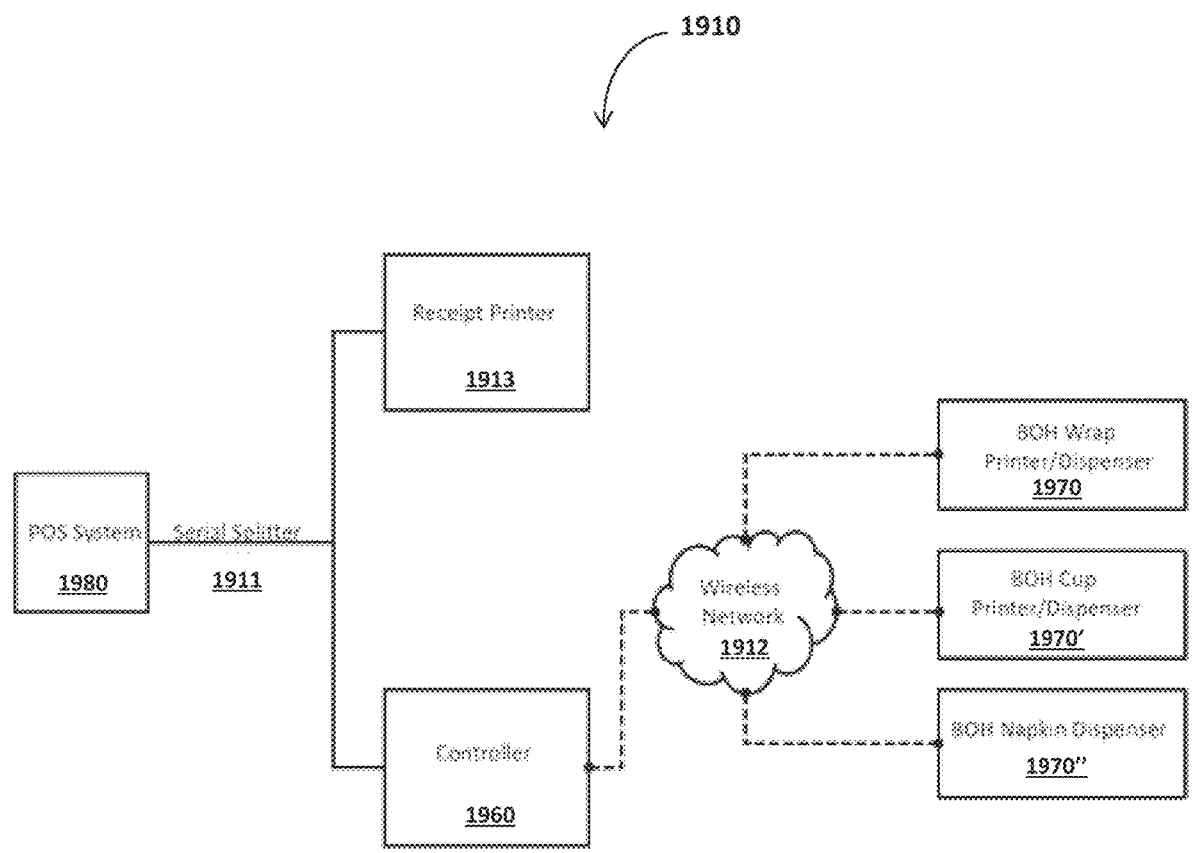
Figure 18:
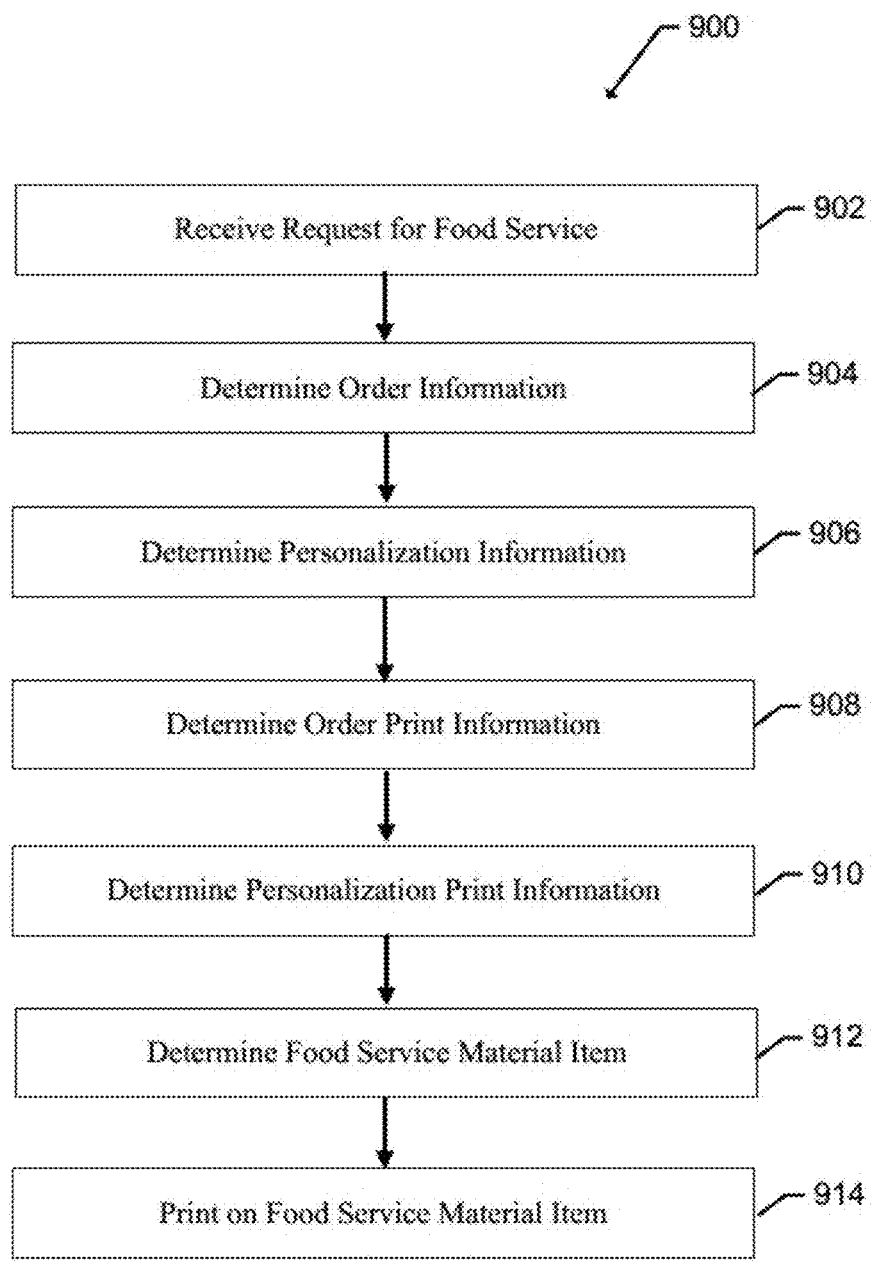

FIGS. 10A-B illustrate an example path for movement/rotation of a cup from a cup source through the cup dispenser shown in FIG. 10, in accordance with some example embodiments discussed herein;

FIG. 10C illustrates an example food service environment with a food service provider and the example cup dispenser shown in FIG. 10, in accordance with some example embodiments discussed herein;

FIG. 10D illustrates an example printed cup, in accordance with some example embodiments discussed herein;

FIG. 10E illustrates a scenario where a food service provider prepares the food service order in the printed cup, in accordance with some example embodiments discussed herein;

FIG. 10F illustrates a scenario where a customer is able to easily locate her food service order using the printed cup, in accordance with some example embodiments discussed herein;

FIG. 11 illustrates another example cup dispenser, in accordance with some example embodiments discussed herein;

FIGS. 11A-C illustrate example cups suitable for dispensing from the dispenser of FIG. 11 in accordance with various embodiments discussed herein;

FIG. 11D illustrates some inner components of the example dispenser shown in FIG. 11, in accordance with some example embodiments discussed herein;

FIGS. 12A-G illustrate various example components of the dispenser of FIG. 11, in accordance with some example embodiments discussed herein;

FIG. 13 illustrates an example cup pathway for an example dispenser, in accordance with some example embodiments discussed herein;

FIGS. 14A-B illustrate example mandrels suitable for use in the dispenser of FIG. 11 in accordance with various embodiments discussed herein;

FIG. 15 illustrates various example components of the dispenser of FIG. 11, in accordance with some example embodiments discussed herein;

FIG. 16 shows a block diagram of an example control system for controlling one or more additional dispensers/components/systems, such as various example front or back-of-house dispensers, in accordance with example embodiments described herein;

FIG. 17 shows a block diagram of an example data management and control system for controlling one or more additional dispensers/components/systems, such as various example front or back-of-house dispensers, in accordance with example embodiments described herein; and FIG. 18 illustrates a flowchart of an example method for providing on-demand food service material printing for food service, in accordance with some embodiments discussed herein.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

As used herein, unless otherwise specifically stated, directional terms are not meant to be absolute and can encompass various orientations that are near the stated direction (e.g., substantially or generally). For example, the term "horizontal" is not meant to be absolute and can encompass various orientations that are near horizontal (e.g., be substantially horizontal, be generally horizontal, etc.); the term "vertical" is not meant to be absolute and can encompass various orientations that are near vertical (e.g., be substantially vertical, be generally vertical, etc.); and the term "parallel" is not meant to be absolute and can encompass various relative orientations that are near parallel (e.g., substantially parallel, generally parallel, etc.).

As used herein, unless otherwise specifically stated, the term cup may refer any type of cup (e.g., beverage cup, soap container, ice cream container, etc.) configured to hold liquid or solid content therein. In some embodiments, a cup may be defined to include one or more circular or oval cross-sections, such as at the open end of the cup and/or the closed end of the cup (and/or at some cross-sectional position therebetween).

Example On-Demand Food Service Material Printing System

Figure 1:
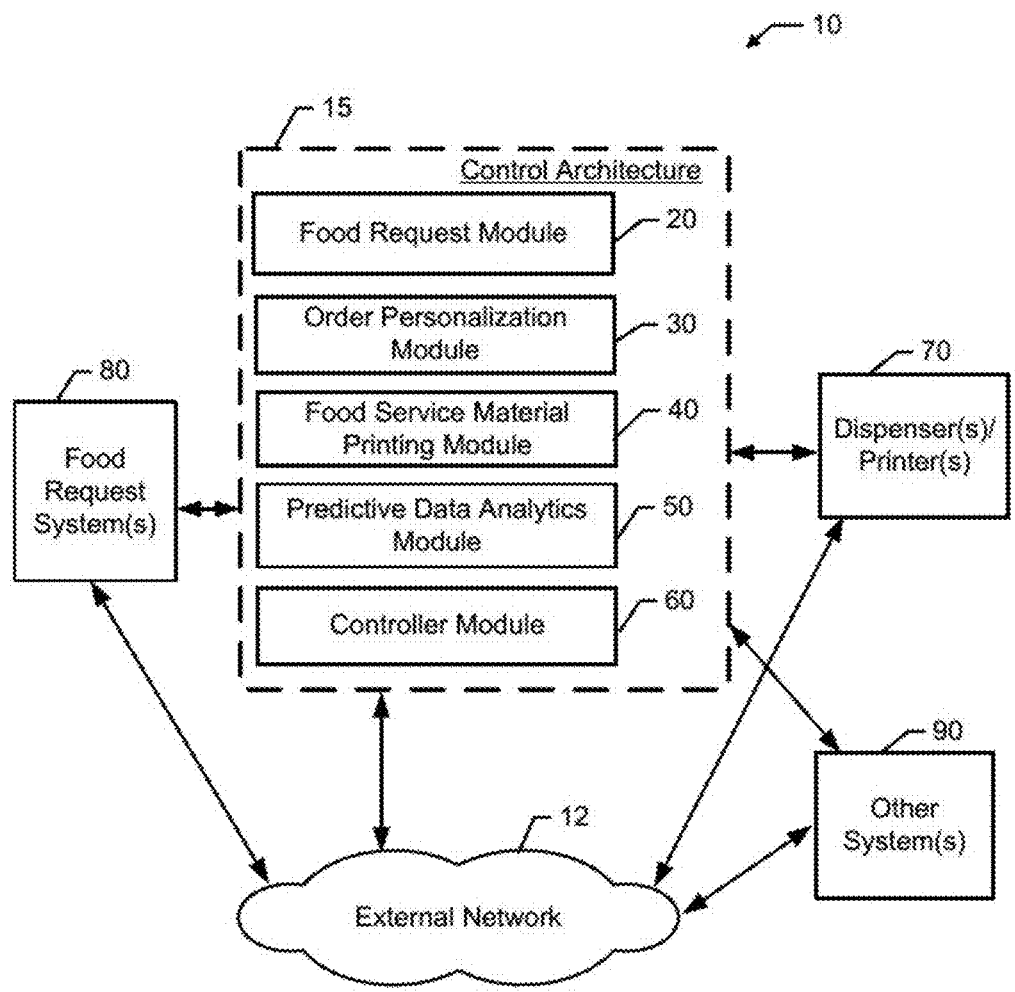
FIG. 1 shows a block diagram of an example on-demand food service material (e.g., cup) printing system, in accordance with some embodiments discussed herein.

FIG. 1 shows a block diagram of an example on-demand food service material (e.g., cup) printing system 10 for food service. The depicted system 10 includes a number of modules, architectures, systems, and/or devices that are configured to work together to perform various functions, including providing on-demand food service material printing. In the depicted embodiment, the system 10 includes a control architecture 15, food request system(s) 80 (e.g., point-of-sale (POS) system(s)), cup and other food service material dispenser(s)/printer(s) 70, an external network 12, and other system(s) 90 (e.g., front of house (FOH) or back-of-house (BOH) system(s)).

In some embodiments, various controllers, including for example from the control architecture 15, the food request 80, the dispenser(s)/printer(s) 70, the other system(s) 90, or a remote computer server, may be configured to communicate with and/or control operation of various components of the system 10 such as according to various functions/modules described herein. In such a regard, while the depicted embodiment shows various particular modules, architectures, systems, and/or devices, some embodiments of the present invention contemplate many variations, including additional modules, architectures, systems, and/or devices and/or combinations in whole or part thereof. Additionally, while much of the described examples are detailed for printing on cups (e.g., beverage cups, soup containers, ice cream containers), some embodiments of the present invention are contemplated for use with one or more other food service material dispensers/printers, including, for example, dispensers/printers for food wrap, food containers, lids, carry-out bags, tray liners, napkins, pouches, among many other things. In various aspects, the food service material may also have printed thereon the same or different order information or personalization information as that printed on one or more cups associated with the food service order.

The control architecture 15 may include one or more modules that are configured to perform various functions of the system 10. In the depicted embodiment, the control architecture 15 includes a food request module 20, an order personalization module 30, a food service material printing module 40, a predictive data analytics module 50, and a controller module 60. Though shown as distinct modules, some modules may be configured to share functionality. Likewise, various combinations of functionality is contemplated across the various modules.

As described in more detail herein, the control architecture 15 provides logic and control functionality used during utilization of the various modules and/or systems of the on-demand food service material (e.g., cup) printing system 10. The control architecture 15 and/or its various modules may comprise (or be connected to) hardware and software to enable performance of various functions described herein. Along these lines, the modules may share functionality across distinct hardware (e.g., among various servers, controllers, various systems described herein (e.g., food request system(s), printer(s), other system(s)), etc.) including in different locations and/or different apparatuses.

The control architecture 15 may comprise one or more suitable electronic device(s)/server(s) capable of executing described functionality via hardware and/or software control. In some embodiments, the control architecture 15 may include one or more user interfaces (not shown), such as for displaying information and/or accepting instructions. The control architecture 15 can be, but is not limited to, a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a solid-state computer, a single-board computer, a buffered computer, a computer network, a desktop computer, a laptop computer, a personal digital assistant (PDA) or a hybrid of any of the foregoing.

The control architecture 15 may be configured to communicate with various components of the system 10, such as directly or through an external network 12. In some embodiments, the control architecture 15 may be operably coupled with one or more components of the system 10, including for example, the food request system(s) 80, dispenser(s)/printer(s) 70, other system(s) 90, controllers, processors, communication interfaces, and other components (such as described herein) to provide functionality for the system 10. For example, depending on the components, the control architecture 15 may be operably coupled such as through use of solid-core wiring, twisted pair wiring, coaxial cable, fiber optic cable, mechanical, wireless, radio, infrared, or any other suitable connection. In this regard, depending on the components, the operable coupling may be through one or more intermediate controllers or mechanical coupling, such as used for controlling some components (e.g., controlling operation of the printer(s) 70). In some embodiments, the control architecture 15 may be configured to provide one or more operating signals to these components and to receive data from these components.

The control architecture 15 may include one or more processors coupled to a memory device. Control architecture 15 may optionally be connected to one or more input/output (I/O) controllers or data interface devices (not shown). The memory may be any suitable form of memory such as an EPROM (Erasable Programmable Read Only Memory) chip, a flash memory chip, a disk drive, or the like. As such, the memory may store various data, protocols, instructions, computer program code, operational parameters, etc. In this regard, a controller may include operation control methods embodied in application code. These methods are embodied in computer instructions written to be executed by one or more processors, typically in the form of software. The software can be encoded in any suitable language, including, but not limited to, machine language, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software. In this regard, in some embodiments, the control architecture 15 may be configured to execute computer program code instructions to perform aspects of various embodiments of the present invention described herein.

In some embodiments described herein, various components (e.g., modules, systems, architectures) of the system 10 may be configured to determine various things. As used herein, "determine" is not meant to be limiting and may include, for example, determining a selection, determining something from one or more instructions, generating something.

Example Food Request Module and/or Systems

The control architecture 15, such as through the food request module 20, is configured to receive a request for food service by a customer, such as from one or more food request systems 80. The request for food service may include order information corresponding to a food order by the customer. Such a food order may include any consumable (e.g., a drink) and is not meant to be limiting.

In some embodiments, the request may include a purchase (e.g., a sale, a utilization of loyalty points, etc.) for the request, such as using a point-of-sale (POS) system. Additionally or alternatively, some or all of the request may not include a purchase. For example, the food request may be requested in conjunction with a non-purchase program (e.g., all-inclusive resort, charity, etc.) and, thus, no purchase or sale may be required.

In some embodiments, a customer may provide one or more custom order characteristics along with the request for food service. Example custom order characteristics may include order preferences, dietary preferences, exceptions to a standard food order (e.g., extra cheese or no tomatoes, extra ice), among others.

The food request module 20 may be further configured to determine order information based on the request for food service. For example, the food request module 20 may determine one or more food orders (e.g., food or drink items) that the customer has requested. Additionally, the food request module 20 may determine one or more custom characteristics that are specific to the request, such as being related to one or more of the food orders for the request.

Depending on the configuration of the food service and/or store for food service, example on-demand food service material (e.g., cup) printing systems 10 may include one or more food request systems for interaction with a customer. Some non-limiting example food request systems 80 include a self-order kiosk, a point-of-sale (POS) operator terminal, an application stored on a remote device (such as a customer's personal device), a web-based application (e.g., via a web browser), a cloud-based application, a computer server, and combinations thereof.

Figure 2:
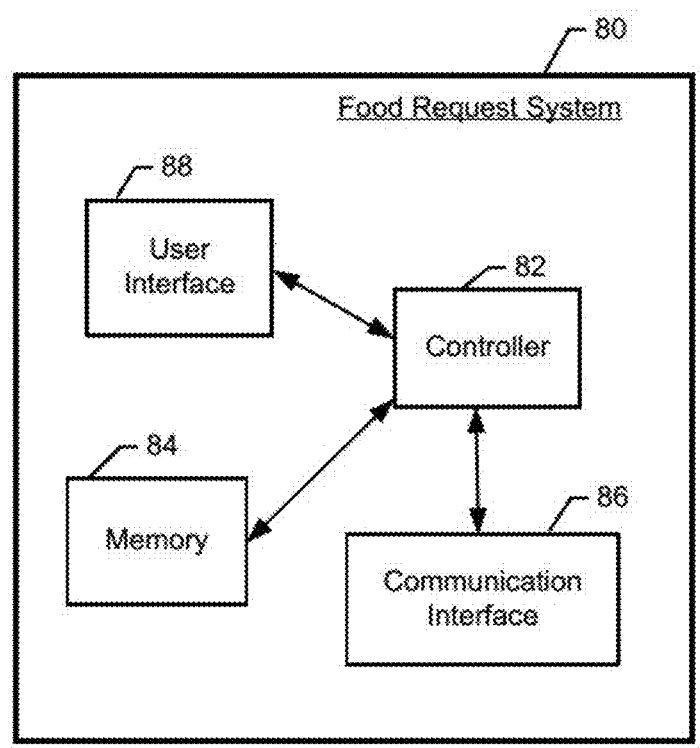
FIG. 2 shows a block diagram of an example food request system, in accordance with some embodiments discussed herein.

With reference to FIG. 2, an example food request system 80 may comprise hardware and/or software capable of performing one or more functions described herein. In this regard, the food request system 80 may include a controller 82, a memory 84, a communication interface 86, and a user interface 88.

The controller 82 may be configured to execute various programmed operations or instructions stored in a memory device such as a device or circuitry operating in accordance with software or otherwise embodied in hardware or a combination of hardware and software, thereby configuring the device or circuitry to perform the corresponding functions of the controller 82 as described herein. In this regard, the controller 82 may be configured to receive one or more requests for a food order from a customer, such as through the user interface 88. Additionally, in some embodiments, the controller 82 may receive and/or determine additional information regarding the customer (e.g., personalization information). The controller 82 may also be configured to send gathered information and/or instructions to other devices, systems, or modules to perform various functions described herein. In some embodiments, the controller 82 may be configured to operate according to one or more modules described herein.

The memory 84 may be configured to store instructions, computer program code, order data (e.g., order information), personalization information, and other data/information associated with the food request system 80 in a non-transitory computer readable medium for use, such as by the controller 82.

The communication interface 86 may be configured to enable connection to external systems (e.g., an external network 12, one or more dispenser(s)/printer(s) 70, a customer's mobile device, a computer server, the control architecture 15, and/or one or more other system(s)/device(s)). In some embodiments, the communication interface 86 may comprise one or more transmitters configured to transmit, for example, one or more signals according to example embodiments described herein. Likewise, the communication interface 86 may include at least one receiver configured to, for example, receive data according to example embodiments described herein. In some embodiments, the transmitter and receiver may be combined as a transceiver. In this regard, the food request system 80 may be configured for wired and/or wireless communication. In some embodiments, the communication interface 86 may comprise wireless capabilities for WiFi, Bluetooth, or other wireless protocols. In some embodiments, the food request system 80 may be connected, such as through Bluetooth, to one or more printer(s) 70 such as to enable performance of various functions herein.

The user interface 88 may be configured to receive input from a user and/or provide output to a user. The user interface 88 may include, for example, a display, a keyboard, keypad, function keys, mouse, scrolling device, input/output ports, touch screen, or any other mechanism by which a user may interface with the system. Although the user interface 88 is shown as being directly connected to the controller 82 and within the food request system 80, the user interface 88 could alternatively be remote from the controller 82 and/or food request system 80. Likewise, in some embodiments, other components of the food request/POS system 80 could be remotely located.

Figure 2A:
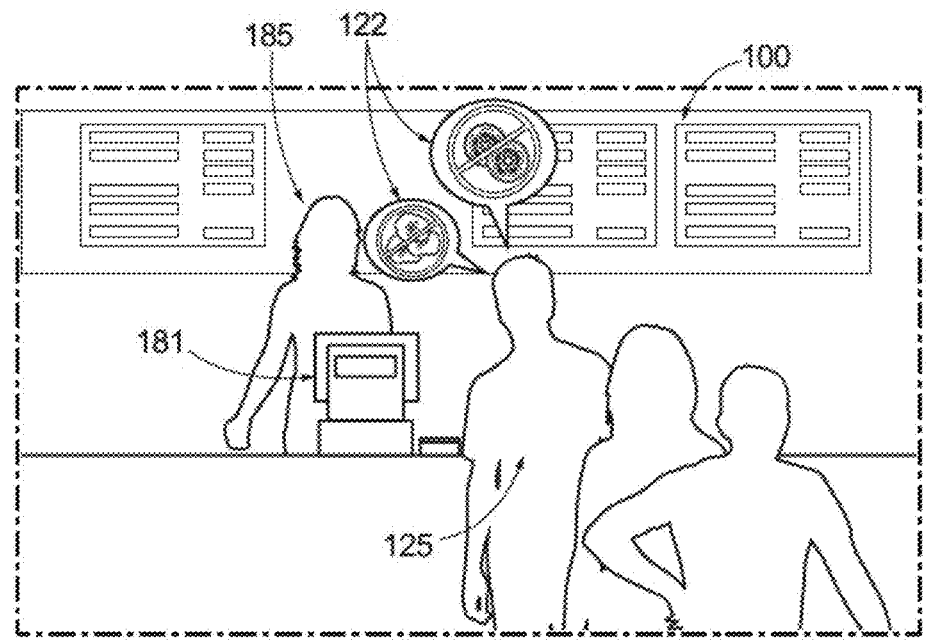
FIGS. 2A-2C illustrate example ways to submit a request for food service for an example on-demand food service material printing system, in accordance with some embodiments discussed herein.

FIG. 2A illustrates an example food service environment 100 where a customer 125 has placed a request for a food service with a food service employee 185 that is using a POS operator terminal 181. In the depicted illustration, the customer 125 has ordered a large soda and a hamburger (e.g., a food order), the soda being cherry cola (with light ice) and the hamburger having no tomatoes and no pickles (e.g., custom order characteristics). In response, the food service employee 185 has entered the request into the POS operator terminal 181. In such an example, the food request module 80 receives the request for food service from the POS operator terminal 181.

Figure 2B:
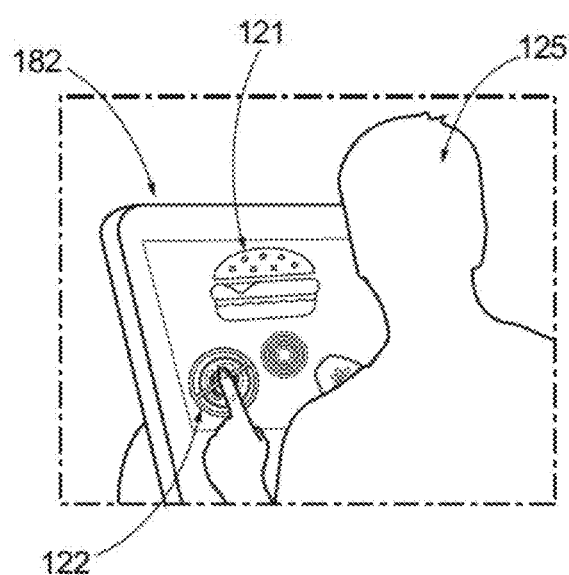

FIG. 2B illustrates a similar request for food service by a customer 125 at a self-order kiosk 182. In the illustration, the customer 125 selects the food order 121 (e.g., a soda and hamburger) and provides one or more custom characteristics (e.g., light ice, no tomatoes). In such an example, the food request module 20 receives the request for food service from the self-order kiosk 182.

Figure 2C:
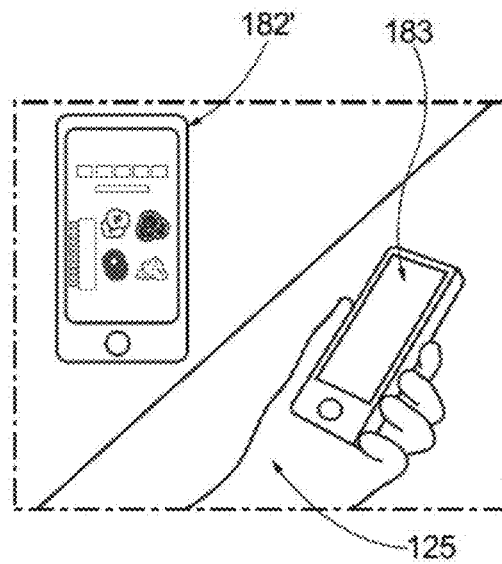

FIG. 2C illustrates two example ordering options, namely a self-order kiosk 182' and a customer's personal device 183. In this regard, in some embodiments, the customer 125 may submit a request for food service through a remote device, such as a mobile phone device 183. That request may then be provided to the food request module 20 such as through an application on the user's mobile device or through a computer server (e.g., through an online ordering system).

As noted herein, although the above descriptions detail examples of a self-order kiosk, a POS operator terminal, and an application on a user's mobile device, other food request systems are contemplated by various example embodiments. For example, a user may place a food request through an online ordering system (e.g., a web-based or cloud-based application). In such an example, or through other contemplated food request systems (e.g., self-order kiosk, application, POS operator terminal, etc.), the food service request may be received through a computer server (e.g., an external network) that may be connected to the system 10.

Example Personalization Information

The control architecture 15, such as through the order personalization module 30, may be configured to determine personalization information related to the customer or store. Some example personalization information includes the customer's name, preferences, allergies, order/customer profile, other identifiers, preferred language(s), order history, social media data, other external data (including purchase and trend data), among other things.

In some embodiments, the personalization information may be gathered in various different ways. For example, in some embodiments, the customer may provide personalization information during the request. In some embodiments, personal information may be gathered based on the request. For example, the customer may be signed in to a profile during submittal of the request. In some embodiments, the personalization information may be gathered from purchase information provided during purchase of the food service (e.g., from the credit card, an account for the customer, a loyalty card, etc.). In some embodiments, personalization information may be gathered from publicly available data related to the customer, such as through social media, other databases, etc. In some embodiments, personalization information may be gathered, such as with the permission of the customer, from one or more personal devices of the customer—such as data stored on the device (e.g., pictures, profile data, history, online data, etc.). In some embodiments, the personalization information may be related to the location (e.g., region, the specific store, city, etc.) associated with the customer and/or the request for food service.

Example Print Module and Print Determination

The control architecture 15, such as through the food service material printing module 40, may be configured to determine print information to print on one or more food service material items. In this regard, in some embodiments, the food service material printing module 40 may be configured to communicate with one or more dispenser(s)/printer(s) 70 to cause the print information to be printed on the food service material item(s) using the one or more dispenser(s)/printer(s) 70.

Figure 3:
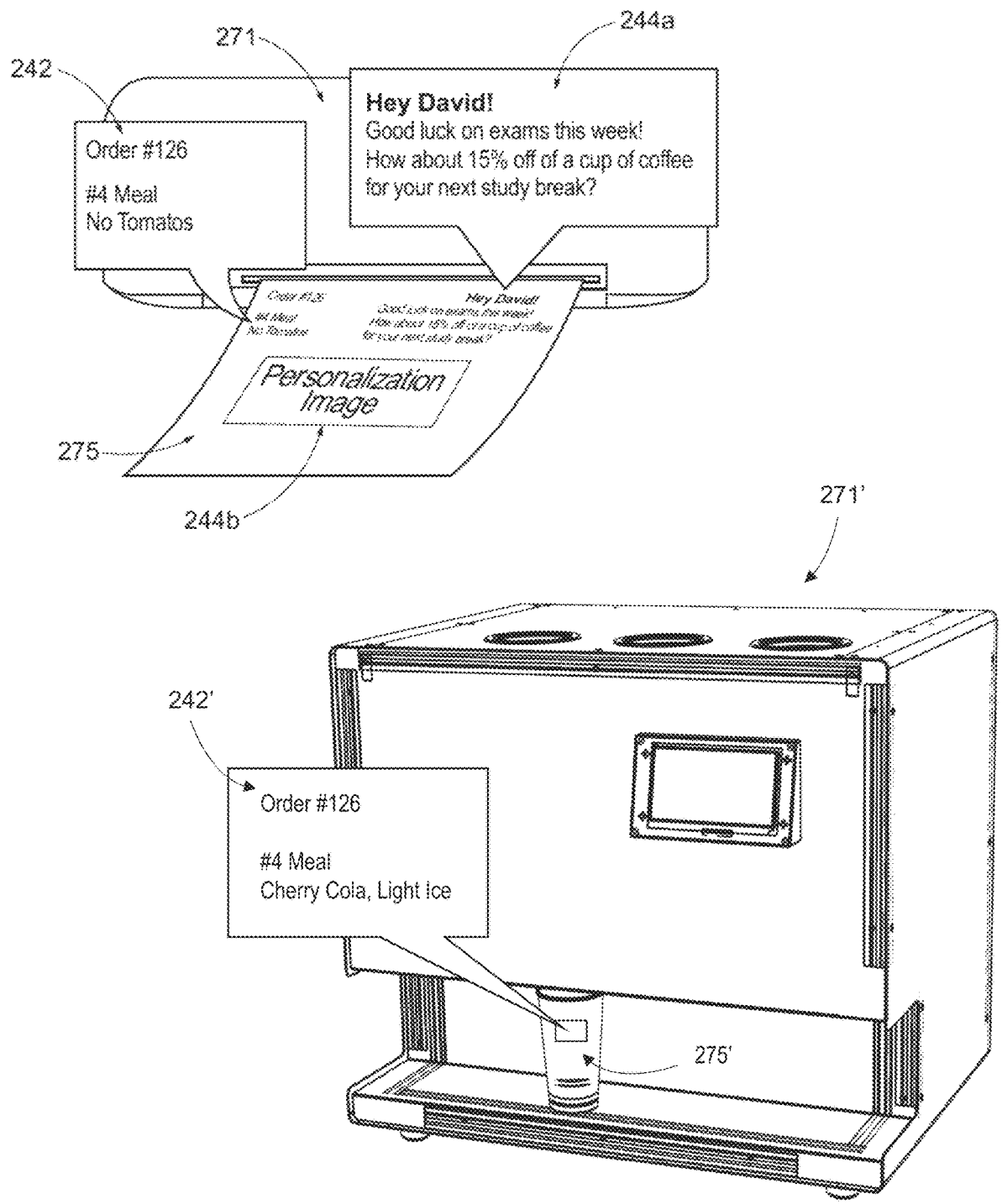
FIG. 3 illustrates example order print information and personalization print information for food service material items, in accordance with some embodiments discussed herein.

In some embodiments, the food service material printing module 40 is configured to determine, based on the order information from the food request module 20, order print information to print on at least one food service material item. In some embodiments, the order print information includes at least the food order and one or more custom characteristics that are specific to the request for food service. For example, FIG. 3 shows an example dispenser/printer 271 that is configured to print on a food service material item (e.g., a food wrap 275) and an example cup dispenser 271' that is configured to print on a cup 275'. In the depicted embodiment, the food service material printing module 40 has determined the order print information 242 to be printed on the food wrap 275 includes an order number ("Order #126"), an indication of the food order ("#4 Meal"), and a custom order characteristic ("No Tomatos") and the order print information 242' to be printed on the cup 275' includes the order number, and indication of the food order, and a custom order characteristic ("Cherry Cola, Light Ice").

In some embodiments, the order print information may include other order related information, such as ingredients and/or nutritional information. For example, the calorie count may be determined based on chosen ingredients and printed onto the food service material. In some such embodiments, the "basic", "common", or "advertised" make-up (e.g., ingredients) of the ordered food service item may form a base level calorie count. From there, the customization of the ingredients may be factored into the calorie count to produce a customized calorie count. In some embodiments, the base level calorie count and/or custom calorie count may be printed on the food service material (e.g., wrap 275, cup 275') for the consumer.

In some embodiments, the order print information may be designed to be presented to the customer with the food order. For example, the order print information (or a portion thereof) may be visible to the customer upon the customer receiving the food order. In such an example embodiment with the order print information printed on the food service material item, the customer may feel confident in the accuracy of their food order.

Figure 4A:
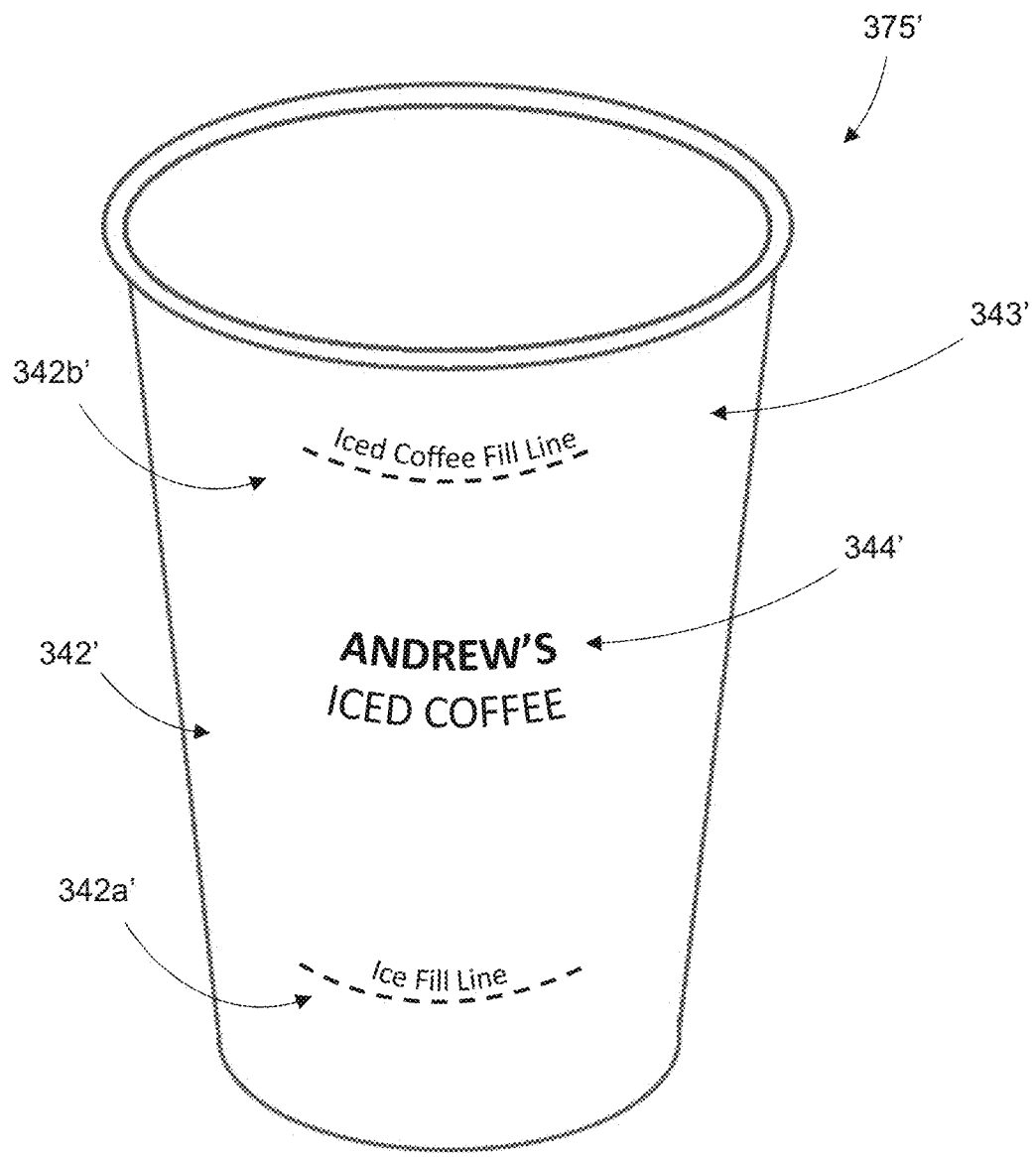
FIGS. 4A-4B illustrate example order print information and/or personalization print information for a cup, in accordance with some embodiments discussed herein.
Figure 4B:
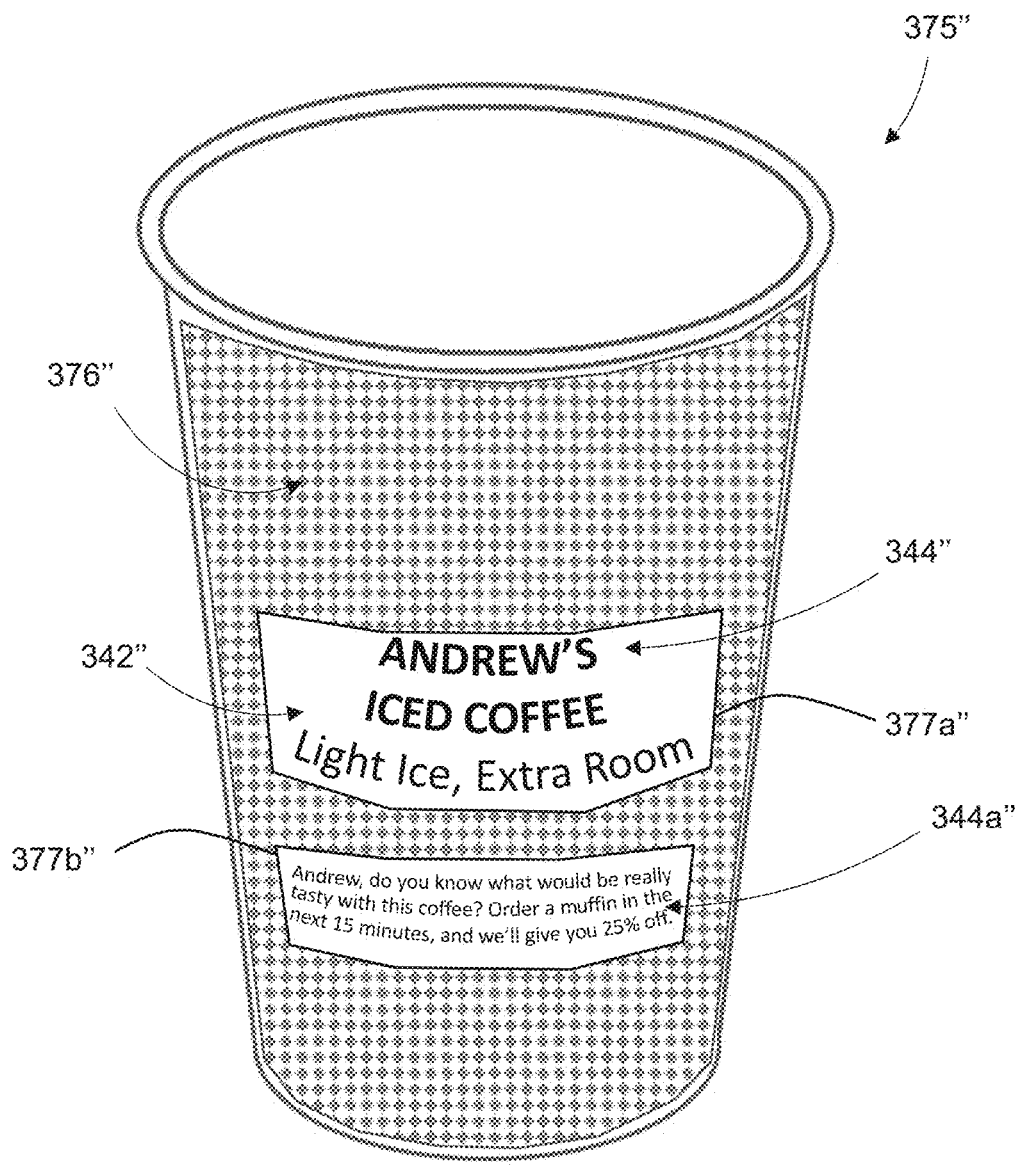

Additionally or alternatively, in some embodiments, one or more food service people may use the order print information during assembly of food order, thereby increasing accuracy of the food order. In this regard, in some embodiments, the order print information may be printed on the food service material item in a position or orientation such that it can be utilized during assembly of the food order by the food service person. For example, in some embodiments, the order print information may be printed in one or more positions on a cup to provide a food service person guidance as to the food order and custom characteristics thereof. For example, FIG. 4A illustrates an example cup 375' that has order print information 342' ("Iced Coffee") printed on an outer surface of the cup's sidewall 343', as well as line 342a' to provide instructions as to the desired fill level of ice (e.g., light ice) and line 342b' to provide instructions as to the desired fill level of coffee (e.g., extra room) in accordance with the custom characteristics of the food order. FIG. 4B provides another example, wherein the order print information 344" is printed on the cup 375" ("Iced Coffee, Light Ice, Extra Room"). Such example embodiments may help ensure order accuracy and speed, as a food service person may not need to constantly look back and forth between a monitor and the food order.

In some embodiments, the food service material printing module 40 may determine any form of communication to utilize for the order print information. For example, while example lines and/or text are shown in FIGS. 4A-B, other forms of communication are contemplated, such as text, lines, icons (e.g., ice cubes, a cherry for cherry cola), images, etc., and combinations thereof.

Similarly, in some embodiments, only positive ingredients may be printed on the food service material (e.g., only ingredients that the food service operator will need to add to complete the order). Such an example may help ensure the proper ingredients are utilized, not needing to rely on the memory of the food service operator.

In some embodiments, the food service material printing module 40 is configured to determine, based on the personalization information from the order personalization module 30, personalization print information to print on at least one food service material item. In some embodiments, the personalization print information includes personalization information and/or advertisement information. For example, FIG. 3 shows two example dispensers 271, 271' that are configured to print on food service material items (e.g., a food wrap 275, cup 275'). In the depicted embodiment, the food service material printing module 40 has determined to include the personalization print information 244a on the food wrap 275 with a greeting with the customer's name ("Hey David!"), a personalized message ("Good luck on exams this week!"), and an advertisement/promotion ("How about 15% off of a cup of coffee for your next study break"), though the same or different personalization information can additionally or alternatively be printed on the cup 275' (not shown). Additionally, the food service material printing module 40 has determined the personalization print information 244b to include an image, such as may be any image including, for example, a logo from a favorite or local sports team, college, etc., a picture from the camera roll of the customer, or other image. Although shown as "David" in the above example, in some embodiments, the customer's name may be any identifier for the customer, e.g., their name, their nickname, their first name, an avatar, a screen name, a user id, etc.

In this regard, in some embodiments, the personalization print information may be any suitable image, text, icon, etc. It may be related to the customer, the store, the location, or any other personalization feature. FIGS. 4A-B illustrate example cups that have personalization print information printed on an outer surface (e.g., a surface designed to face the customer after assembly). For example, FIG. 4A shows personalization print information 344' that includes the customer name in relation to the order information. FIG. 4B shows personalization print information 344" that includes the customer name in relation to a limited time offer (LTO) 344a'". However, in accordance with various embodiments of the present teachings, the personalization print information may additionally or alternatively include a personalized message (e.g., "Andrew, good luck on exams this week!"), an advertisement/service announcement/request for charity assistance (e.g., "Andrew, help us support Hurricane Harvey Relief"), and/or a promotion offer, all by way of non-limiting examples.

In some embodiments, the cup for on-demand printing in accordance with the present teachings may include pre-printed information. In such example embodiments, the order print information and/or personalization print information may be printed on the cup in addition to the pre-printed information. In some such embodiments, the order print information and/or personalization print information may need to account for such pre-printed information such as in content and/or positioning on the food service material item. As shown in FIG. 4B, for example, the cup may be pre-printed with a graphic (e.g., pattern 376", the store's name and/or logo). In addition, the pre-printed information may define one or more windows, for example, within which the cup dispenser may be configured to print on-demand order information or personalization information. For example, the pattern 376" in FIG. 4B defines two blank spaces (e.g., windows 377a,b") within which print information may be added.

In some embodiments, the personalization print information may be determined based on any number of factors. For example, the personalization print information may be determined to include one or more targeted messages and/or advertisements based on past habits (e.g., order history, time of orders, etc.) or projected habits of the customer. Additionally or alternatively, the food service business may wish to "push" or promote certain products or time windows for customers, which may be considered in determination of the personalization print information. Other possible factors include, for example, related/sister businesses (e.g., cross marketing), limited time offers, promotional offers, products or time windows for that store and/or corresponding location (e.g., region), preferences of the customer, etc. For example, the food service business may want to promote cheeseburgers in the region, because barbeque sandwiches are currently popular at that location.

In some embodiments, the personalization print information and/or order print information may be determined to be printed in a preferred language of the customer. In some embodiments, the preferred language may be determined from the personalization information. In some embodiments, the preferred language may be determined based on the location of the store in which the food order was requested. Similarly, in some embodiments, the personalization print information and/or order print information may be determined to be printed in braille, such as to accommodate the customer. For example, divots, imprints, or other features may be employed by the printer to manipulate the food service material item to product braille. In some embodiments, the determination to use braille may be based on the personalization information regarding the customer.

Figure 5A:
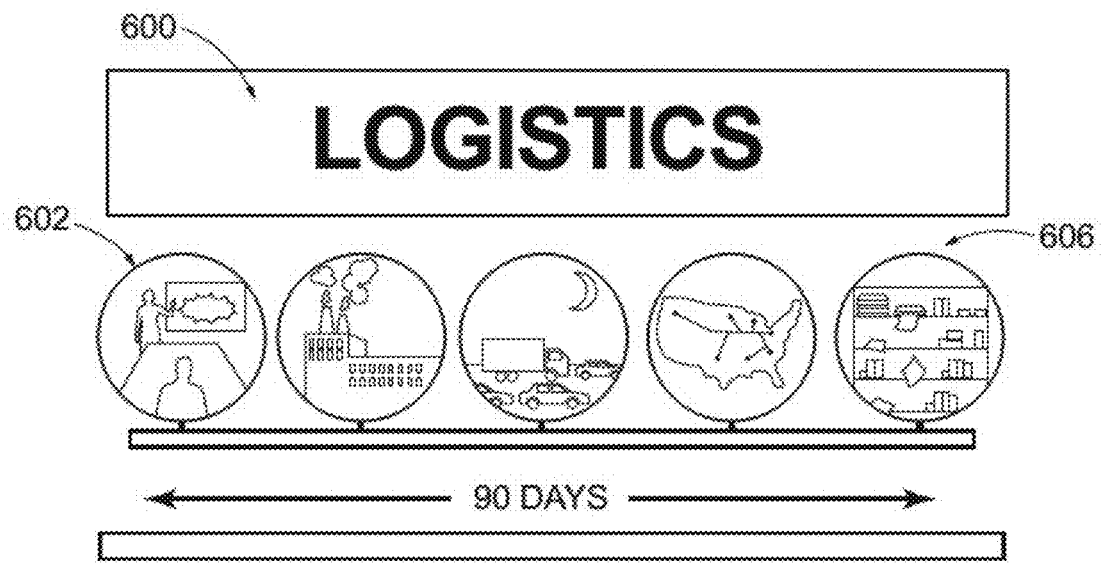
FIG. 5A illustrates a common logistics flow from creation of a promotion to supplying a store with promotional material.
Figure 5B:
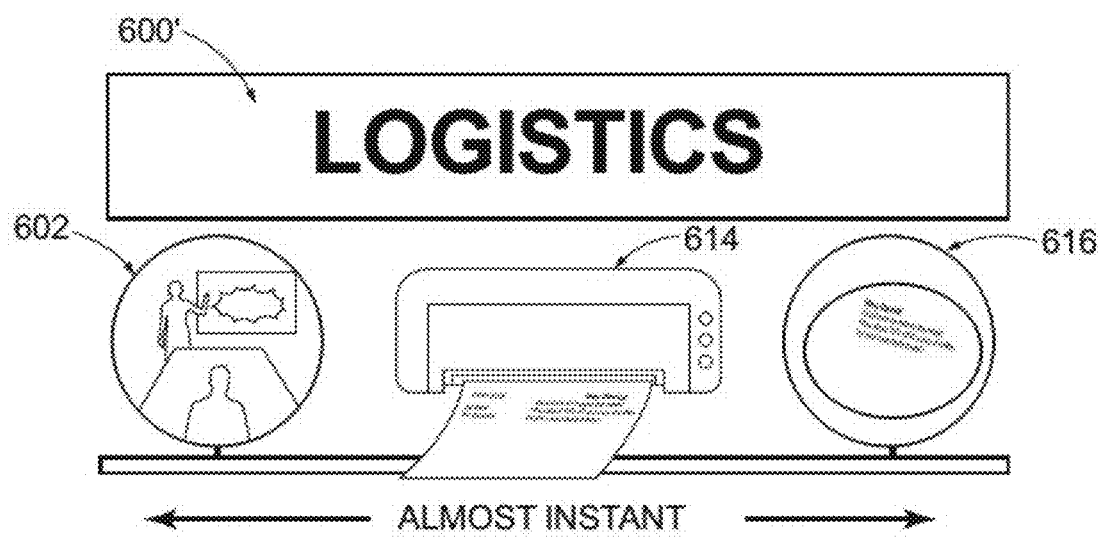
FIG. 5B illustrates an example logistics flow from creation of a promotion to packaging a food order using an example on-demand food service material printing system, in accordance with example embodiments described herein.

In some embodiments, the personalization print information may be determined in real-time, such as while the food service request is being processed. In this regard, updated information can be utilized at the time the food service request is being placed. This allows current information to be utilized in determining what to print on the food service material item. For example, the food service business may have just come up with a new promotion. Once the system is updated with the available new promotion, it can be used by the on-demand cup printing system 10. This avoids the previous long logistics time frame it took from a decision to implement a new promotion to available food service material with the new promotion. Instead, the update may be instantaneous. For example, FIG. 5A illustrates a common prior logistics flow 600 from creation of a promotion 602 to supplying a store with promotional material 606. That logistics flow would often take at least 90 days. FIG. 5B, however, illustrates an example logistics flow 600' according to various example on-demand food service material printing systems. That logistics flow 600' is almost instant from creation of a promotion 602 to availability of personalization print information for printing on the food service material item at 614 and for providing to the customer at 616.

In some embodiments, the control architecture 15 may include an advertisement module configured to determine one or more advertisements (e.g., a promotion, limited time offer, etc.) to print on the food service material item. In some embodiments, the advertisement module may work in conjunction with or replace portions of the food service material printing module 40.

In some embodiments, the control architecture 15, such as through the predictive data analytics module 50 and/or food service material printing module 40, may be configured to determine one or more messages and/or advertisements to provide to the customer based on the personalization information. In some embodiments, the predictive analytics module 50 and/or food service material printing module 40 may take into account gathered order information and/or personalization information from a plurality of food order requests. Such considered order and/or personalization information may be bounded/limited according to a time threshold (e.g., between 11 am-3 pm, within the last 30 days, etc.) and/or location threshold (e.g., just this store, stores within 25 miles, etc.).

In some embodiments, the predictive data analytics module 50 and/or food service material printing module 40 may be configured to determine a message to provide based on a determined product, time window, promotion, limited-time-offer, etc. For example, the food service business may determine that they wish to "push" customer traffic in the store after 5 pm. The predictive data analytics module 50 and/or food service material printing module 40 may determine, such as based on the customer history, that the customer that just placed an order usually orders chicken strips between 11 am-3 pm. Additionally, the predictive data analytics module 50 and/or food service material printing module 40 may determine that the food service business wants to drive in customers after 5 pm. In such a situation, the predictive data analytics module 50 and/or food service material printing module 40 may determine a message that provides a promotional offer for coffee, but only after 1 pm—thereby personalizing the offer to the customer (as the customer normally orders coffee on the way into work), but incentivizing the customer to come to the store for an afternoon coffee break (e.g., after 1 pm per the food service business' wishes). In response, the predictive data analytics module 50 and/or food service material printing module 40 may provide the determined message to the control architecture 15, other modules, and/or other systems/devices (e.g., one or more dispenser(s)/printer(s) 70) to have the determined message printed on the cup for presentation to the customer with their food order.

In some embodiments, the predictive data analytics module 50 and/or food service material printing module 40 may be configured to determine a message to provide from among a plurality of messages. Such a determination may be based on a prediction of what type of message may drive a desired output from the customer. For example, certain products, time windows, promotions, or limited-time-offers may be associated with a set of available messages for driving customer action. Each of the messages in the set may approach that goal differently. For example, a first message (message 1) may provide a percentage off the product as an incentive; a second message (message 2) may offer a percentage off a related product that is often purchased with the product; or a third message (message 3) may offer extra loyalty reward points for purchasing the product. In some embodiments, the predictive data analytics module 50 and/or food service material printing module 40 may be configured to determine which of the messages to use for the specific customer that just placed an order based on personalization information and/or order information. For example, if the customer is close to reaching a threshold for their loyalty reward points, the predictive data analytics module 50 and/or food service material printing module 40 may determine that message 3 should be used to attempt to drive the customer to purchase the product (and reach a desirable loyalty reward point threshold). In response, the predictive data analytics module 50 and/or food service material printing module 40 may provide the determined message to the control architecture 15, other modules, and/or other systems/devices (e.g., one or more dispenser(s)/printer(s) 70) to have the determined message printed on the food service material item for presentation to the customer with their food order.

In some embodiments, the predictive data analytics module 50 may be configured to determine one or more messages to provide to a third-party based on a plurality of requests for food service. For example, the predictive data analytics module 50 may consider a plurality of requests for food service during a specific time period and/or for a specific location/region and determine that a delivery service may likely require certain packaging needs (e.g., a certain number of heaters, bags, etc.). The predictive data analytics module 50 may be configured to send that information to the third party.

In some embodiments, the predictive data analytics module 50 and/or food service material printing module 40 may be configured to determine print information (e.g., personalization print information) that includes game features, such as game pieces. For example, the game pieces could be determined and printed on-demand, thereby removing such game pieces from inventory storage and limiting lost pieces/winning potential. This may also enable tracking of "winning" pieces, such as being able to link the winning game piece with a customer—since the customer that purchased the winning piece may be determined from the request for food service.

In some embodiments, the predictive data analytics module 50 and/or food service material printing module 40 may be configured to determine print information (e.g., personalization print information) that can be recognized by a user's device (e.g., through image recognition and/or computer readable marker detection such as quick response codes). In such example embodiments, an image and/or message may be printed on the food service material item and a customer may utilize their mobile device to interact with the printed information, such as by using a camera to perform image recognition of the printed image and/or message. In response, an application and/or message may be downloaded to and/or presented on their mobile device based on recognition of the printed image and/or message. The printed image and/or message may be determined based on personalization information such that it is targeted toward the customer.

In some embodiments, the predictive data analytics module 50 and/or food service material printing module 40 may be configured to determine print information (e.g., personalization print information) based on the location of the customer and/or store. For example, one or more messages could be determined to target a nearby promotion, event, store, etc. In such a regard, the location of the customer at the time of the request and/or the location of the store for picking up the food order may be utilized in determination of the print information.

In some embodiments, the system may be configured to enable printing of information related to storage or other functions that may be useful for the store. For example, the system may be configured to enable printing on food service material items that may be used by the store, such as for storage. In such a regard, the printer may be configured to print relevant storage data, such as a package date, what food item is being stored, a use by date, etc.

In some embodiments, the system may be configured to enable reprinting of the food service material item, such as if an error occurred or the food service material item was accidently dropped on the floor. In some such embodiments, an operator may request the "last" print job, a certain order number, or other identifier to cause the relevant food service material item to be reprinted. In some such embodiments, the printer may be configured to receive voice commands, such as to enable reprinting. For example, a food service person may say "Printer, reprint the last order" or "Reprint Order 271". In response, the printer may reprint the appropriate printed information on a new food service material item.

Example Printing and Printers

Figure 6:
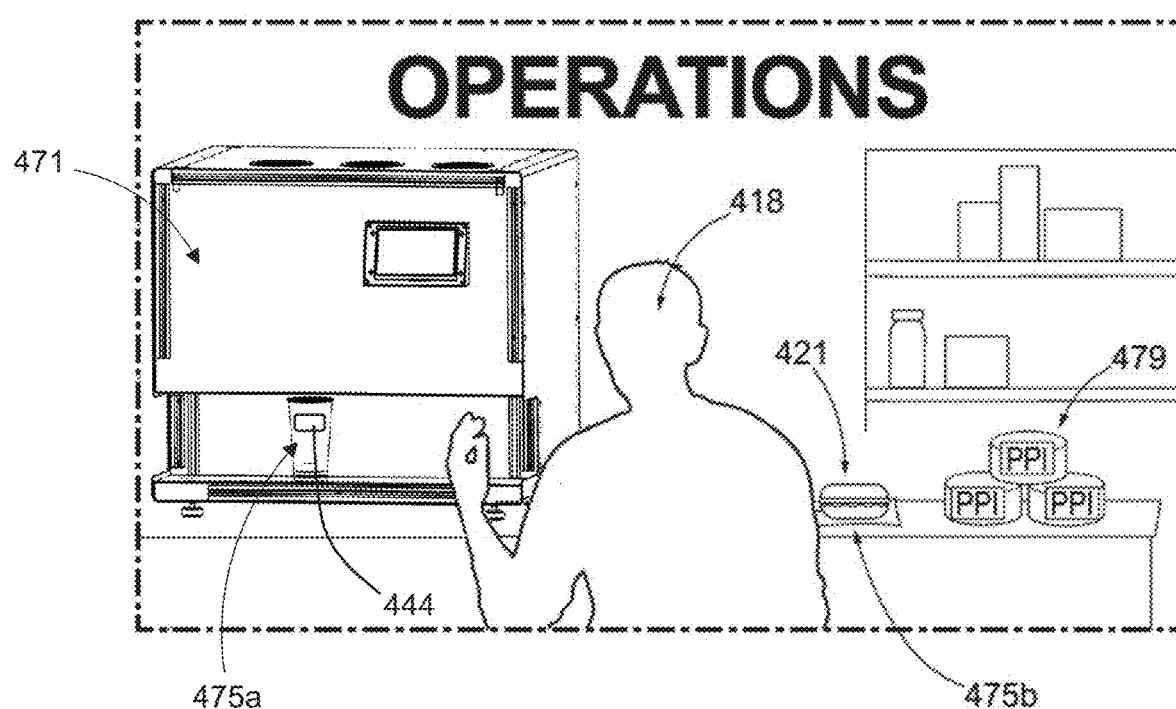
FIG. 6 illustrates example on-demand printing on a food service material item and packaging of a food order, in accordance with some embodiments discussed herein.

FIG. 6 illustrates example on-demand printing on a cup and packaging of a food order. In the depicted embodiment, a cup dispenser/printer 471 has printed and dispensed a cup 475a. The printed cup 475a includes personalization print information and order print information 444, such as described herein. The food service person 418 is able to retrieve the printed cup 475a and fill the cup with the desired beverage, for example. As shown with respect to a second printed food service material item (e.g., a food wrap 475b for a hamburger 421), the food service person 418 is able to package the food order (e.g., the filled cup 475a and the hamburger 421) in order to fulfill the food service request. The result is a packaged food order 479 with personalization print information and/or order information printed and presented to the customer with their food order.

Though the above described example details an example printed cup in combination with a printed food service material item of food wrap, in some embodiments, the on-demand cup printing/dispensing may occur independent from other printed food service material items. Likewise, many different food service material items are contemplated for such on-demand printing with example cup dispenser systems described herein (e.g., a bag dispenser/printer, a food tray liner dispenser/printer, etc.). In such a regard, depending on the available or desired food service material item, the one or more printer(s) 70 may be configured to enable printing thereon (e.g., utilize the proper ink for the material, store the desired material for the food service material item, etc.).

In addition to a dispenser of one or more cups (e.g., beverage cups, soup containers, ice cream containers) as otherwise discussed herein, systems incorporating the same may include one or more additional dispensers for on-demand printed cups (e.g., cups of a different size and/or style) and/or one or more additional dispensers of on-demand printed food service material items including a food wrap (e.g., paper, foil, partially translucent paper, etc.) for wrapping a portion of the food order, a pouch for at least partially containing or covering the food order, a container for at least partially containing or covering the food order, a cup lid for covering the food order, a tray liner for use with the food order, a bag (e.g., in store bag, carry out bag, etc.) for at least partially containing the food order, or a napkin for use with the food order. In some embodiments, the food service material item may be one or more food packages that are configured to at least partially cover or contain the food order. Example food packages may include, at least, food wrap for wrapping the food order, container(s) for at least partially containing or covering the food order, a pouch for at least partially containing or covering the food order, a bag for at least partially containing the food order, among others.

Figure 7A:
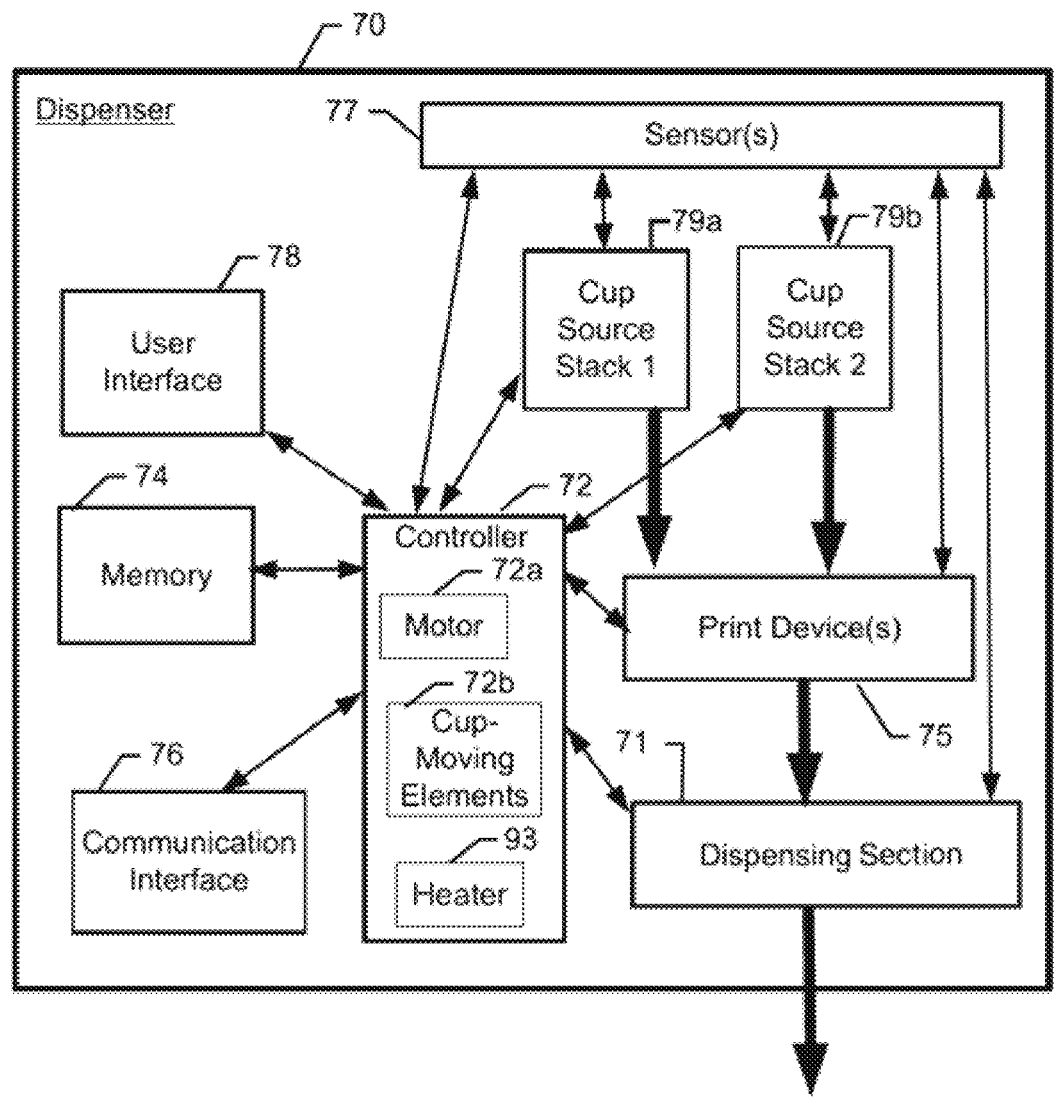
FIGS. 7A-7B show block diagrams of example cup dispensers that include print devices, in accordance with some embodiments discussed herein.

With reference now to FIG. 7A, an example cup dispenser 70 may comprise hardware and/or software capable of performing various functions described herein. In this regard, the dispenser 70 may include a controller 72, a motor 72a, cup-moving elements 72b, a memory 74, a communication interface 76, a user interface 78, one or more cup supplies (e.g., Cup Source Stack 1 79a and Cup Source Stack 2 79b), one or more print devices 75, one or more dispensing sections 71, and one or more sensor(s) 77.

The controller 72 may be configured to execute various programmed operations or instructions stored in a memory device and may be, for example, a device comprising a processor or circuitry operating in accordance with software or otherwise embodied in hardware or a combination of hardware and software, thereby configuring the device or circuitry to perform the corresponding functions of the controller 72 as described herein. In this regard, the controller 72 may be configured to receive one or more instructions for printing, such as through the communication interface 76. In some embodiments, the controller 72 may be configured to determine, process, and/or choose the determined cup to be printed from among a plurality of available cups (e.g., either a first cup from Cup Source Stack 1 79a or a second cup from Cup Source Stack 2 79b). In some embodiments, the controller 72 may be configured to cause printing on one or more of the cups (such as through the print device(s) 75). In some embodiments, the controller 72 is configured to cause dispensing of the printed cup(s), such as using the dispensing section 71. In some embodiments, the controller 72 may cause monitoring, such as through sensor(s) 77, of supply materials of the printer (such as ink for the print devices 75 and/or cups from the supplies 79a, 79b). The controller 72 may also be configured to send gathered information and/or instructions to other devices, systems, or modules to perform various functions described herein. In some embodiments, the controller 72 may be configured to operate according to one or more modules described herein. For example, in some embodiments, the controller 72 may be configured to operate according to the control architecture 15, such as the food service material printing module 40.

The one or more cup supplies 79a, 79b may be configured to hold and/or store one or more cups to be printed. For example, the dispenser 70, depending on the configuration, may be configured to hold a stack of cups as shown, though other cup source options are contemplated, such as lines of cups, a single cup, etc. In the depicted embodiment, the dispenser 70 includes two supplies 79a, 79b. In some embodiments, the supplies 79a, 79b may hold the same type of cup (e.g., both may hold a cold beverage cup of the same size). In such a situation, the dispenser 70 may be enabled to switch to dispensing and printing from a primary supply to a secondary supply when the primary supply is depleted. In some embodiments, the supplies 79a, 79b may hold different types of cups (e.g., two cups of different materials depending on the temperature of the beverage or food to be stored therewithin) and/or different sizes of cups (e.g., two cups of the same material but of different sizes). In some embodiments, for example, the cups for each supply 79a, 79b may differ in at least one material characteristic, such as composition (e.g., paper, plastic, composite, etc.), weight, dimensions, etc. In some such embodiments, the dispenser 70 may be configured to choose which supply to use for printing and dispensing. In some embodiments, the food service material printing module 40 may be configured to determine which type of cup to print on, and instruct the dispenser 70 accordingly.

The one or more print devices 75 may be configured to print on one or more cups simultaneously or sequentially, such as from one of the supplies 79a, 79b. In some embodiments, the print device 75 includes ink that enables the printing, such as provided from one or more ink cartridges, tanks, reservoirs, etc. In some embodiments, the print devices 75 and/or dispenser 70 may be configured such that only proprietary ink cartridges may be utilized with the dispenser 70 (e.g., non-proprietary ink cartridges may be locked out). The ink may be specially configured based on the cup, desired print quality, or other factors (e.g., safety, durability, etc.). In some embodiments, the print device(s) 75 may be configured to utilize different print characteristics for different types of cups (e.g., cups of different materials). For example, depending on which cup is selected for printing (such as from supplies 79a,b), the print device(s) 75 may be configured to employ different print characteristics, such as different ink (e.g., UV curable ink for plastic cups), different settings, different components, (e.g., rollers and/or presses), etc.

In some embodiments, the print devices 75 are configured to print the order print information and the personalization print information on the cup(s). In some embodiments, the print devices 75 may include a printer head (e.g., such as an ink jet printer head), mandrels, rollers, presses, belts, or other hardware necessary for performing the printing. In some embodiments, the print devices 75 may be configured to print on multiple surfaces or portions of the cup. For example, the print device 75 may be configured to print order print information on a first surface or portion and personalization print information on a second surface or position (e.g., a front and back of a cup from the perspective of the consumer).

The dispensing section 71 may be configured to cause dispensing of printed food service material items. In some embodiments, the dispenser 70 may include rollers, transfer systems, mandrels, or other hardware for effecting transfer of the food service material item through the components of the dispenser and out of the dispenser for the food service provider/person (e.g., along a path through the dispenser). In some embodiments, the dispenser 70 may include one or more chutes for guiding the food service material, such as toward the dispensing section.

One or more motors 72a may be used to operate various features/components of the dispenser 70. In some embodiments, the controller 72 may be configured to operate the motor(s) 72a accordingly. For example, one or more motors 72a may be used to drive one or more cup moving elements 72b to cause one or more cups to move through the dispenser 70, to interact with the print devices 75, to be manipulated within the dispensing section 71, etc. In some embodiments, the controller 72 may be configured to control the motor 72a to cause dispensing of a cup, such as a cup of a specific style and/or size.

The dispenser 70 may also include one or more cup-moving structures/features (e.g., cup-moving elements 72b) that may be used to enable movement of the cup from one or more of the cup sources 79a,b through the dispenser and its various components and into the dispensing section 71. Some example structures include at least one cup source removal structure (e.g., a singulator) for separating a single cup from the cup source, a cup movement structure for causing the cup to move from the cup source to a printing position for being printed on by the print device 75, and a cup rotation structure for causing the cup to rotate (e.g., about its central axis) for printing and/or for presentation of the printed cup to a food service provider.

In some example embodiments, a cup source removal structure can also be provided to remove a cup from one or more of the cup sources. In some embodiments, the cup movement structure(s) can cause a cup from the Cup Source Stack 1 79a' to be moved to a first printing position and/or a cup from the Cup Source Stack 2 79b' to be moved to a second printing position different from the first printing position. While a dedicated print device 75 may include a printer head for each of the first and second printing positions, in some embodiments the print device 75 can include a printer head for printing a cup disposed in either of the first and second printing positions.

The printer head and a cup disposed in one of the first and second printing positions can have a variety of orientations relative to one another and can move relative to another in a variety of manners. By way of example, a cup may be stationary while a printer head moves about the cup during printing thereof. In such aspects, the cup may be disposed in a vertical or horizontal orientation during movement of the printer head thereabout (e.g., along and around the sidewall). Alternatively, in some example aspects, a cup may be rotated about its central axis while the printer head translates along a sidewall of the cup. By way of example, in some embodiments, the printer head can translate horizontally in two dimensions above each of the first and second printing positions for printing of a cup disposed thereat. In some embodiments, the printer head can be configured to translate in at least one horizontal dimension while a cup in the printing position is rotated about its central axis during printing thereof. In some aspects, coordinated movement of the printer head and rotation of the cup may be provided (e.g., via controller 72) such that a desired design may be printed on the sidewall of the cup. In some aspects, the printer head can be maintained in a fixed vertical position during horizontal translation over one or more of the printing positions.

The one or more sensor(s) 77 may be configured to monitor various components or supplies of the dispenser 70 or various features corresponding to the cup bring printed and dispensed. For example, in some embodiments, the one or more sensors 77 may be configured to monitor the available ink for the print device(s) 75. In such embodiments, the controller 72, such as through one or more modules of the system 10 (e.g., the food service printing module 40), may determine when replacement ink is needed and, in some cases, perform automatic ordering thereof. Similarly, in some embodiments, the one or more sensors 77 may be configured to monitor the available cup supply, such as from supplies 79a, 79b. In such embodiments, the controller 72 may determine when replacement cups are needed and, in some cases, perform automatic ordering thereof. In some embodiments, the controller 72 may provide one or more messages/indications to be sent to the food service business indicating a need to supply more ink or cups for the dispenser 70. In some embodiments, the one or more sensor(s) 77 may be a seam sensor that is configured to detect a seam of the sidewall of the cup, such as described herein.

The memory 74 may be configured to store instructions, computer program code, order data (e.g., order information), order print information, personalization information, personalization print information, and other data/information associated with the dispenser 70 in a non-transitory computer readable medium for use, such as by the controller 72.

The communication interface 76 may be configured to enable connection to external systems (e.g., an external network 12, one or more food request systems 80, one or more dispenser(s) 70, a customer's mobile device, a computer server, the control architecture 15, and/or one or more other system(s)/device(s)). In some embodiments, the communication interface 76 may comprise one or more transmitters configured to transmit, for example, one or more signals according to example embodiments described herein. Likewise, the communication interface 76 may include at least one receiver configured to, for example, receive data according to example embodiments described herein. In some embodiments, the transmitter and receiver may be combined as a transceiver. In this regard, the dispenser 70 may be configured for wired and/or wireless communication. In some embodiments, the communication interface 76 may comprise wireless capabilities for WiFi, Bluetooth, or other wireless protocols. In some embodiments, the dispenser 70 may be connected, such as through Bluetooth, to one or more food request/POS system(s) 80 such as to enable performance of various functions herein.

The user interface 78 may be configured to receive input from a user and/or provide output to a user. The user interface 78 may include, for example, a display, a keyboard, keypad, function keys, mouse, scrolling device, input/output ports, touch screen, or any other mechanism by which a user may interface with the system. Although the user interface 78 is shown as being directly connected to the controller 72 and within the dispenser 70, the user interface 78 could alternatively be remote from the controller 72 and/or dispenser 70. Likewise, in some embodiments, other components of the dispenser 70 could be remotely located.

The dispenser of FIG. 7A also includes one or more heaters 93 for increasing the temperature of at least a portion of the dispenser 70, for example, to raise a temperature of a cup before, during, or after printing so as to dry ink printed thereon. In some related embodiments, for example, one of the sensors 77 may comprise a temperature sensor for detecting the temperature within the dispenser 70, for example, at or near one or more of the printing positions such that the controller 72 can selectively operate the heater(s) 93 to maintain a sufficient temperature for drying the ink prior to dispensing the printed cup.

Figure 7B:
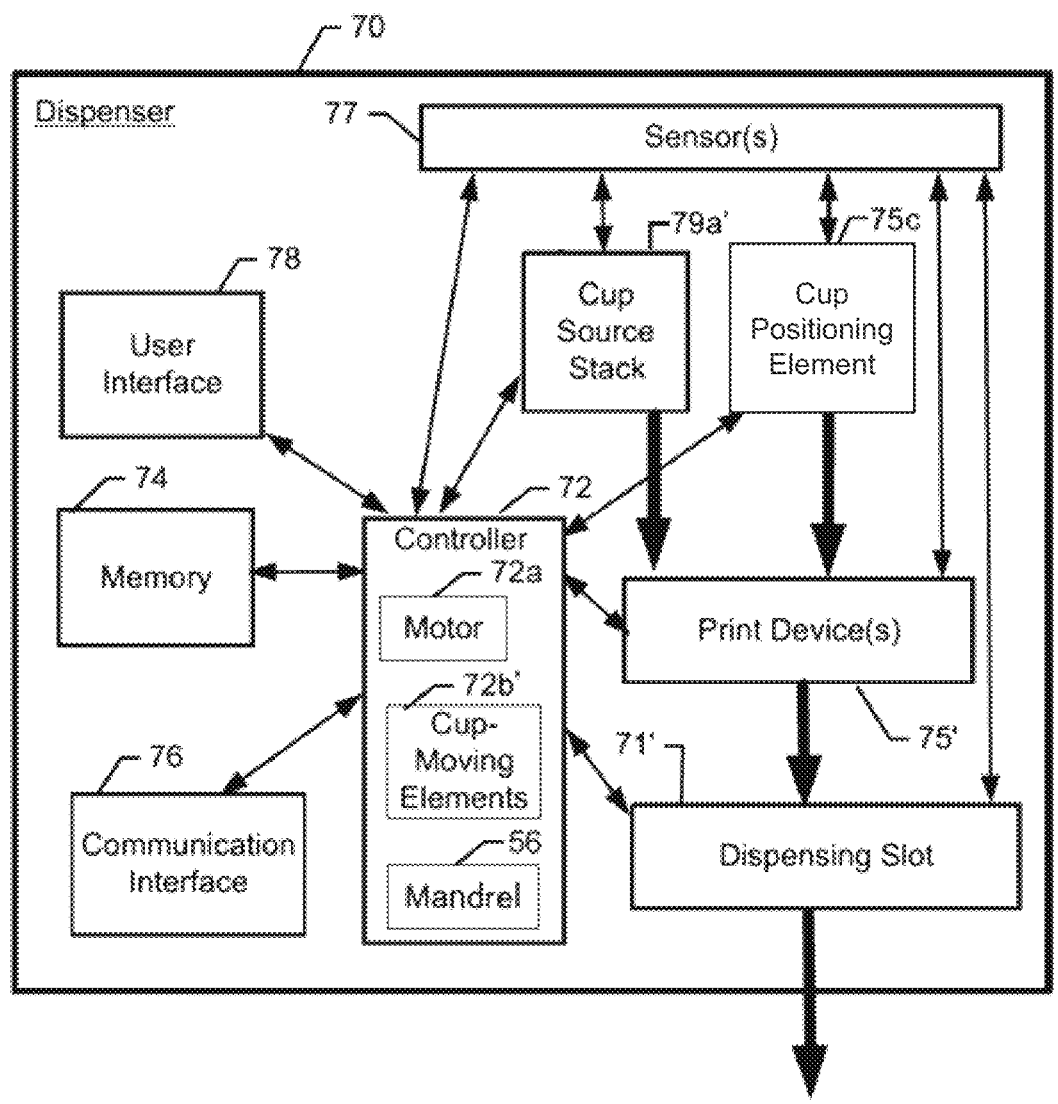

FIG. 7B illustrates another example dispenser for on-demand printing and dispensing of cups for use in a food service order. While the depicted dispenser 70 includes a Cup Source Stack 79a', other cup source options are contemplated, such as a plurality of cup source stacks, lines of cups, a single cup, etc. In some example embodiments, the Cup Source Stack 79a' can maintain the stack of cups in a vertical orientation. The depicted dispenser 70 also includes cup-moving elements 72b' that are configured to enable movement of the cup from the cup source through the dispenser 70 and its various components. In some embodiments, the cup-moving elements 72b' can orient, rotate, or otherwise move a cup maintained in a vertical orientation at the cup source to a printing position in which the cup is in a horizontal orientation for printing by the printing device 75'.

In some embodiments, the cup-moving elements 72b' can move the cup into engagement with a mandrel 56 for rotating the cup about its central axis when disposed in a horizontal orientation at the printing position. In some embodiments, the printer head can be configured to translate in at least one horizontal dimension while the mandrel causes rotation of the cup about its central axis in a horizontal orientation during printing thereof.

In some embodiments, the mandrel may maintain the cup in an orientation during printing thereof such that at least a portion of the sidewall of a tapered cup to be printed is horizontal. In some related embodiments, the printer head translates in a horizontal plane while nonetheless maintaining a fixed distance relative to a portion of the tapered sidewall during printing thereof. In some embodiments, a cup positioning element 75c is provided for balancing or otherwise centering the cup on the mandrel 56 in the horizontal orientation at the printing position.

In some embodiments, the printer head may maintain a substantially fixed position while the cup rotates about its axis to print around the perimeter of the cup. Alternatively, the cup may maintain a specific angular orientation about its central axis while the printer head translates along a sidewall of the cup to print extending along the length of the cup, for example. In some aspects, coordinated movement of the printer head and rotation of the cup may be provided (e.g., via controller 72) such that a desired design may be printed on the sidewall of the cup. In some embodiments, one or more of the sensors 77 may comprise a seam sensor for detecting the position of a cup's seam, such as described herein. In some aspects, ejection of ink from the print device 75' and/or rotation of the cup may be coordinated such that the printer does not print on the cup seam.

Figure 8:
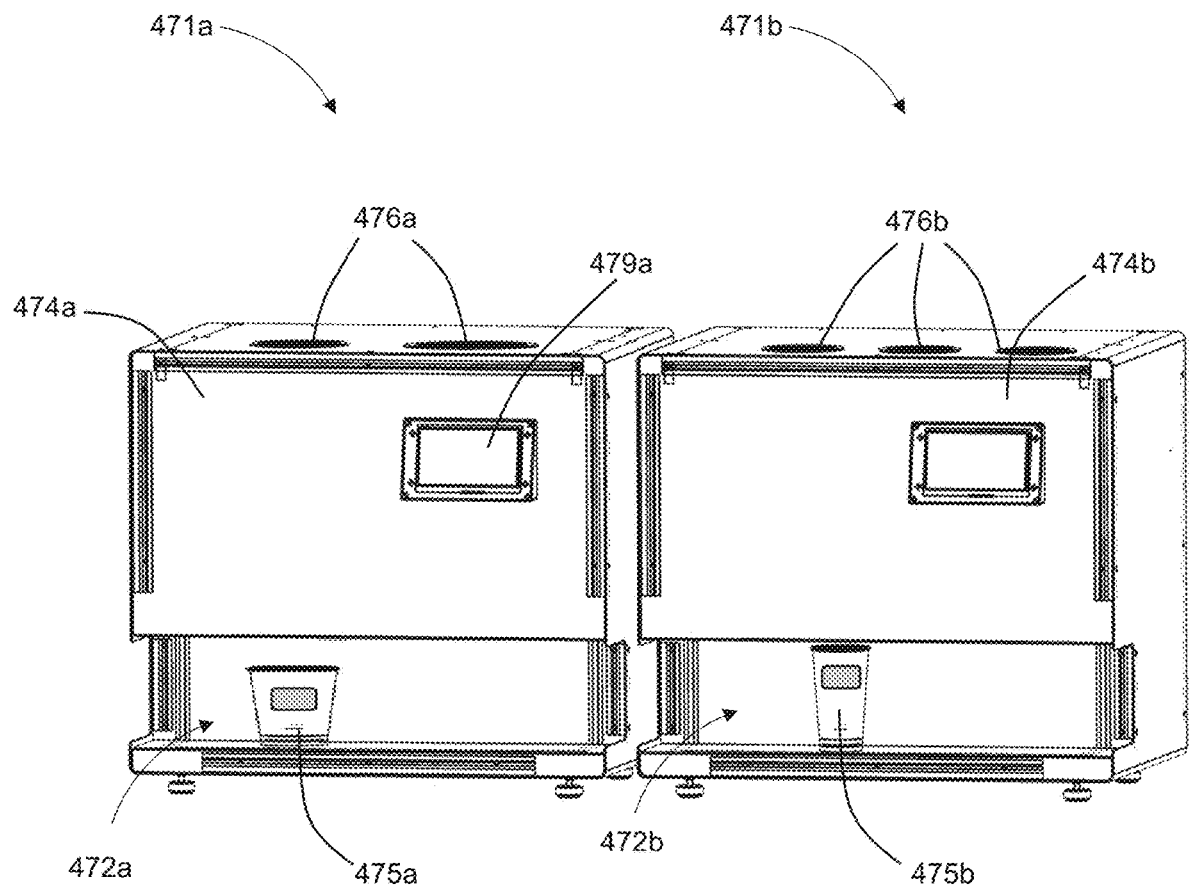
FIG. 8 shows two example cup printers for use with an example on-demand food service material printing system, in accordance with some embodiments discussed herein.

FIG. 8 illustrates two example cup dispensers for use with an example on-demand cup printing system. In such a system, the system includes a first dispenser 471*a* that is configured to print on and dispense a first type of cup of various sizes (e.g., a small and large containers for holding hot contents such as soup). The system also includes a second dispenser 471*b* that is configured to print on and dispense a second type of cup of various sizes (e.g., a small, medium, and large cold beverage cups). In the depicted embodiment, the system has determined that a small soup container and a medium beverage cup are needed for the current food order and, thus, printed on and dispensed a printed small soup container 475*a* using the first dispenser 471*a* and a medium beverage cup 475*b* using the second dispenser 471*b*. In some embodiments, the system may determine, for example, that both a small and medium beverage cup are needed for a food order such that the second dispenser 471*b* may print the different sized beverage cups sequentially or simultaneously. Though dispensers (471*a*, 471*b*) are depicted as being disposed side-by-side, it will be appreciated that the dispensers may be disposed in different locations depending on the configuration of the store. For example, the soup cup dispenser 471*a* may be located adjacent to the soup station in back-of-house (BOH), while the beverage dispenser 471*b* may be located in front-of-house (FOH) or drive-through area for immediate filling of the beverage portion of the food order. Alternatively, though shown as separate dispensers (471*a*, 471*b*) for different types of cups in FIG. 8, in some embodiments, a single dispenser may be configured to print on and dispense both types of cups.

It will also be appreciated in light of the present teachings that each dispenser 471*a*, 471*b* may comprise a housing 474*a*, 474*b* that may be sized to maintain a small and/or desired footprint. For example, there may be limited space in the store and it may be desirable to position the on-demand cup dispenser(s) near or within the food service preparation line (e.g., to allow the food service person to easily and quickly retrieve the printed food service material item for use in preparing the food order). In some embodiments, the system may be designed such that one or more of the dispensers 471*a*, 471*b* are positioned within a certain proximity of one or more food request systems 80. By way of non-limiting example, the dispenser(s) may be within 30-45 feet of at least one of a self-order kiosk or a point-of-sale operator terminal. Indeed, one benefit of the present system is to provide on-demand printing capability for food service material items for use during preparation of the food order and, thus, designing the dispenser to be positioned proximate the food order preparation area corresponding to the contents of the cup(s) to be dispensed and ultimately filled may be desirable to maintain efficient food order preparation. In some embodiments, due to the close proximity of the food request system and printer, Bluetooth communication between the two devices/systems could be utilized.

Along similar lines, in some embodiments, the cup dispenser may additionally include or be coupled to a filling system or device (e.g., for filling the cup with the appropriate beverage, soup, etc.) and/or a lidding system or device (e.g., for sealing the open end of the cup that has been filled via a lid or seal).

Returning to FIG. 8, the example dispenser 471*a* includes a housing 474*a* that is configured to maintain two vertical stacks of differently-sized cups (e.g., soup containers), each stack of which may extend upward from the top of the housing 474*a* through supply holes 476*a* in the top of the housing 474*a*. Similarly, the example dispenser 471*b* includes a housing 474*b* that is configured to maintain three vertical stacks of differently-sized cups (e.g., cold beverage cups), each stack of which may extend upward from the top of the housing 474*b* through supply holes 476*b* in the top of the housing 474*b*. As otherwise discussed herein, a cup from each stack of cups in each dispenser may be removed sequentially or simultaneously and printed within the housing for dispensing in the corresponding dispensing section 472*a*, 472*b* to allow a user to access the printed cups. It will also be appreciated that a single cup, for example, may be manually loaded (e.g., placed within the supply holes) for printing by the dispenser(s) 471*a*, 471*b*. In some embodiments, a food service provider may press a button (e.g., on user interface 479*a*) to initiate the manual load feature. Additionally, the dispensers 471 may be designed to enable access to the internal housing for maintenance, replacement of ink or food service material item supply, etc. For example, one or more of the outer panels of dispensers 471*a*, 471*b* may be opened and/or removed to enable access to the various internal components.

Each dispenser 471*a*, 471*b* also respectively includes a user interface (e.g., user interface 479*a*) that can be used to display information to the food service provider and/or enable functionality, such as through button(s) and/or touch-screen(s). For example, the user interfaces 479*a* may display the current food service material item that is being prepared by the dispenser 471*a*. Additionally, the user interface 471*a* may provide maintenance information to a nearby food service provider, such as if the ink needs replacement, if the cups are nearly depleted, error messages, etc. In some embodiments, such information may (additionally or alternatively) be provided through wireless or wired communication element (e.g., the communication interface 76 shown and described with respect to FIG. 7A) in communication with a remote computing device, such as for use with various embodiments of the present invention described herein (e.g., with/in an on-demand food service printing system).

Figure 9:
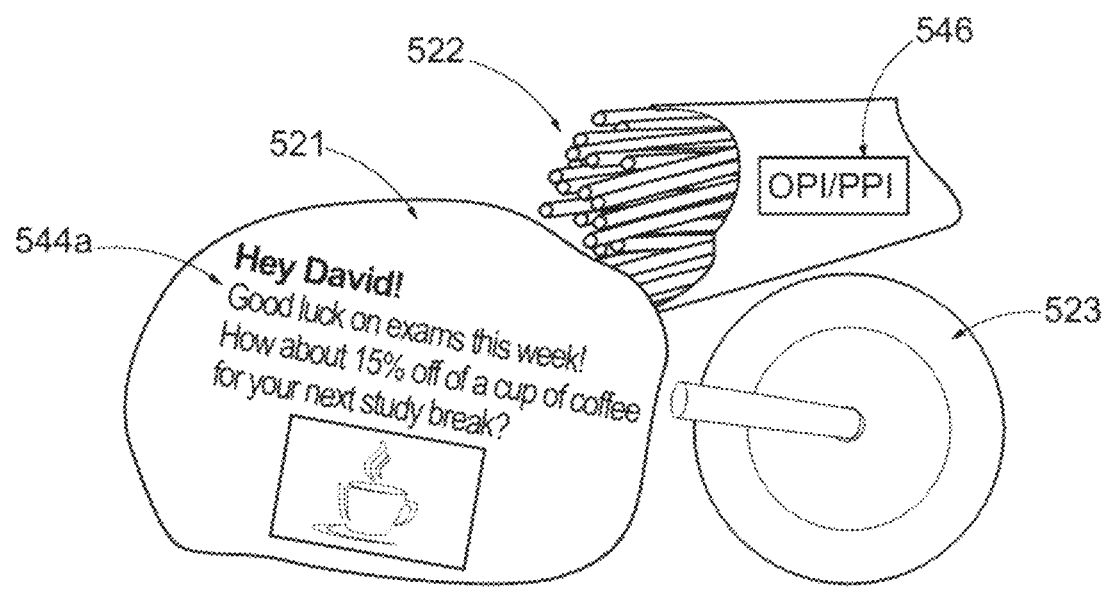
FIG. 9 shows example food orders, where some of the food orders are packaged in a food service material item with printed information thereon, in accordance with example embodiments described herein.

FIG. 9 shows example food orders, where portions of the food orders are packaged in various food service material with printed information thereon. For example, a hamburger 521 has been wrapped with a food wrap that has personalization print information 544*a* printed and oriented to face the customer upon presentation of their food order. In the depicted embodiment, the fries 522 are provided in a pouch that also has order print information (OPI) and/or personalization print information (PPI) 546 printed thereon. In some embodiments, the cup 523 may include printed information (such as personalization print information) in accordance with various embodiments of the present teachings.

FIG. 10 illustrates an example cup dispenser 1170 in accordance with various example embodiments described herein (such as the dispenser 70 shown in FIG. 7A). The depicted cup dispenser 1170 includes a housing 1174 that is sized with a small footprint such as to fit on a counter and/or within a food service preparation area. The depicted cup dispenser 1170 includes a cup source 1142 that holds a stack of cups 1178. Additionally, the cup dispenser 1170 includes a user interface in the form of a screen 1179a and buttons 1179b. The screen 1179a can be used to display information to the food service provider. For example, the user interface 1179a may display the cup order that is being prepared by the dispenser. Additionally, the user interface 1179a may provide maintenance information to a nearby food service provider, such as if the ink needs replacement, if the stack of cups is nearly depleted, error messages, etc. In some embodiments, such information may (additionally or alternatively) be provided through wireless or wired communications with a remote computing device. The dispenser 1170 also includes a dispensing slot 1172 that enables a food service provider to collect a printed cup 1105 therefrom.

With reference to FIG. 10A, upon receiving a food service order, such as from a remote food service request module (e.g., the point of sale computing device 1103 shown in FIG. 10C) through a wireless connection W, the cup dispenser 1170 may provide an alert A to indicate that it has received the order and is beginning preparation of the printed cup. One or more cup-moving elements (not shown) may cause a single cup to move along a path into the dispenser (e.g., along arrow P). In the depicted embodiment, a cup is separated from the stack of cups 1178 and moves from the cup source 1142 into the dispensing slot 1172. In some embodiments, the force of gravity may assist with movement of the cup.

With reference to FIG. 10B, a print device (not shown) may print order information and/or personalization information on the cup 1105. After printing, a cup-rotation element may cause the printed cup to rotate, such as for presentation to a food service provider. In some embodiments, a door may be used to cover the cup, such as during printing. Such an example door may be unlocked and/or automatically opened after printing is complete to enable retrieval of the printed cup by the food service provider.

FIG. 10C illustrates dispensing of a printed cup 1105 using the cup dispenser 1170. In the illustrated example, a food service provider 1108 may be alerted (e.g., the "Ding") to completion of the printed cup (although other types of alerts are contemplated, such as visual, text message, voice, vibration, etc.).

FIG. 10D illustrates an example printed cup 1105 that includes personalization information 1106 (e.g., the customer's name "Michelle") and order information 1109 (e.g., "Mint Mocha" and corresponding special instructions, such as "No Chocolate"). Once the food service provider 1108 has retrieved the printed cup, they can use the order information printed directly on the cup to help in preparation of the appropriate food service order (e.g., illustrated in FIG. 10E). Thereafter, the completed food order and corresponding printed cup 1105 can be placed out for gathering by the customer 1119 (e.g., illustrated in FIG. 10F). In this regard, the printed order information and/or personalization information enable easy identification of the appropriate food service order by the customer.

FIG. 11 illustrates another example cup dispenser 1470 in accordance with various example embodiments described herein (such as the dispenser 70 shown in FIGS. 7A and/or 7B). The depicted cup dispenser 1470 includes a housing 1474, such that may be sized to fit within a food service line. The dispenser 1470 has a cup source 1442 that is configured to hold one or more cups. As depicted in the embodiment of FIG. 11, for example, the cup source 1442 is configured to hold three stacks 1442a-c of cups to be printed/dispensed by dispenser 1470 in a vertical orientation. By holding the stack of cups in a vertical orientation, the footprint of the dispenser 1470 may be reduced when disposed on a counter and/or within a food service preparation area. In some embodiments, the cup source may be designed such that the stacks of cups are in a different orientation, e.g., a generally horizontal orientation. Notably, in some embodiments, the designed cup pathway through the dispenser 1470 may be adjusted accordingly.

As discussed in detail below, in some embodiments, each stack of cups can comprise cups of a different volume (e.g., a stack of small cups, a stack of medium cups, and a stack of large cups) and/or cups of a different shape (e.g., three stacks of cups of different tapers).

Additionally, the cup dispenser 1470 includes a user interface in the form of a screen 1479 (e.g., a display, a touchscreen that enables selection of a displayed item, etc.), which can be used to display information to the food service provider. The user interface 1479, for example, may display the cup order that is being prepared by the dispenser 1470 and/or provide maintenance information to a nearby food service provider (e.g., a need for a new ink cartridge, cup replenishment, error messages, etc.). In some embodiments, such information may (additionally or alternatively) be provided through wireless or wired communications with a remote computing device. The dispenser 1470 also includes a dispensing section 1472 that enables a food service provider to collect a printed cup 1405 therefrom.

With reference now to FIGS. 11A-C, three cups suitable for use in dispenser 1470 are depicted. As shown in FIG. 11A, cup 1405' represents a small cup extending from an open top end 1405a' to a closed bottom end 1405b'. A sidewall 1405c' extends between the open end 1405a' and closed end 1405b' so as to define a volume within which a beverage may be contained. As shown, cup 1405' exhibits a central longitudinal axis (A) extending through the ends 1405a', 1405b' and along which the sidewall 1405c' extends. The cup 1405' is tapered in that the cross-sectional area of the cup 1405' changes (e.g., decreases) along the length between the cup's open end 1405a' and closed end 1405b'. As a result of this taper, it will be appreciated that the sidewall 1405c' of cup 1405' is not parallel to the central axis (A).

Cups suitable for use in dispensers of the present teachings can be made of a variety materials (e.g., plastic, paper, metal, combinations thereof) and can have a variety of configurations (e.g., unitary, multi-piece). In the example embodiment of FIG. 11A, cup 1405' is made of paper (e.g., coated or uncoated) in which the sidewall 1405c' is formed by joining (e.g., adhering) two ends of a planar sheet together to form a seam 1405d'. Likewise, as is known in the art, the closed bottom end 1405b' can be a separate piece that is joined (e.g., adhered) to a lower portion of the sidewall 1405c', thereby defining an inner volume within which a beverage can be retained. As shown, cup 1405' additionally includes a lip 1405e' (e.g., a rolled edge of the planar sheet) at the open end 1405a', which can provide additional structural integrity to the cup and/or provide a location for a user and/or lid (not shown) to grip. Lip 1405e' extends outwardly from the sidewall 1405c' and includes a narrow, lower surface and an upper surface when the cup is disposed in the vertical orientation as shown in FIG. 11A. In some embodiments, multiple cups can be stacked upon one another by inserting the closed end and a portion of the sidewall of a first cup within the second cup until the lips of each cups engage one another, for example. It will be appreciated that cups can be stacked right-side up (e.g., as shown in FIG. 11A) or upside down (e.g., with the closed end $1405b'$ disposed above open end $1405a'$).

FIG. 11B depicts another example cup 1405" suitable for use with dispenser 1470 in accordance with the present teachings. Cup 1405" differs in both volume and shape from cup 1405'. Like cup 1405', cup 1405" is tapered in that the sidewall 1405c" is not parallel to the central axis (A) of the cup 1405". However, cup 1405" differs from cup 1405' in that cup 1405" exhibits a longer distance between its open and closed ends 1405a",b" and defines a greater volume. As shown, cup 1405' and cup 1405" exhibit the same diameter as one another at their respective open and closed ends such that the sidewall 1405c" of the longer cup 1405" is closer to parallel with the central axis (A) than the sidewall 1045c'. That is, cup 1405" exhibits a smaller taper, and thus, different shape relative to cup 1405'.

It will be appreciated, for example, that each stack of cups in dispenser 1470 can comprise a plurality of one type of the cups 1405' and 1405" (as well as a third stack of cups, which may the same as one or cups 1405' and 1405" or a stack of differently-sized and/or differently-shaped cups), which may be selectively removed from the respective stack, printed, and/or dispensed from dispenser 1470 in accordance with the food service order.

FIG. 11C also depicts an example cup 1405''' suitable for use with dispenser 1470 in accordance with various aspects of the present teachings. Like the cups of FIGS. 11A-B, cup 1405''' extends from an open end 1405a''' to a closed end 1405b''' along a sidewall 1405c''', but differs in that the cup 1405''' is cylindrical (e.g., instead of a truncated cone). That is, the sidewall 1405c''' is substantially parallel to the central axis (A) along its entire length.

With reference again to FIG. 11, the housing 1474 includes one or more outer panels that can be opened and/or removed to enable access to various components of the dispenser 1470, such as for maintenance or replacement of parts or features. For example, the dispenser 1470 may be designed to enable replacement of ink for the one or more print devices, as otherwise discussed herein.

FIG. 11D depicts the various outer panels of FIG. 11 removed such that various additional features of the example dispenser 1470 are visible. As shown in FIG. 11D, the example dispenser 1470 generally includes a cup source 1442, a printing module 1490 within which one or more cups may be disposed during printing thereof, and a dispensing section 1472 that enables a food service provider to collect a printed cup 1405 therefrom.

As shown, the example cup source 1442 includes three positions, each of which is configured to maintain a stack of cups in a vertical orientation (e.g., the central axis (A) of each cup is vertical), with the closed end of each cup facing downward and positioned such that additional cups can be refilled from the top of the dispenser 1470, for example, as the quantity of cups remaining in the stack is depleted. As noted above, the cups of the stack maintained at each position may differ in at least one of volume and shape from the cups of the other two stacks (e.g., a stack of small cups, a stack of medium cups, and a stack of large cups). Only the leftmost position in the cup source 1442 is depicted as having a stack of cups mounted thereat in FIG. 11D. Although the depicted stack of cups is shown in a vertical orientation, other orientations are contemplated, including slightly off vertical, as well as horizontal (and various orientations therebetween). Accordingly, variations in the cup path between the cup source and the printer may be applied to achieve a corresponding printing and dispensing.

In the depicted example embodiment, each of the three positions of the cup source 1442 is additionally associated with a cup removal structure 1444, which is generally configured to separate a single cup from the stack of cups maintained at one of the positions of the cup source 1442 (e.g., based on a command by a controller that a particular size cup is to be printed based on a food service order or that the previous cup has been ejected from the printing module 1490). In some example embodiments as otherwise discussed herein, by maintaining the stack of cups in a vertical orientation and by positioning the cup source 1442 and cup removal structure 1444 generally above other elements of the dispenser 1470, a cup 1405 removed from the stack by the removal structure 1444 may be placed or dropped (e.g., via gravity) into a position to be further manipulated within the cup dispenser 1470. A person skilled in the art will appreciate that any of various mechanisms known in the art for removing a cup from a stack of cups and modified in accordance with the present teachings may be suitable for use in the dispenser 1470. An exemplary cup removal structure suitable for use in accordance with the present teachings is described, for example, in U.S. Pat. No. 3,279,652 (the teachings of which are incorporated by reference in its entirety), which provides a rotating cam member that selectively engages the lip of the lowest cup in a stack to separate it therefrom.

As discussed in detail below, following separation from a stack of cups, a cup may be transported along a path within the dispenser 1470 to a printing position within the printing module 1490 such that a sidewall of the cup may be printed. As shown in FIG. 11D, the example printing module 1490 of dispenser 1470 includes three printing positions 1492a-c, each of which corresponds to one of the three stacks of cups maintained by the cup source 1442. Notably, though the cup may be maintained in a vertical orientation within the cup source 1442 (e.g., to conserve space), some embodiments of the present teachings advantageously move (e.g., reorient) the cup such that either the central axis (A) of the cup 1405 or a portion of the sidewall of cup extending between the open and closed ends 1405a', 1405b' is disposed in a horizontal orientation to facilitate printing as otherwise discussed herein. FIG. 11D depicts a cup disposed horizontally in each of the center and right printing positions 1492b,c.

One or more cups disposed in the printing positions depicted in FIG. 11D may then be printed on by one more printing devices 1475 of the printing module 1490. By way of example, in some embodiments, a plurality of printing devices can be provided, each of which may be responsible for printing a cup disposed in one of the respective printing positions 1492a-c. For example, each of the printing devices can comprise a printer head, each of which is configured to eject ink toward a sidewall of a cup disposed in only one of the three printer positions 1492a-c. In such embodiments and with the cup disposed in the horizontal orientation, each printer head may propel ink downwardly as the cup rotates substantially about its central axis (A) in order to deposit ink around the perimeter of the cup's sidewall. For example, the printer head may maintain a substantially fixed position while the cup rotates about its axis (A) in order to print around the perimeter of a cup. Alternatively, the cup may maintain a specific angular orientation about its central axis (A) while the printer head translates along the sidewall (e.g., substantially parallel to the sidewall in the horizontal orientation) in order to print extending along the length of the cup, for example. In some embodiments, each of the printer positions 1492a-c may be associated with a dedicated printer head that is only enabled to translate linearly (e.g., back and forth in a horizontal direction) along the sidewall (e.g., between the open and closed ends 1405a', 1405b'). It will further be appreciated that a controller as otherwise discussed herein may coordinate the linear translation of each of the one or more printer heads, the ejection of ink thereby, and the rotation of the cup in each respective position 1492a-c such that the sidewall of each cup may have the intended design printed thereon.

In the example embodiment depicted in FIG. 11D, however, only a single printer head is provided for printing cups disposed at any of the plurality of printing positions 1492a-c. As shown in FIG. 11D, for example, the printing module 1490 may comprise a carriage 1478 to which the printer head is attached and which may travel along a gantry 1477 such that the printer head may be caused to translate horizontally in two dimensions, for example, first along the length of a sidewall of a cup disposed in the right printing position 1492c during printing thereof. When printing of such a cup in the right printing position 1492c has been completed, the printing device 1475 may then be caused to translate in an orthogonal, horizontal direction such that the printer head may be aligned with a cup disposed in one of the left or center printing positions 1492a,b. Upon alignment with one of these positions 1492a,b, the printer head may again translate linearly over and along the length of the respective cup in order to deposit ink on the uppermost portion of the sidewall of the cup now disposed thereunder. Again, it will be appreciated in light of the present teachings that a controller may coordinate the translation and/or alignment of each of the printer head, the ejection of ink thereby, and the rotation of the cup such that the entire sidewall of each cup may have the intended design printed thereon. Moreover, a person skilled in the art will appreciate that such an embodiment as depicted in FIG. 11D may reduce costs and/or complexity of the dispenser 1470 as a single printer head may be utilized to print cups disposed at different positions 1492a-c within the printing module 1490.

The one or more printer heads may be configured to print on one or more cups of the same or different sizes from the various stacks of cup from the cup source 1442. In this regard, the printer head may be positioned in the same horizontal plane when in each of the printing positions, but may need to adapt the relative printing distances anticipated from each jet based on the cup size being printed on. For example, the ink ejection pattern for printing a logo on a first cup size with a first taper may be different than the ink ejection pattern for printing the same logo on a second cup size with a different taper—where the goal is to have uniform appearance of the logo regardless of the size of the cup. In this regard, in some embodiments, the controller may be configured to determine the cup size being printed on (such as by determining which printing position is being utilized—e.g., if the corresponding cup stacks are maintained with a dedicated cup size). In some embodiments, one or more sensors (e.g., the seam sensor) may be used to determine the taper of the cup and the ink ejection pattern may be adjusted accordingly.

In some embodiments, the print device 1475 utilizes ink that enables the printing, such as provided from one or more ink cartridges, tanks, reservoirs, etc. that may also be stored within the housing 1474. In some embodiments, the print devices 1475 and/or dispenser 1470 may be configured such that only proprietary ink cartridges may be utilized with the dispenser 1470, such as to ensure quality, etc. The ink may be specially configured based on the food service material item, desired print quality, or other factors (e.g., safety, durability, etc.).

Following printing a cup within the printing module 1490, the printed cup may be transported along a path within the dispenser 1470 to the dispensing section 1472 so as to provide a user such as a food service provider access to the printed cup. For example, as shown in FIG. 11D, a printed cup may be translated and/or rotated from its horizontal orientation in the printing position to a position above the dispensing section 1472, at which point the printed cup may be dropped or deposited within the dispensing section 1472. As shown, for example, the dispensing section 1472 may comprise a plate 1473a having one or more through holes 1473b through which a printed cup may only pass in a vertical orientation. As discussed above, in some embodiments, a cup rotation structure may also be provided to rotate the cup about its central axis (A), such as within the dispensing section 1472 (or prior to dropping into the dispensing section 1472), such that a desired portion of the sidewall of the printed cup is preferably displayed to a food service provider.

Figure 12A:
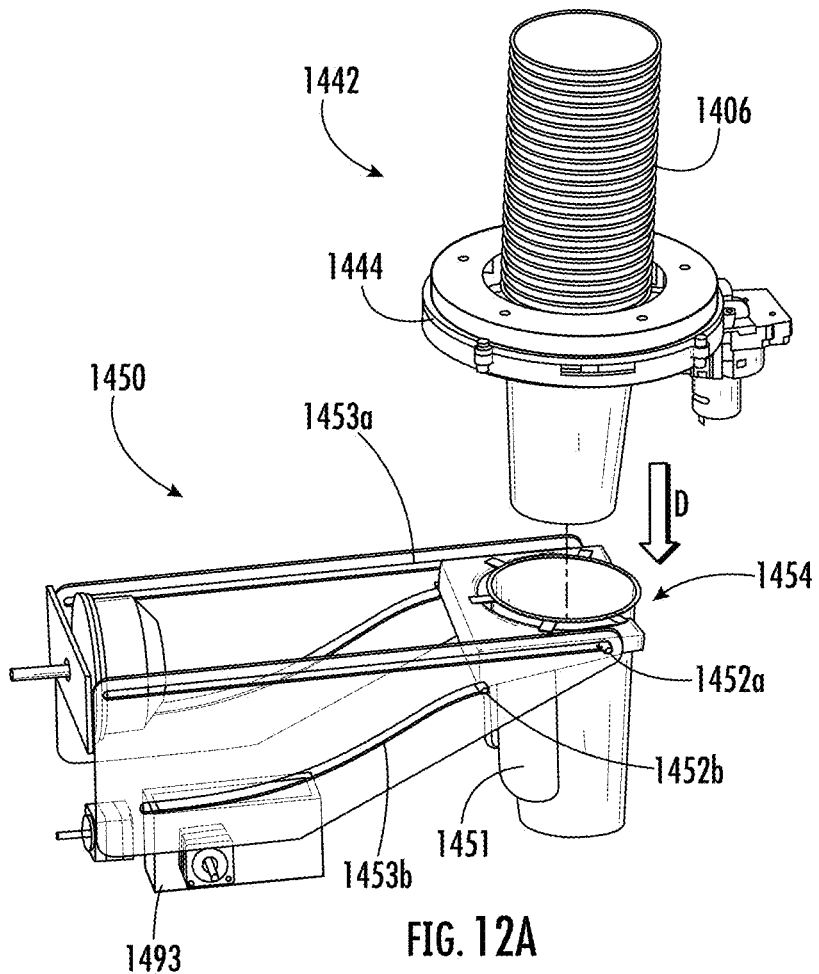

As noted above, a cup from a stack of cups at the cup source 1442 may be transported along a path to a printing position (e.g., 1492a) within the dispenser 1470, and after printing, may be transported along a path from the printing position to the dispensing section 1472. In various embodiments, the various paths may at least partially overlap. A person skilled in the art will appreciate in light of the present teachings that various cup-moving elements may be utilized to move the cup along the one or more paths through the cup dispenser (e.g., cup dispenser 1470). With reference now to FIGS. 12A-G, an embodiment of such an example cup moving element suitable for use in the dispenser 1470 is depicted in additional detail. As shown in FIG. 12A, the example cup source 1442 maintains a stack of cups 1406 waiting to be dispensed in a vertical orientation, with the closed end of each cup facing downward. Upon receiving a food service order (e.g., from a remote food service request module), the cup dispenser 1470 may begin preparation of the printed cup, for example, by releasing a cup corresponding to the food service order from the stack for printing thereof (though cups may alternatively be pre-loaded within the printing module). As shown, the cup removal structure 1444 may be configured to separate the lowest cup from the stack of cups 1406 such that the separated cup moves into the dispenser as indicated by the arrow D of FIG. 12A. In some embodiments, the force of gravity may assist with movement of the cup from the cup source 1442 to a cup-moving element disposed below.

The example illustrated cup moving element comprises a sled 1451 that is configured to move along a support 1450 extending between the cup source 1442 and a printing position. In particular, the sled 1451 includes a plurality of protrusions 1452a,b extending therefrom that are slidably disposed within corresponding tracks 1453a,b, though a person skilled in the art that the sled can move along a track according to other mechanisms (e.g., rack and pinion). In the illustrated embodiment, the sled 1451 includes a first set of protrusions 1452a that are configured to slid along a first track 1453a and a second set of protrusions 1452b that are configured to slide along a second track 1453b.

Figure 12B:
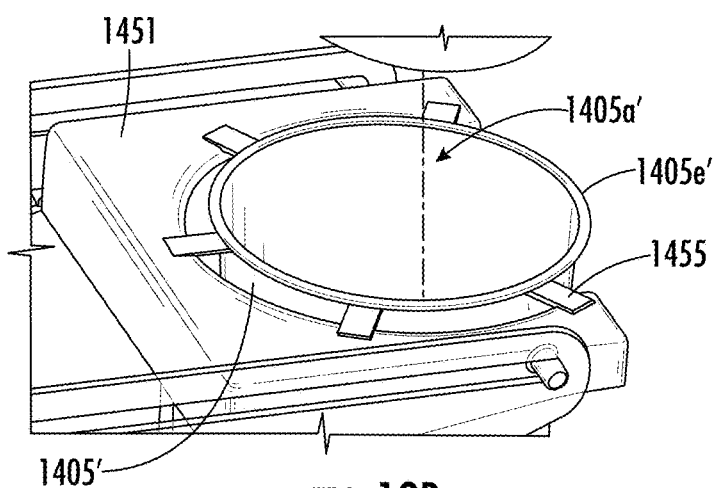

In the depicted example, the sled 1451 additionally comprises a cup receiving opening 1454 that is sized and positioned to at least partially retain (e.g., encircle) the cup 1405' that drops from the cup source 1442. As best shown in FIG. 12B, an upper surface of the opening is at least partially defined by a resilient shoulder 1455 (e.g., flanges), which exhibits a diameter slightly less than the maximum diameter of the lip 1405e' of the cup 1405'. In this manner, when the cup to be printed is removed from the stack of cups, the shoulder 1455 engages the lower surface of the lip 1405e' at the cup's open end 1405a' as shown in FIG. 12B. After the shoulder 1455 engages the cup, one or more motors (e.g., under the control of a controller) may be utilized to cause the sled 1451 to move within the dispenser 1470 as the protrusions 1452a,b slide within the tracks 1453a,b. Though resilient, the shoulder 1455 is sufficiently stiff to push the cup through its engagement with the lip 1405e'. As shown, the tracks 1453a,b diverge with the lower second track 1453b being angled downwardly such that the sled 1451 moving therealong begins to rotate the cup 1405' from its vertical orientation as shown in FIG. 12C to a horizontal orientation shown in FIG. 12D (e.g., the cup 1405' is moved onto the mandrel 1456, as described herein).

In some embodiments, in order to ensure that ink ejected onto the cup is able to dry prior to delivery to the dispensing section, one or more heaters may be provided to increase the temperature within the housing and/or of the cup before, during, and/or after printing. In this regard, the one or more heaters may be used to preheat the cup (such as for adhesion of the ink), heat the cup during printing (such as to pin the ink to the cup), and/or heat the cup after printing is complete (such as to control drying/coalescing of the ink). Additionally, one or more reflectors or shielding elements may be provided to further enhance efficient heating and/or prevent undesirable heating from occurring to various dispenser components or cups. Various mechanisms are contemplated herein including, by way of example, the use of hot forced air and/or the use of radiative heating elements such as one or more infrared (IR) lamps. For example, with reference to FIG. 12C, one or more heating elements (e.g., IR lamp 1493) may be activated while the cup is being delivered to the printing position so as to pre-heat the prior to having ink ejected thereon. Additionally or alternatively, the IR lamp 1493 may be activated during printing of the cup (FIG. 12F) such that the portion of the perimeter of the sidewall upon which ink has been ejected may be exposed to the heating element(s) as the cup rotates about its central axis (A). Finally, the IR lamp 1493 may additionally or alternatively be activated after printing as the cup is being moved to the dispensing section (FIG. 12G) to ensure drying or curing of the ink prior to the cup being accessible by the user. In some embodiments, ultraviolet (UV) curing ink may be printed onto the cup (such as may be useful for plastic cups). In such example embodiments, the one or more heaters may apply UV light to cause curing of the ink accordingly.

In some embodiments, a temperature sensor (not shown) may be provided for detecting the temperature of the cup itself and/or the ambient temperature at or near the printing position such that the heating element(s) may be activated (e.g., based on feedback control) to maintain a sufficient temperature for drying the ink prior to dispensing the printed cup. By way of example, a non-contact infrared temperature sensor may be configured to measure the surface temperature of the sidewall of the cup.

Figure 12C:
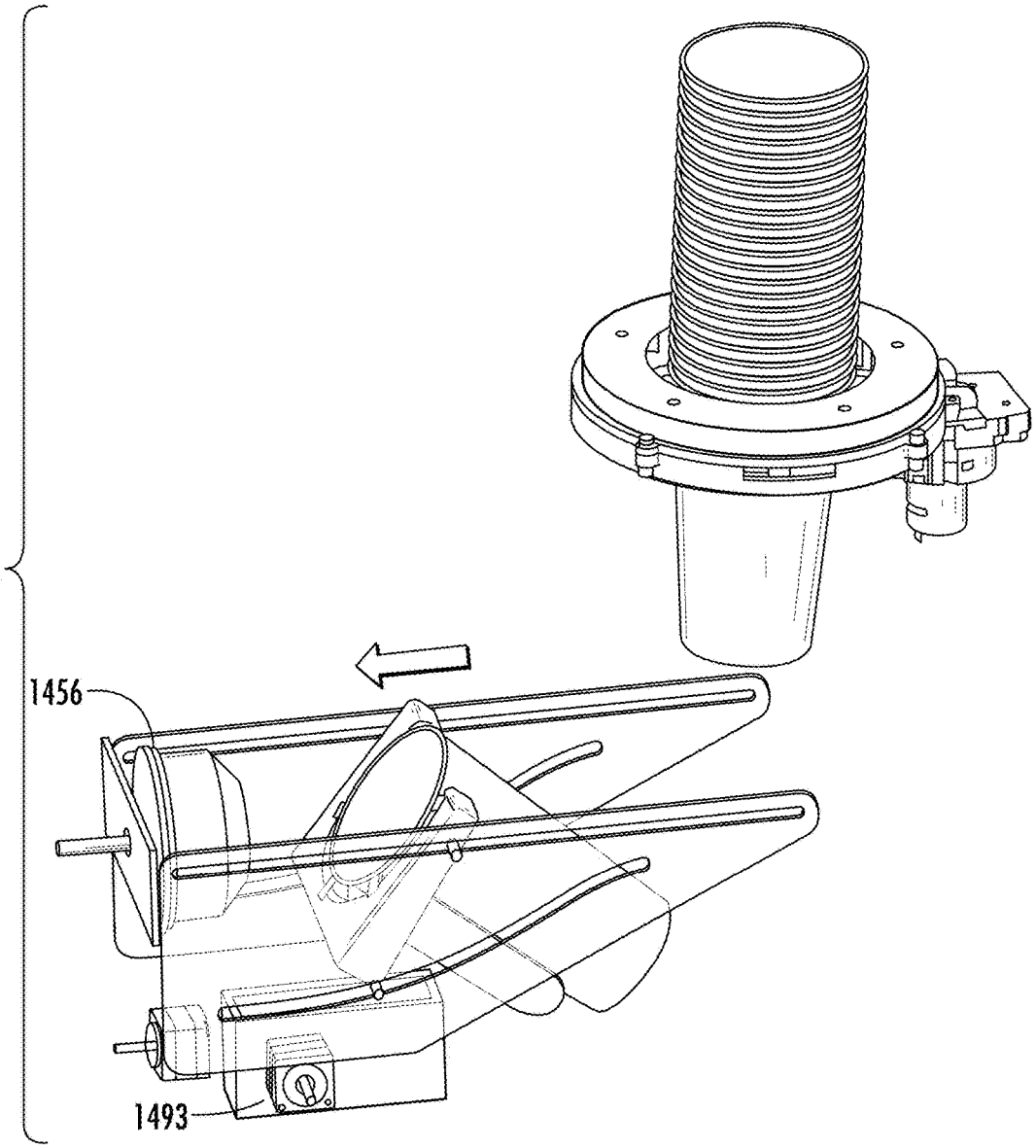
Figure 12D:
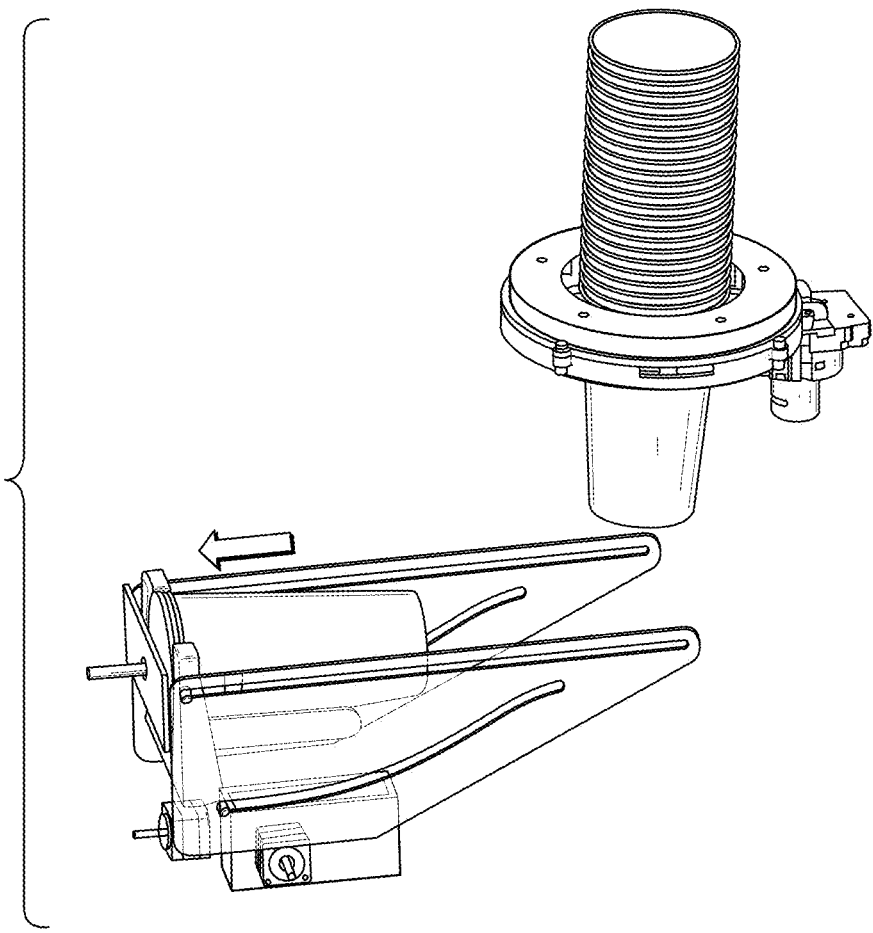
Figure 12E:
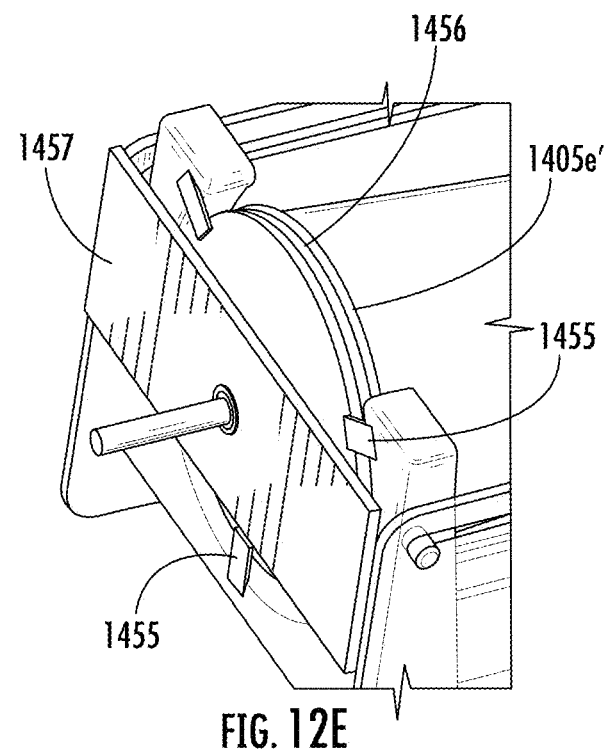
Figure 12F:
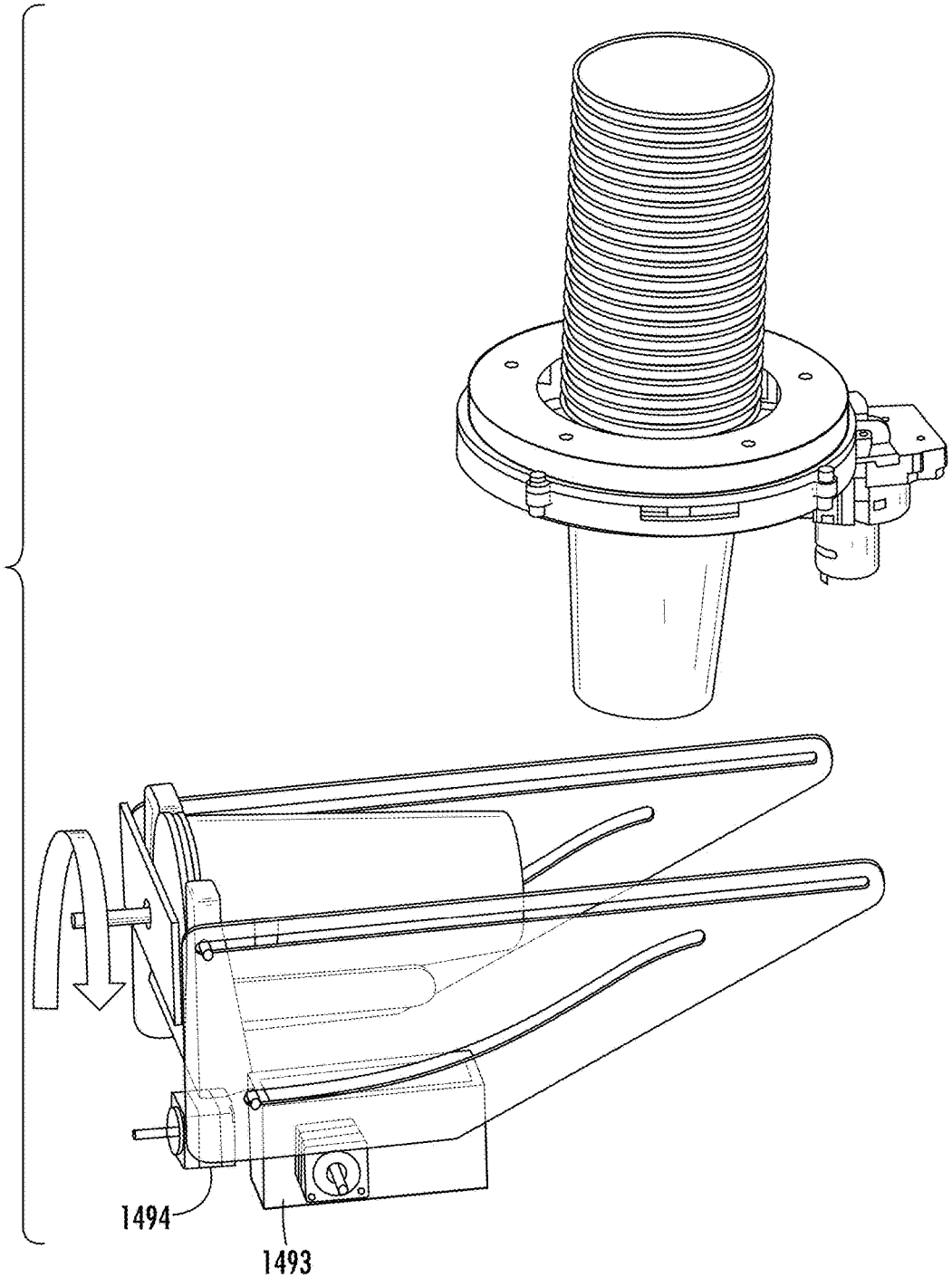

With reference now to FIGS. 12C-D, as the sled 1451 pushes the cup toward the printing module, a rotatable mandrel 1456 is positioned to be received within the open end 1405a' of the cup and engage an inner surface thereof (e.g., via friction fit). The rotatable mandrel 1456, which may be laterally fixed in its position (e.g., via stop plate 1457 having a bore through which a portion of the mandrel extends—as shown in FIG. 12E), is effective to stop the cup's progress while the sled 1451 continues along the track 1453 such that the resilient shoulder 1455 passes over the lip 1405e' as best shown in FIG. 12E, thereby disengaging the cup 1405 from the sled 1451. With the cup now disposed at the printing position (e.g., one of printing positions 1492a-c), rotation of the mandrel 1456 (e.g., via the action of one or more motors) is effective to rotate the cup 1405' about its central axis (A) for printing of the cup sidewall as shown in FIG. 12F and as otherwise discussed herein, for example, as a printer head translates over an uppermost portion of the sidewall of the cup disposed in the horizontal orientation.

To avoid bleeding, streaking, or smearing, it may be preferable to avoid printing on the cup's seam, if any. Accordingly, a seam sensor 1494 may be provided in some embodiments for detecting the position of a cup's seam during rotation of the cup, for example, when the cup is disposed in the horizontal orientation. By tracking the position of the seam, a controller can be configured to coordinate ejection of ink from the printer and rotation of the cup such that ink is not ejected onto the seam. For example, the controller may be configured to prevent ink from being ejected when the seam is directly below the printer head, or may adjust rotation of the cup (e.g., reversing direction of rotation about its axis) such that the seam does not pass under the printer. Additionally or alternatively, the seam sensor may be used to determine the position of the seam along the rotation cycle of the cup 1405' and, thus, can be used by the controller to control rotation of the cup 1405' during printing, such as to enable printing in a certain position along the sidewall of the cup 1405'. Similarly, in some embodiments, the relative position of the seam may be used to align the printed cup during ejection so as to cause the printed portion of the sidewall to face toward a food service provider when moved to the dispensing section.

A variety of detection mechanisms modified in accordance with the present teachings may be utilized as a seam sensor, including contact sensors such as mechanical sensors and non-contact sensors such as optical or ultrasound sensors, all by way of non-limiting example. In one embodiment, for example, the seam sensor 1494 may include a source of optical radiation or ultrasound waves that are directed at a sidewall of the rotating cup. A detector of the seam sensor 1494 may receive the light or sound reflected from the sidewall, with a difference in reflection from the seam (e.g., bump, depression) being indicated in the sensor signal. By way of example, the position of the seam may be indicated based on the time-of-flight of the reflected light during rotation of the cup substantially about the central axis in the second orientation. With data as to the position of the seam, for example, relative to the angular orientation of the mandrel, the controller can operate the printer and/or mandrel so as not to print on the detected seam position and/or to otherwise control the rotational position of the cup as described herein.

In accordance with various aspects of the present teachings, the mandrel 1456 preferably maintains the cup in a horizontal orientation during printing thereof such that at least one of the uppermost portion of the sidewall is horizontal and/or the central axis of the cup is horizontal such that the printer head maintains a distance (e.g., a fixed distance) from the portion of the cup to be printed, irrespective of the taper. Such configurations enable the provision of a constant ink density along the uppermost portion of the sidewall, for example, such that the printer head does not need to adjust spray pattern or injected ink density (e.g., volumetric flow rate of the ink ejected from the ink jet) due to differences in the distance between the ink jet and the cup resulting from the cup's tapered sidewall. Likewise, for a cylindrical cup (e.g., cup 1405'''), by having the mandrel 1456 maintain the central axis (A) in a horizontal orientation, the parallel sidewalls would likewise remain a fixed distance from a printer head configured to translate in only a horizontal direction along the uppermost portion of the sidewall during printing thereof.

Figure 12G:
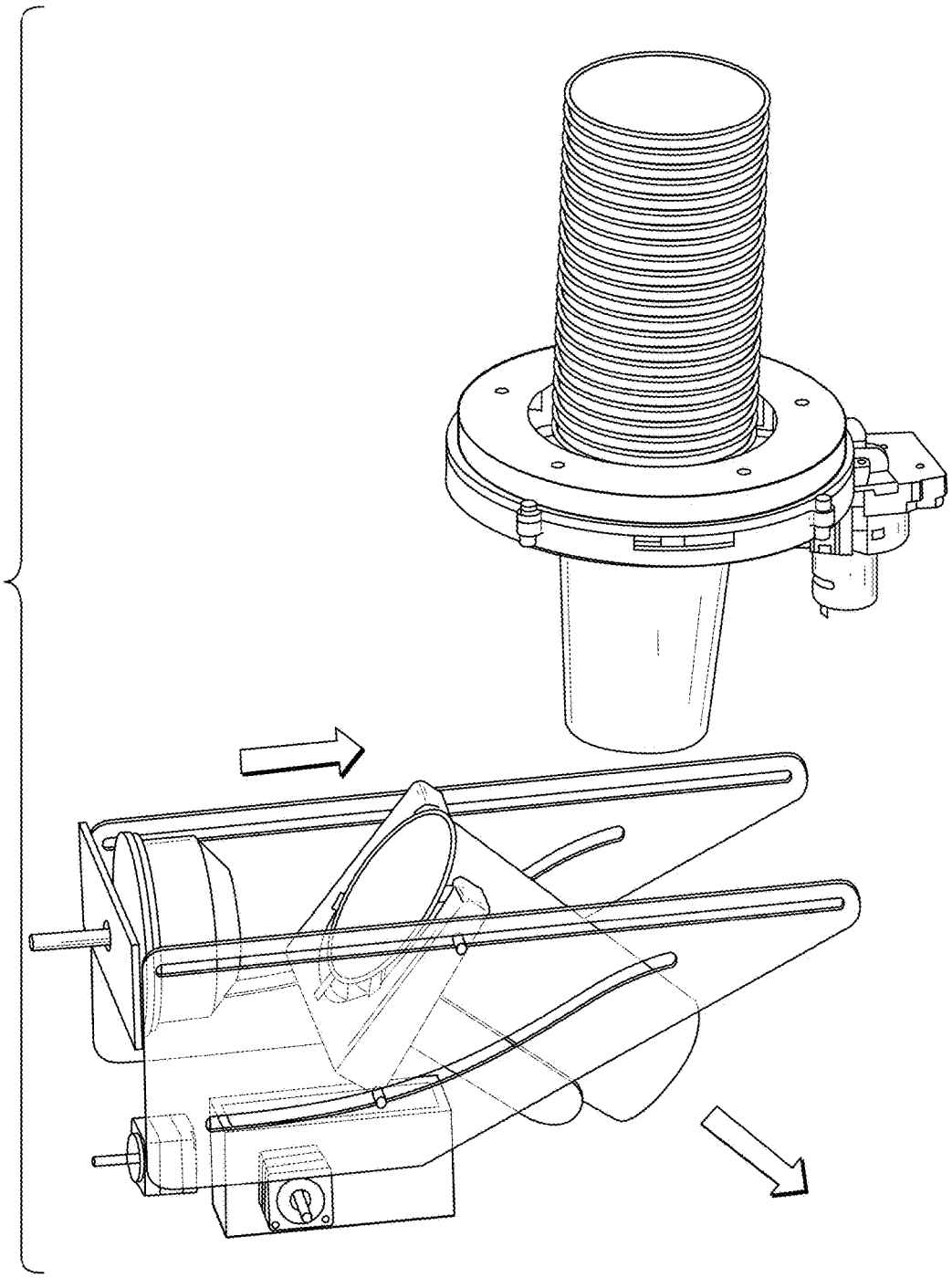

Upon the completion of the printing, one or more motors may be configured to reverse the direction of the sled 1451. Because the flanges may now engage the upper surface of the cup lip 1405e', movement of the sled 1451 in the reverse direction may push the cup away from and off of the mandrel 1456 and toward the dispensing section as shown in FIG. 12G, thereby removing the inner surface of the tapered cup from engagement with the mandrel 1456. Upon achieving the vertical orientation at the end of the track 1453, the cup may be moved, ejected, or fall (e.g., via gravity) from the sled 1451, for example, into a dispensing section 1472.

In this regard, in some embodiments, the cup travels along a cup path within the cup dispenser. For example, with reference to FIG. 13, a cup 1805 travels within the cup dispenser 1870 from a vertical orientation (in the cup stack 1806) to a horizontal orientation (for printing thereon with a printer 1875), and then to a vertical orientation (in the dispensing section 1872) for collection by the food service provider.

As described herein, one or more mandrels may be used to receive and hold the cup for printing. In some embodiments, each mandrel may be sized to fit within a specific size cup or range of cup sizes such as to properly position (e.g., orient) the cup into the corresponding printing position (e.g., such that at least one of a central axis of the cup extending through each of the cup's open and closed ends or a portion of the sidewall of the first cup is horizontal during printing of the cup). For example, each cup may have a diameter size corresponding to the opening at the open end (e.g., top) of the cup and may have a degree of taper leading down from the open end (e.g., described and shown with respect to FIGS. 11A-C) that fits within a corresponding mandrel in an interference fit manner (such as described with respect to FIGS. 12A-G and 14A-B). Further, in some embodiments, depending on the taper of the planned cup, the corresponding mandrel may be oriented such that an uppermost portion of the sidewall of a cup thereon is in the horizontal orientation—such as to correspond with the printer head to receive ink thereon. Thus, each mandrel (e.g., for each printing position) may be sized and oriented for each printing position and may correspond to each specific size cup or range of cup sizes planned for that printing position. Likewise, though some of the described embodiments detail downward printing onto a cup in a horizontal orientation, the one or more mandrels may be configured to orient a cup differently and/or hold the cup such that printing occurs in a different direction (e.g., sideways toward the cup, at an angle with respect to the cup, etc.).

In some embodiments, each mandrel (e.g., one for each printing position) may be configured to operate as a universal mandrel such that it can receive and hold a wide range of cup sizes. For example, the universal mandrel may receive and securely hold each contemplated cup size (e.g., small, medium, and large) such that the lanes for each cup stack can accommodate each cup size. Further, utilizing universal mandrels may ease maintenance, such as requiring only one type of mandrel if replacement is needed.

With reference now to FIGS. 14A-B, two additional example mandrels 1456a and 1456b suitable for use in systems according to the present teachings are depicted. With particular reference to FIG. 14A, the example mandrel 1456a comprises a head 1458a that is configured to be disposed at least partially within the cup so as to engage an inner surface thereof. As shown, the mandrel head 1458a defines a groove for seating an O-ring 1459a. Upon insertion of the head 1458a into the open end of a cup, the O-ring 1459a can be compressed against the inner surface of the cup to retain the cup on the mandrel by frictional fit. The mandrel 1456b of FIG. 14B is similar in that it also comprises a head 1458b configured to be inserted into the open end of the cup. Rather than having a frictional element disposed completely around the head as with mandrel head 1458a, the head 1458b includes a series of circumferentially spaced frictional elements 1459b on its outer surface, which may better accommodate cup-to-cup variations and/or provide sufficient frictional force to retain the cup without requiring excessive forces for the initial engagement between the inner surface of the cup and frictional elements 1459b. It will be appreciated in light of the present teachings that each of a plurality of mandrels in a cup dispenser (e.g., a first mandrel for rotating a first cup from a first stack at a first printing position and a second mandrel for rotating a second cup from a second stack at a second printing position) can be the same or different from one another. For example, a single mandrel design could accommodate a wide variety of cup sizes and/or tapers. Alternatively, mandrels for a particular printing position may be selected and/or interchanged according to the cup type corresponding to that printing position and/or cup stack.

FIG. 15 depicts a cup 1705 engaged with mandrel 1756b in a printing position within the printing module. As shown, the printer device 1775 comprises a carriage 1775a to which the printer head 1775b is attached. The carriage 1775a is disposed over a tapered cup such that the printer head may jet ink toward the uppermost portion (illustrated as dashed line U) of the cup's sidewall 1705c. In particular, the cup is disposed such that the uppermost portion of the sidewall is horizontal such that the printer head may maintain a fixed distance relative to the portion of the cup to be printed as the printer head translates (e.g., linearly) along and over the tapered cup's sidewall. In this regard, in some embodiments, the mandrel 1756b is configured with a tilt angle with respect to horizontal such as may account for the corresponding taper of the cup so as to cause the uppermost portion of the cup to be horizontal.

As shown, a cup positioning element (e.g., wheel 1775c) is also attached to the carriage, the wheel adapted to be disposed in contact with the sidewall of the cup for balancing or otherwise positioning (e.g., centering) the cup on the mandrel 1756b during rotation of the cup. By way of example, loading of the cup onto the mandrel may not always result in the cup being maintained in a horizontal orientation while rotating, for example, due to cup-to-cup variations. The cup positioning wheel 1775c, however, can be utilized to contact the sidewall during rotation of the cup in the printing position (e.g., prior to printing) to help straighten, balance, or otherwise center the cup on the mandrel for consistent printing.

Example Control System for Other System(s)

The control architecture 15, such as through the controller module 60, may be configured to communicate with one or more other systems 90 (e.g., front of house (FOH) or back-of-house (BOH) system(s)). In some embodiments, the controller module 60 may be configured to determine, based on at least one of the order information or the personalization information, one or more instructions to transmit to one or more other components/systems. For example, FIG. 16 shows an example control system 810 that includes the controller module 860, a napkin dispenser 891, a cutlery dispenser 892, other system(s) 893, and an external network 812.

The controller module 860 may be configured to determine one or more instructions/messages to provide to various other systems (e.g., a napkin dispenser, cutlery dispenser, paper towel dispenser, soap dispenser, etc.). In some embodiments, some such dispensers (e.g., napkin dispenser(s), cutlery dispenser(s), paper towel dispenser(s), soap dispenser(s), etc.) may be referred to as back-of-house (BOH) systems. Such communication may occur directly to the other system(s) and/or through an external network 812.

In some embodiments, the determined instructions or messages may be based on any information gathered herein. For example, the controller module 860 may determine that the napkin dispenser 891 should dispense a certain number of napkins to fulfill a food order request and instruct the napkin dispenser 891 accordingly. Such determination of the number of napkins may be made at the napkin dispenser and/or by the controller module 860. In this regard, the determined number of napkins could be based on a personal preference, other personalization information for the customer, and/or the order information.

Similarly, the controller module 860 may determine that the cutlery dispenser 892 should dispense a certain number and/or type of cutlery items to fulfill a food order request and instruct the cutlery dispenser 892 accordingly. Such determinations may be made at the cutlery dispenser and/or by the controller module 860. In this regard, the determined number and/or type of cutlery could be based on a personal preference, other personalization information for the customer, and/or the order information.

In some embodiments, the on-demand printing system may utilize napkins or cutlery for printing information thereon—e.g., as the food service material item. In such embodiments, the printer may be configured to print on such items and may be built into the corresponding dispenser or separate dispenser(s).

In some embodiments, the controller module 860 may be configured to gather information and provide the gathered information to a remote server and/or the control architecture 15 for use with data aggregation/analysis, reports, and/or other data analytics. Such information may include data gathered from various other systems as well as any other connected system.

Another example control architecture is depicted in FIG. 17, in which a data management system 1910 includes a controller 1960 configured to gather receipt data directly from a POS system 1980 and to provide print/dispense instructions to various BOH printers/dispensers, such as in the food preparation/sales business.

In this regard, various BOH printers/dispensers may be positioned in the back of the restaurant/store where food preparation is occurring. An example BOH printer/dispenser includes a food service material printer/dispenser 1970 that can receive data and print directly onto a food service material item (e.g., a wrap) that is dispensed for use during food preparation. Other example BOH printers/dispensers include a cup printer/dispenser 1970', a cutlery dispenser, a napkin dispenser 1970", a bag printer/dispenser, and an automated sealer (such as for sealing a cup), among others. The proposed data management system 1910 contemplates parsing through receipt data and generating and providing print/dispense instructions for one or more such BOH printers/dispensers utilizing the controller 1960.

The controller 1960 may connect directly to the POS system 1980 and receive pre-created "receipt data". For example, a Serial Splitter 1911 is installed at the POS system 1980 to enable the controller 1960 to receive an exact copy of the "receipt data" received by the receipt printer 1913 (which may be already provided and installed by the restaurant/business). The controller 1960 then parses/filters the receipt data and uses that data to generate print/dispense instructions for the various BOH printers/dispensers, which are then communicated (such as wirelessly through wireless network 1912) to the appropriate BOH printer/dispenser 1970, 1970', 1970", etc. One notable advantage of the proposed data management system 1910 is that it can be plugged into the POS system 1980 and receive the same receipt data that is already being generated such that no changes are needed in the POS system.

As noted above, the controller 1960 may parse/filter the receipt data received from the POS system 1980 to generate print/dispense instructions for the various BOH printers/dispensers. For example, in some embodiments, the receipt data generated by the POS system 1980 may comprise a text string that may be used to determine the print information to print on one or more food service material items. In some such aspects, the controller 1960 may utilize a look-up table to identify a predetermined image to have printed on the food service material corresponding to the text string received from the POS system 1980. For example, the look-up table may indicate that the text string "no sugar" matches to a graphic of sugar with an "X" or line through it.

Example Flowchart(s)

Embodiments of the present invention provide methods, apparatuses and computer program products for providing on-demand food service material printing for a food order according to various embodiments described herein. Various examples of the operations performed in accordance with embodiments of the present invention will now be provided with reference to FIG. 18.

FIG. 18 illustrates a flowchart according to an example method for providing on-demand food service material printing for a food order according to an example embodiment. The operations illustrated in and described with respect to FIG. 18 may, for example, be performed by, with the assistance of, and/or under the control of one or more of the components, architectures, modules, networks, and/or systems/devices of system 10, such as described herein.

The method 900 may include receiving a request for food service at operation 902. At operation 904, the method may include determining order information based on the request. At operation 906, the method may include determining personalization information based on the request. Then, the method may include determining order print information, such as based on the order information, at operation 908 and personalization print information, such as based on the personalization information, at operation 910. At operation 912, the method may include determining the food service material item to print on for fulfilling the food order. Then, at operation 914, the method may include printing on the food service material item and presenting it to the food service person for use with preparation of the food order.

FIG. 18 illustrates an example flowchart of a system, method, and computer program product according to various example embodiments described herein. It will be understood that each block of the flowcharts, and combinations of blocks in the flowcharts, may be implemented, for example, by hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory and executed by, for example, the control architecture 15. As will be appreciated, any such computer program product may be loaded onto a computer or other programmable apparatus to produce a machine, such that the computer program product including the instructions which execute on the computer or other programmable apparatus may be suitable for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein may come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A cup dispenser for providing on-demand cup printing for a food service order, the cup dispenser comprising:
   a cup source configured to hold one or more cups, wherein each of the one or more cups comprises an open end and a closed end and a sidewall extending therebetween;
   a printing module comprising a printer configured to print at least one of order information or personalization information on a sidewall of a first cup so as to form a printed first cup, wherein the at least one of order information or personalization information is based on the food service order associated with the first cup; and
   a dispensing section configured to enable a user to access the printed first cup, wherein, the printed first cup includes the order information or personalization information printed thereon when the printed first cup is accessible in the dispensing section,
   wherein the printer is configured to print the at least one of order information or personalization information on the sidewall of the first cup when the first cup is in a horizontal orientation, wherein, when the first cup is in the horizontal orientation, at least one of a central axis of the first cup extending through each of the first cup's open and closed ends or a portion of the sidewall of the first cup is horizontal during printing of the first cup, and
   wherein the printing module is configured to receive the first cup from a first stack of cups at a first printing position such that the first cup is disposed in the horizontal orientation and a second cup from a second stack of cups at a second printing position such that the second cup is disposed in a horizontal orientation, and wherein a printer head of the printing module is configured to print on both of the first cup disposed in the first printing position and the second cup disposed in the second printing position.

2. A system for providing on-demand cup printing for a food service order, the system comprising:
   a food request module configured to receive a request for food service for a customer, wherein the request for food service includes the food service order; and
   a cup dispenser for dispensing a cup with printed information for use with the food service order, the cup dispenser comprising:
   a communication element;
   a cup source configured to hold a plurality of cups that are arranged in a first stack and a second stack, each of the plurality of cups comprising an open end and a closed end and a sidewall extending therebetween;
   a printing module comprising a printer configured to print at least one of order information or personalization information on a sidewall of a first cup received from the first stack via a first path and further configured to print at least one of order information or personalization information on a sidewall of a second cup received from the second stack via a second path, wherein the at least one of order information or personalization information is based on the food service order associated with the corresponding cup; and
   a dispensing section configured to enable a user to access at least one of the printed first cup or the printed second cup, wherein, the printed first cup includes the order information or personalization information printed thereon when the printed first cup is accessible in the dispensing section,
   wherein the printer is configured to print the at least one of order information or personalization information on the sidewall of the first cup when the first cup is in a horizontal orientation, wherein, when the first cup is in the horizontal orientation, at least one of a central axis of the first cup extending through each of the first cup's open and closed ends or a portion of the sidewall of the first cup is horizontal during printing of the first cup,
   wherein the printing module is configured to receive the first cup from the first stack of cups at a first printing position such that the first cup is disposed in the horizontal orientation and the second cup from the second stack of cups at a second printing position such that the second cup is disposed in a horizontal orientation, and wherein a printer head of the printing module is configured to print on both of the first cup disposed in the first printing position and the second cup disposed in the second printing position.

3. The system of claim 2, wherein the cup source is configured to maintain the plurality of cups in the cup source in a vertical orientation.

4. The system of claim 2, wherein the printer comprises a printer head configured to translate in a horizontal plane.

5. The system of claim 2, wherein the printer head is configured to be disposed vertically above the first cup in the horizontal orientation, and wherein the printer head comprises at least one ink jet configured to propel ink downward toward an uppermost portion of the sidewall of the first cup in the horizontal orientation during printing thereof.

6. The system of claim 5, wherein the at least one ink jet is configured to maintain a distance from the uppermost portion of the sidewall of the first cup during printing thereof.

7. The system of claim 5, wherein, when the first cup is in the horizontal orientation, the first cup is disposed such that the uppermost portion of the sidewall of the first cup is parallel to a horizontal plane, and wherein the printer head is configured to translate in the horizontal plane such that the printer head moves parallel to the uppermost portion of the sidewall of the first cup during printing thereof.

8. The system of claim 5, wherein, when the first cup is in the horizontal orientation, the first cup is disposed such that the central axis of the cup is parallel to a horizontal plane, and wherein the printer head is configured to translate in the horizontal plane such that the printer head moves parallel to the central axis of the first cup during printing thereof.

9. The system of claim 2, wherein the first cup is configured to rotate about the central axis during printing thereof such that an uppermost portion of the sidewall of the cup remains parallel to a horizontal plane during rotation of the first cup.

10. The system of claim 2, further comprising one or more cup-moving elements configured to change the first cup from a first orientation in the cup source to the horizontal orientation as the cup moves from the cup source to the printing module, wherein the first orientation is different than the horizontal orientation.

11. The system of claim 10, wherein the one or more cup-moving elements comprise a sled having a cup-receiving portion disposed below the cup source, wherein the cup-receiving portion comprises a resilient shoulder configured to engage a lower surface of a lip at the open end of the first cup and to release engagement of the lower surface of the lip when the first cup is disposed within the printing module.

12. The system of claim 2, further comprising one or more cup-moving elements configured to re-position the first cup from the horizontal orientation in the printing module to a vertical orientation in the dispensing section.

13. The system of claim 2, wherein the plurality of cups each comprise a first circular cross-section corresponding to the open end and a second circular cross-section corresponding to the closed end, wherein the plurality of cups comprises one or more soup containers, one or more beverage cups, or one or more ice cream containers.

14. The system of claim 2, wherein the printing module comprises a sensor configured to detect the position of a seam extending along the sidewall of the first cup.

15. The system of claim 14, wherein the sensor comprises a light source and a detector configured to receive light from the light source reflected from the first cup, wherein the position of the seam is detected based on time-of-flight of the reflected light during rotation of the first cup.

16. The system of claim 14, wherein the first cup is configured to rotate about a central axis during printing thereof, and wherein the printer is configured to not print on the detected position of the seam.

17. The system of claim 2, further comprising a controller configured to:
receive, via the communication element, food service order data corresponding to the food service order;
determine, based on the food service order data, the order information or personalization information to be printed on the first cup; and
cause dispensing of the printed first cup.

18. The system of claim 2, wherein the first path and the second path at least partially overlap.

19. A cup dispenser for providing on-demand cup printing for a food service order, the cup dispenser comprising:
a cup source configured to hold one or more cups, wherein each of the one or more cups comprises an open end and a closed end and a sidewall extending therebetween;
a printing module comprising a printer configured to print at least one of order information or personalization information on a sidewall of a first cup so as to form a printed first cup, wherein the at least one of order information or personalization information is based on the food service order associated with the first cup;
a dispensing section configured to enable a user to access the printed first cup, wherein, the printed first cup includes the order information or personalization information printed thereon when the printed first cup is accessible in the dispensing section; and
one or more cup-moving elements configured to change the first cup from a first orientation in the cup source to the horizontal orientation as the cup moves from the cup source to the printing module, wherein the first orientation is different than the horizontal orientation,
wherein the printer is configured to print the at least one of order information or personalization information on the sidewall of the first cup when the first cup is in a horizontal orientation, wherein, when the first cup is in the horizontal orientation, at least one of a central axis of the first cup extending through each of the first cup's open and closed ends or a portion of the sidewall of the first cup is horizontal during printing of the first cup, and
wherein the one or more cup-moving elements comprise a sled having a cup-receiving portion disposed below the cup source, wherein the cup-receiving portion comprises a resilient shoulder configured to engage a lower surface of a lip at the open end of the first cup and to release engagement of the lower surface of the lip when the first cup is disposed within the printing module.

* * * * *